(12) United States Patent
Kim et al.

(10) Patent No.: US 11,914,279 B2
(45) Date of Patent: Feb. 27, 2024

(54) CAMERA ACTUATOR, CAMERA MODULE, AND CAMERA DEVICE INCLUDING SAME

(71) Applicant: LG INNOTEK CO., LTD., Seoul (KR)

(72) Inventors: Chang Yeon Kim, Seoul (KR); Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 209 days.

(21) Appl. No.: 17/629,340

(22) PCT Filed: Jul. 15, 2020

(86) PCT No.: PCT/KR2020/009294
§ 371 (c)(1),
(2) Date: Jan. 21, 2022

(87) PCT Pub. No.: WO2021/015481
PCT Pub. Date: Jan. 28, 2021

(65) Prior Publication Data
US 2022/0252959 A1    Aug. 11, 2022

(30) Foreign Application Priority Data

Jul. 23, 2019  (KR) .................. 10-2019-0089082
Jul. 29, 2019  (KR) .................. 10-2019-0091622

(51) Int. Cl.
*H04N 23/51*  (2023.01)
*H04N 23/54*  (2023.01)
*G03B 5/02*  (2021.01)
*G03B 17/17*  (2021.01)
*H04N 23/55*  (2023.01)

(52) U.S. Cl.
CPC ............... *G03B 5/02* (2013.01); *G03B 17/17* (2013.01); *H04N 23/51* (2023.01); *H04N 23/54* (2023.01); *H04N 23/55* (2023.01)

(58) Field of Classification Search
None
See application file for complete search history.

(56) References Cited

U.S. PATENT DOCUMENTS

| | | |
|---|---|---|
| 9,258,486 B2 | 2/2016 | Hu et al. |
| 10,394,046 B2 | 8/2019 | Jeong et al. |
| 10,416,472 B2 | 9/2019 | Jeong et al. |
| 10,481,410 B2 | 11/2019 | Kim et al. |
| 10,534,194 B2 | 1/2020 | Lee et al. |
| 2018/0364450 A1 | 12/2018 | Lee et al. |

(Continued)

FOREIGN PATENT DOCUMENTS

| | | |
|---|---|---|
| JP | 2015-11353 A | 1/2015 |
| KR | 10-0233050 B1 | 12/1999 |

(Continued)

*Primary Examiner* — Cynthia Segura
(74) *Attorney, Agent, or Firm* — Birch, Stewart, Kolasch & Birch, LLP

(57) ABSTRACT

A camera actuator according to the embodiment includes a housing; a prism unit disposed in the housing; and a driving unit for tilting the prism unit; wherein the prism unit includes a prism mover including a receiving portion; and a prism disposed in the receiving portion; wherein the housing includes a sidewall and a guide portion including an inclined surface disposed on the sidewall.

20 Claims, 46 Drawing Sheets

(56) References Cited

U.S. PATENT DOCUMENTS

2019/0129197 A1    5/2019  Kim et al.
2022/0269146 A1*   8/2022  Lee ..................... G02B 27/646

FOREIGN PATENT DOCUMENTS

| KR | 10-2017-0105236 A | 9/2017 |
| KR | 10-2018-0094355 A | 8/2018 |
| KR | 10-2018-0097228 A | 8/2018 |
| KR | 10-1892857 B1 | 8/2018 |
| KR | 10-2018-0102946 A | 9/2018 |
| KR | 10-2018-0137278 A | 12/2018 |
| KR | 10-1942743 B1 | 1/2019 |
| KR | 10-1973434 B1 | 4/2019 |

* cited by examiner

[FIG. 1]
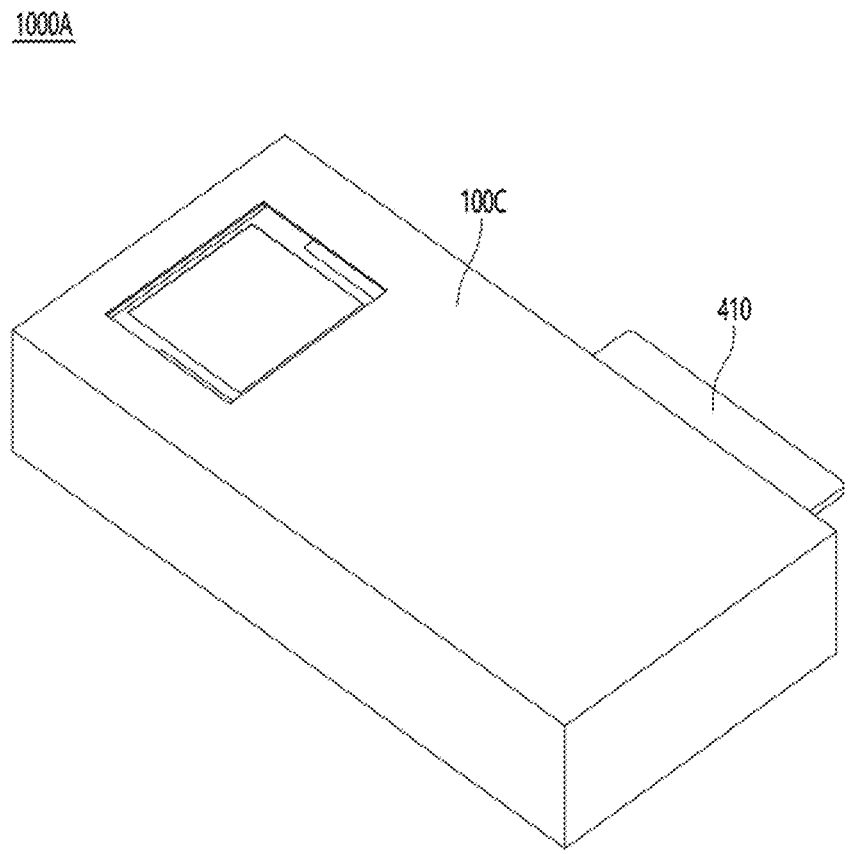

[FIG. 2a]
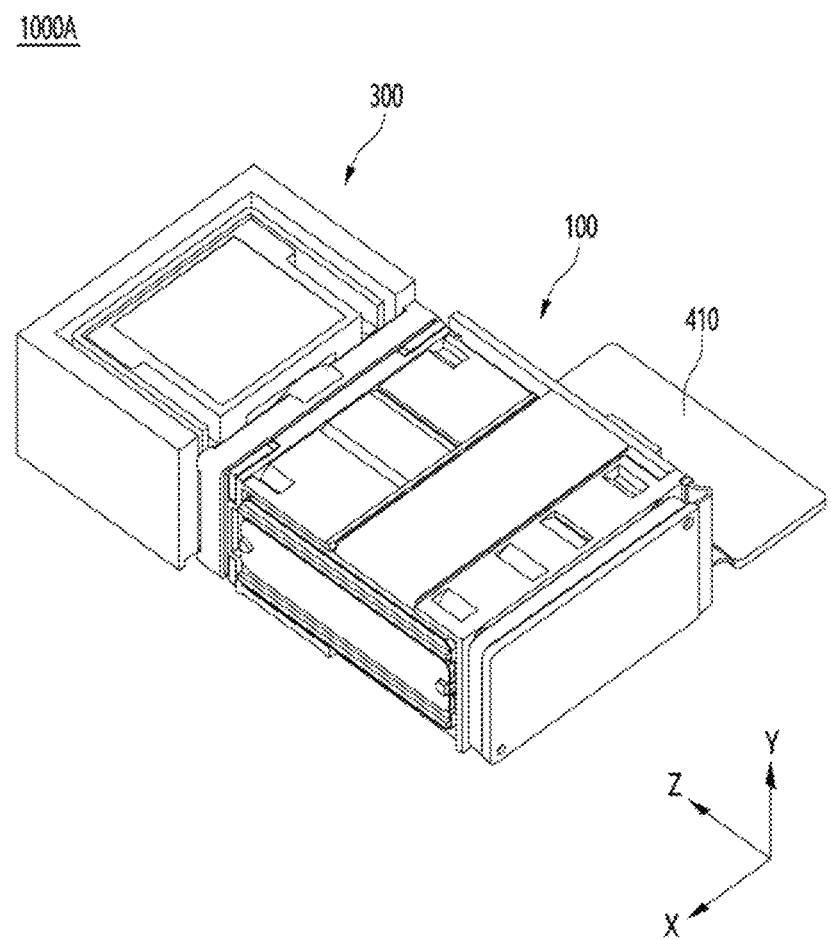

[FIG. 2b]
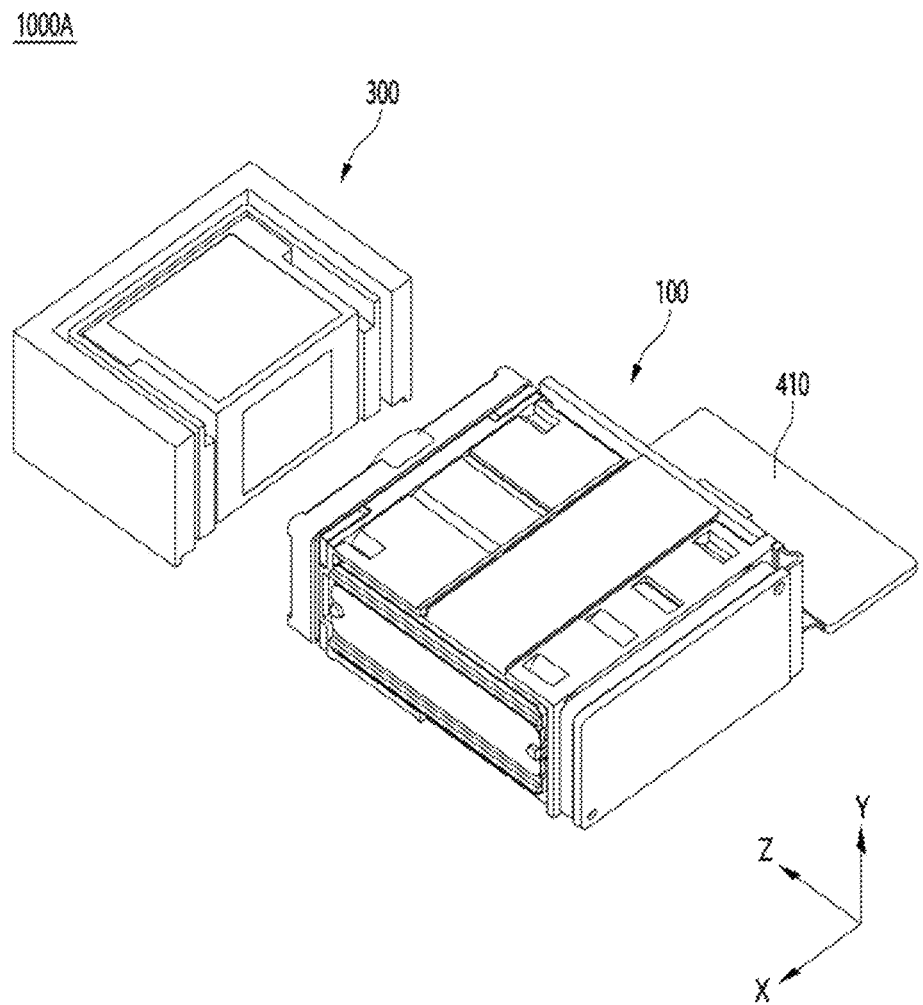

[FIG. 3a]
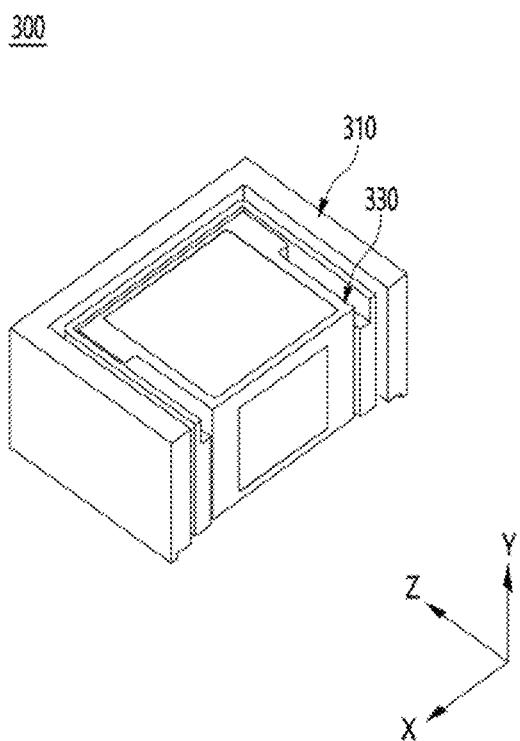

[FIG. 3b]
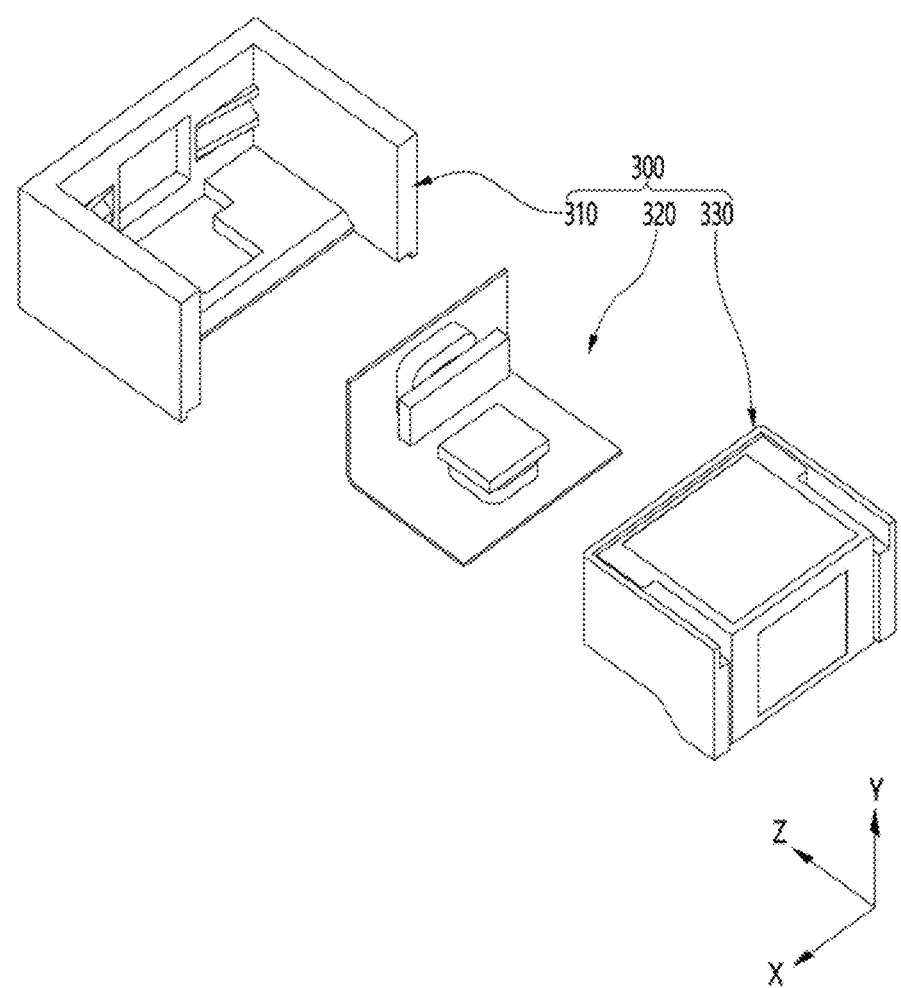

[FIG. 4a]
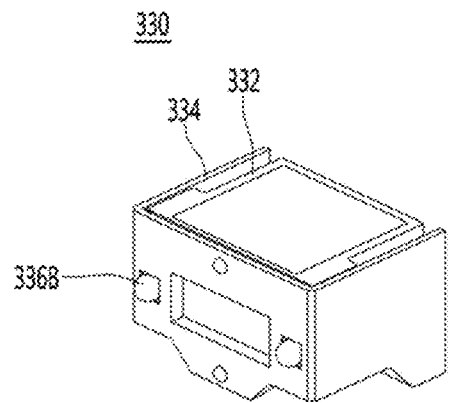
[FIG. 4b]
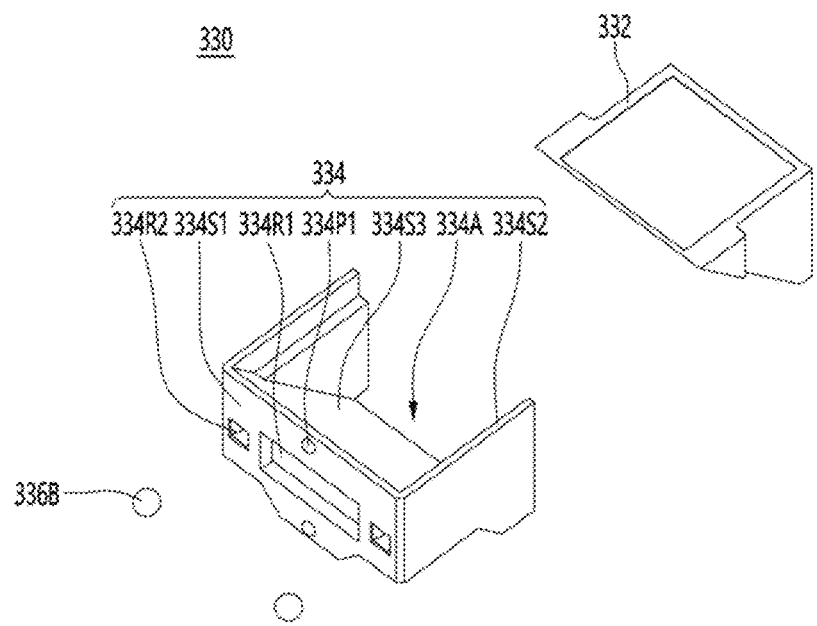

[FIG. 4c]
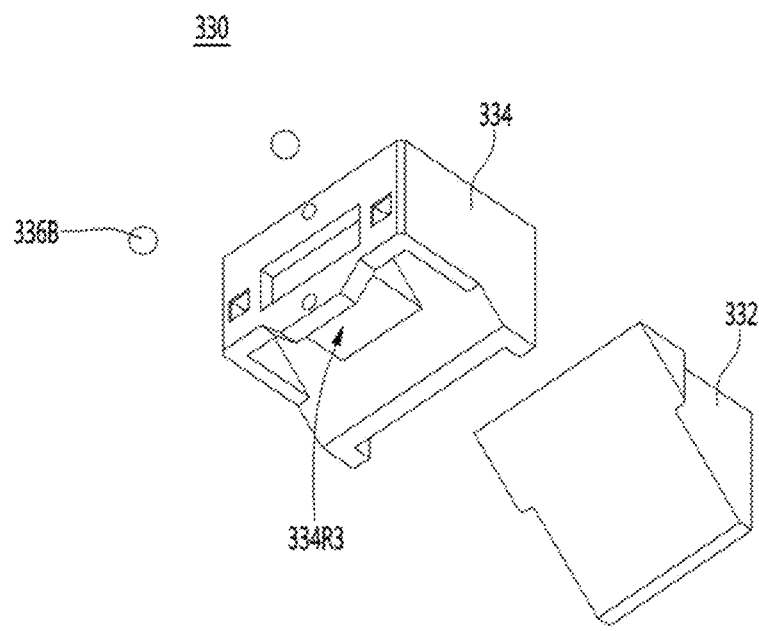
[FIG. 5a]
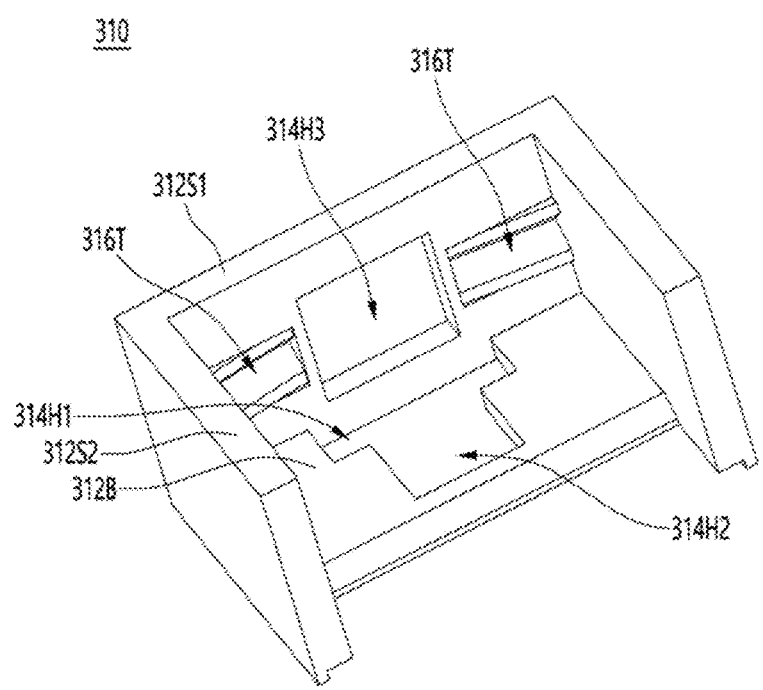

[FIG. 5b]
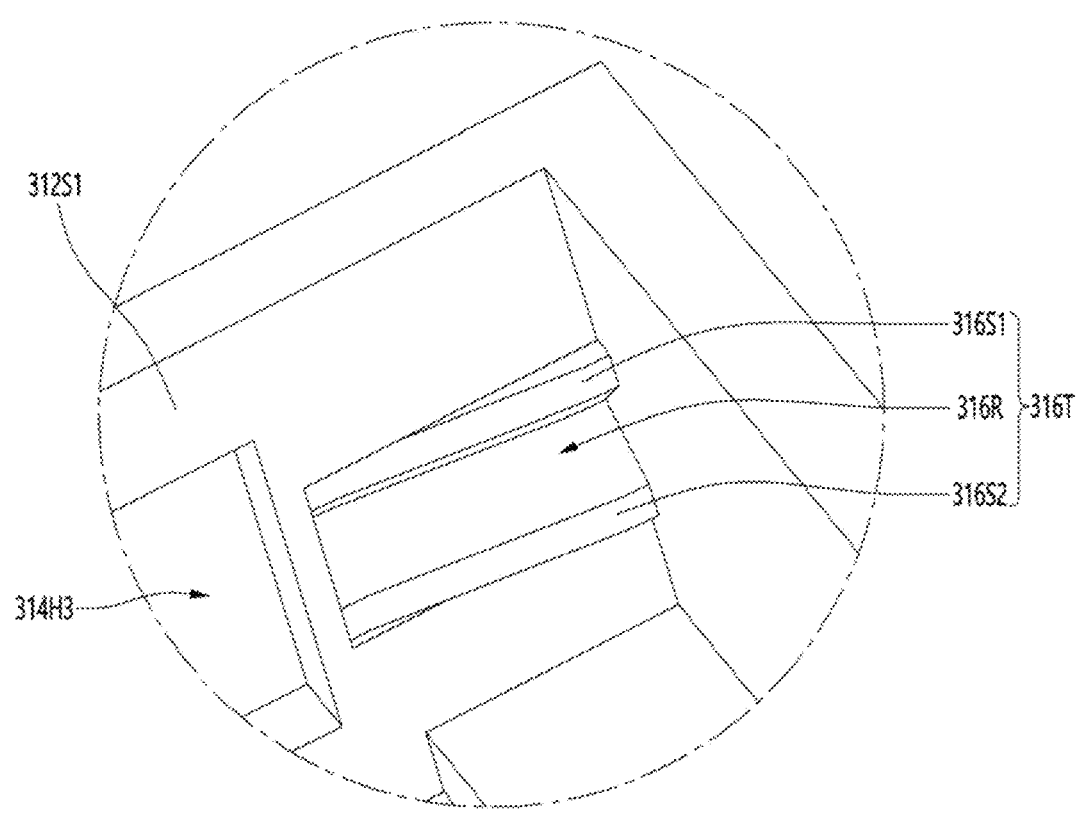

[FIG. 5c]
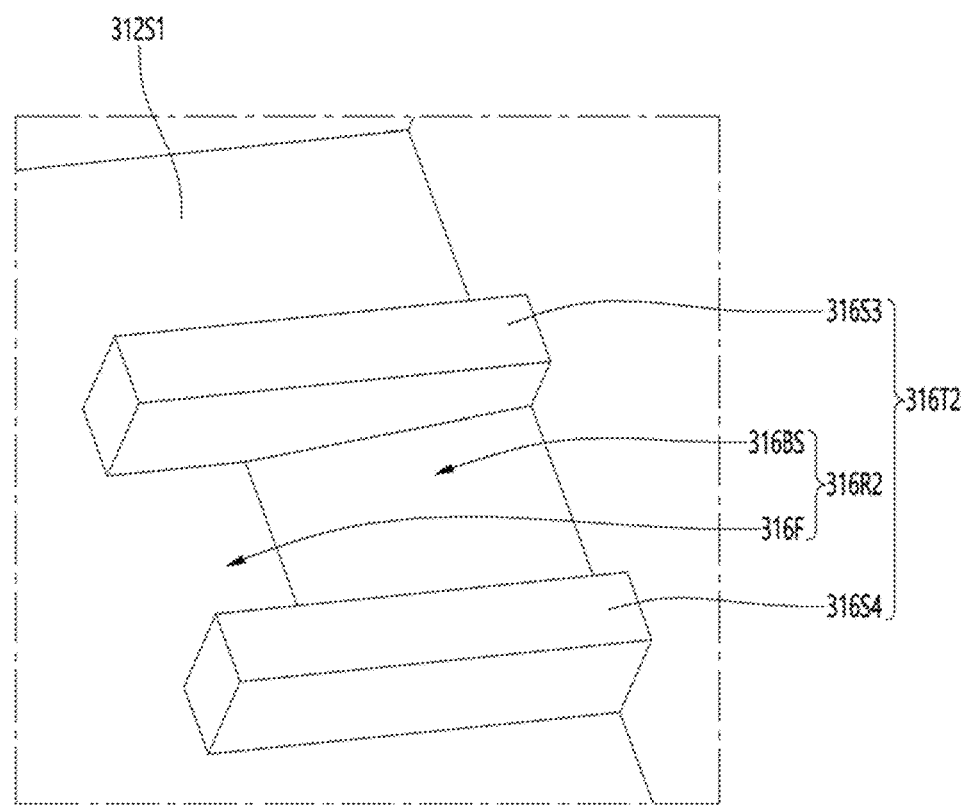

[FIG. 6a]
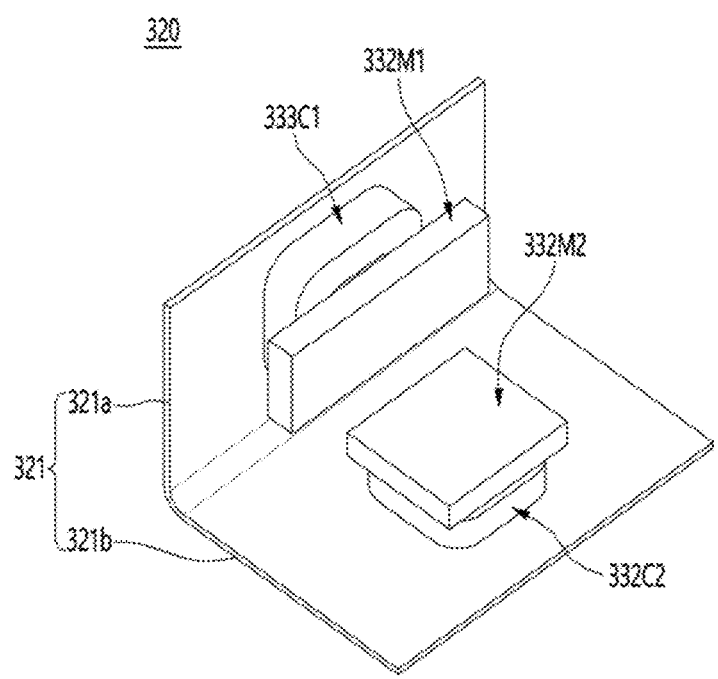

[FIG. 6b]
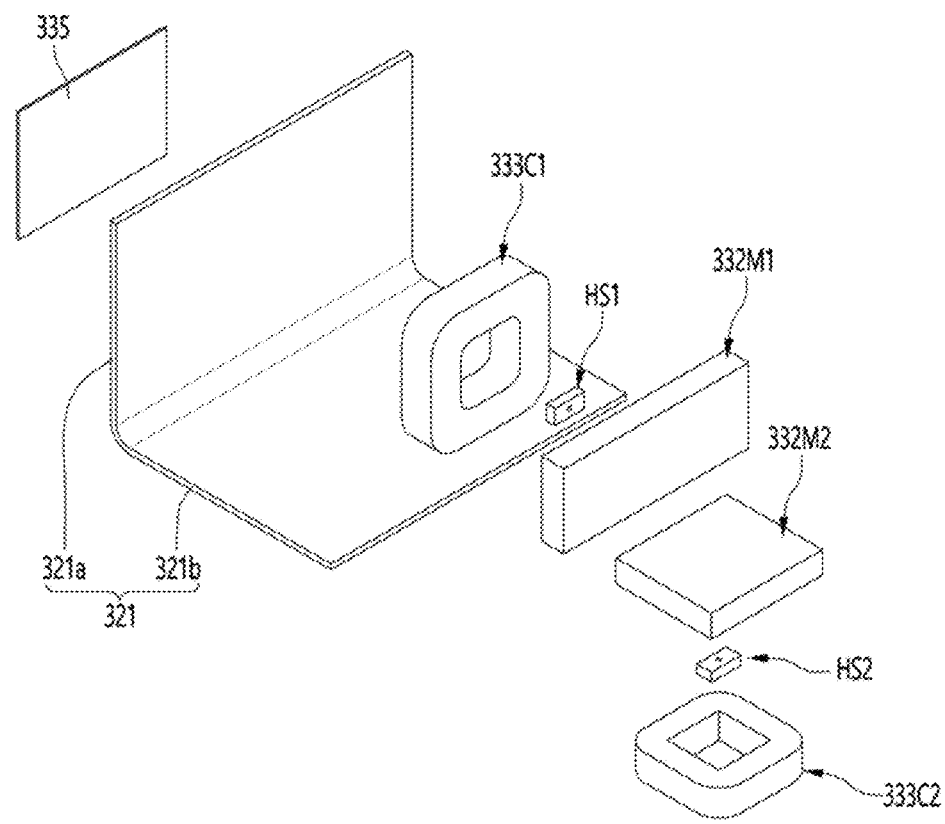

[FIG. 7a]
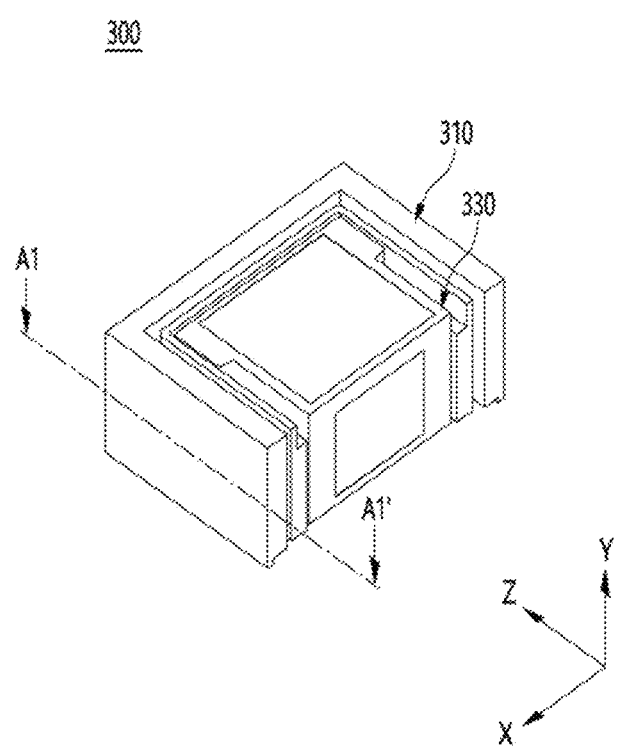

[FIG. 7b]
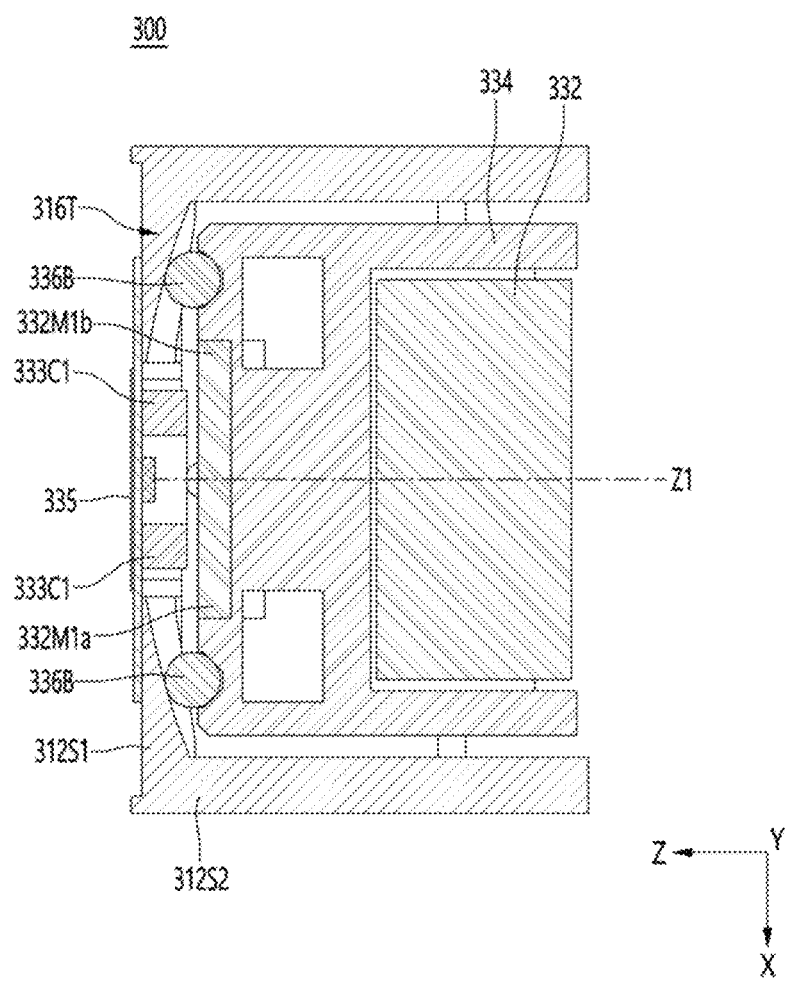

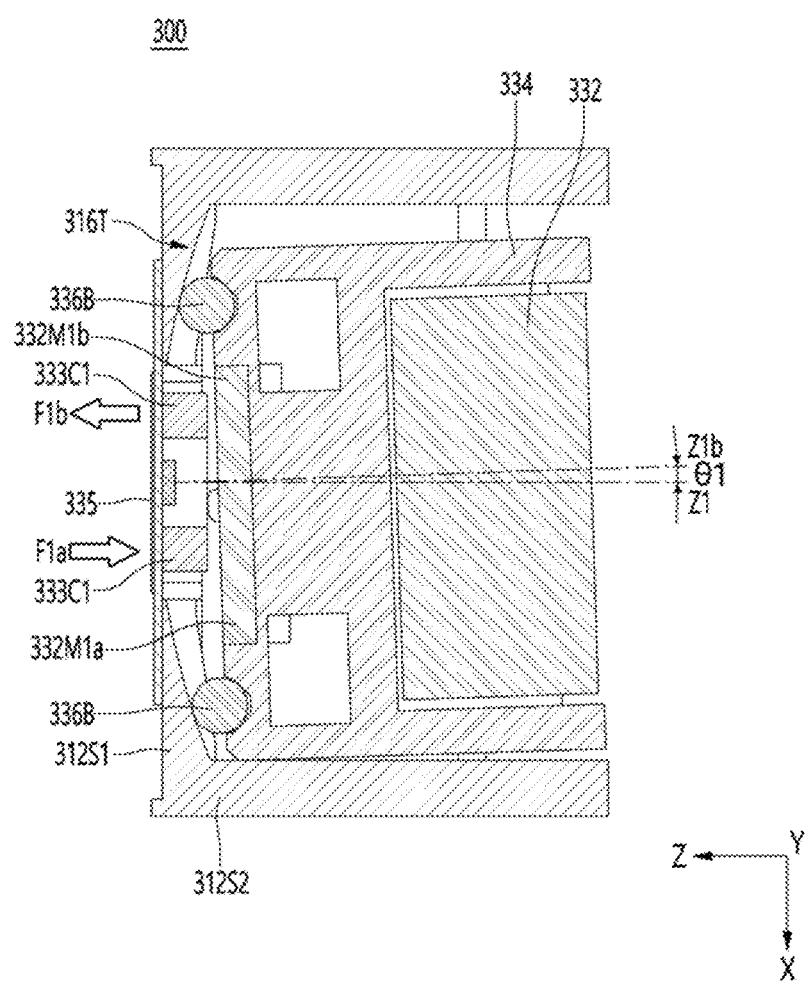
[FIG. 7c]

[FIG. 8a]
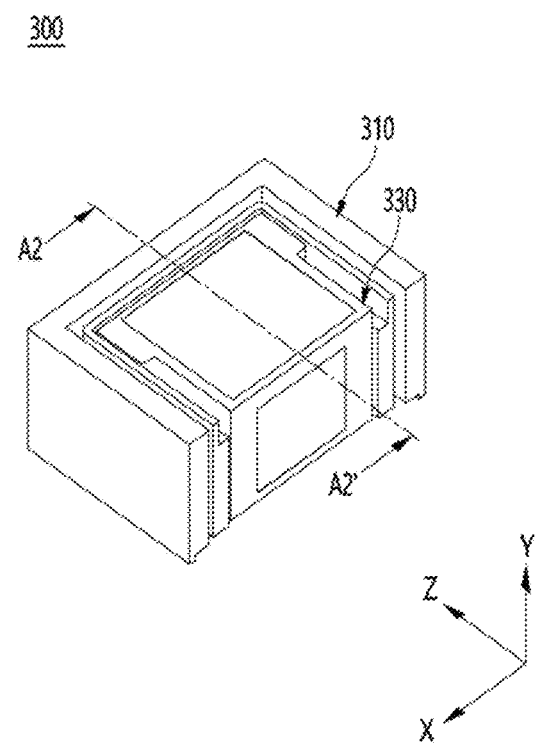

[FIG. 8b]
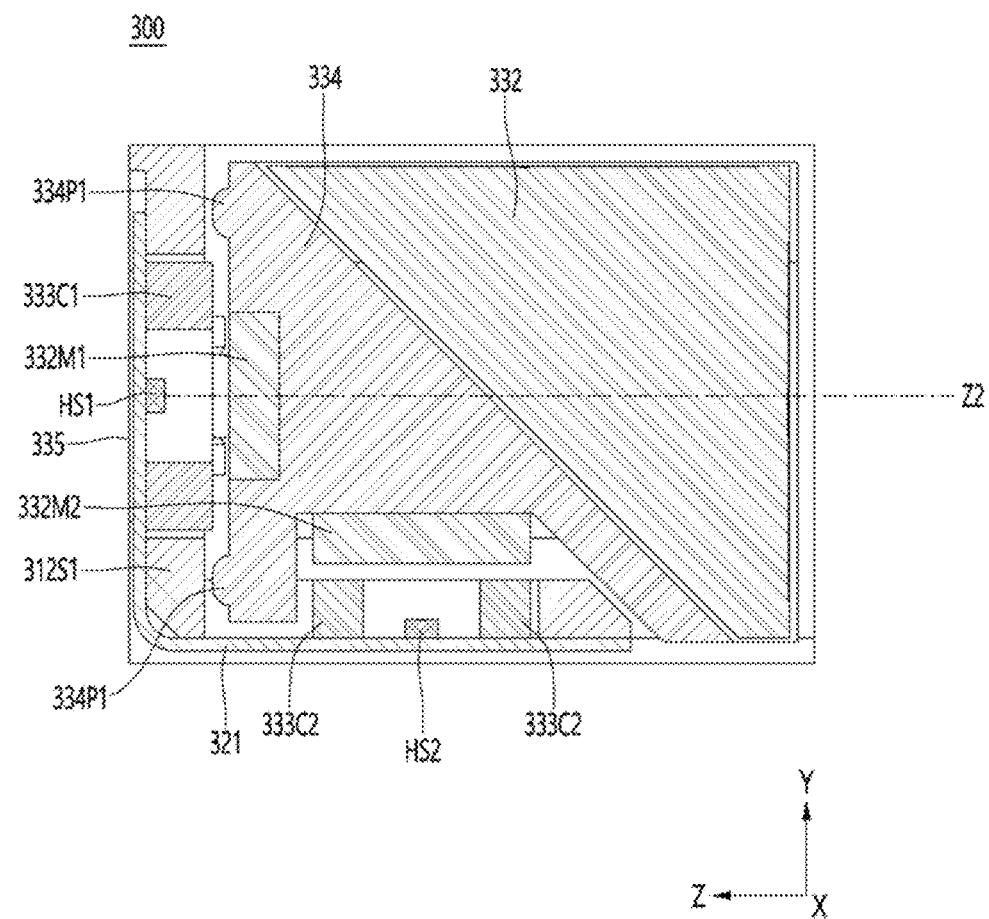

[FIG. 8c]
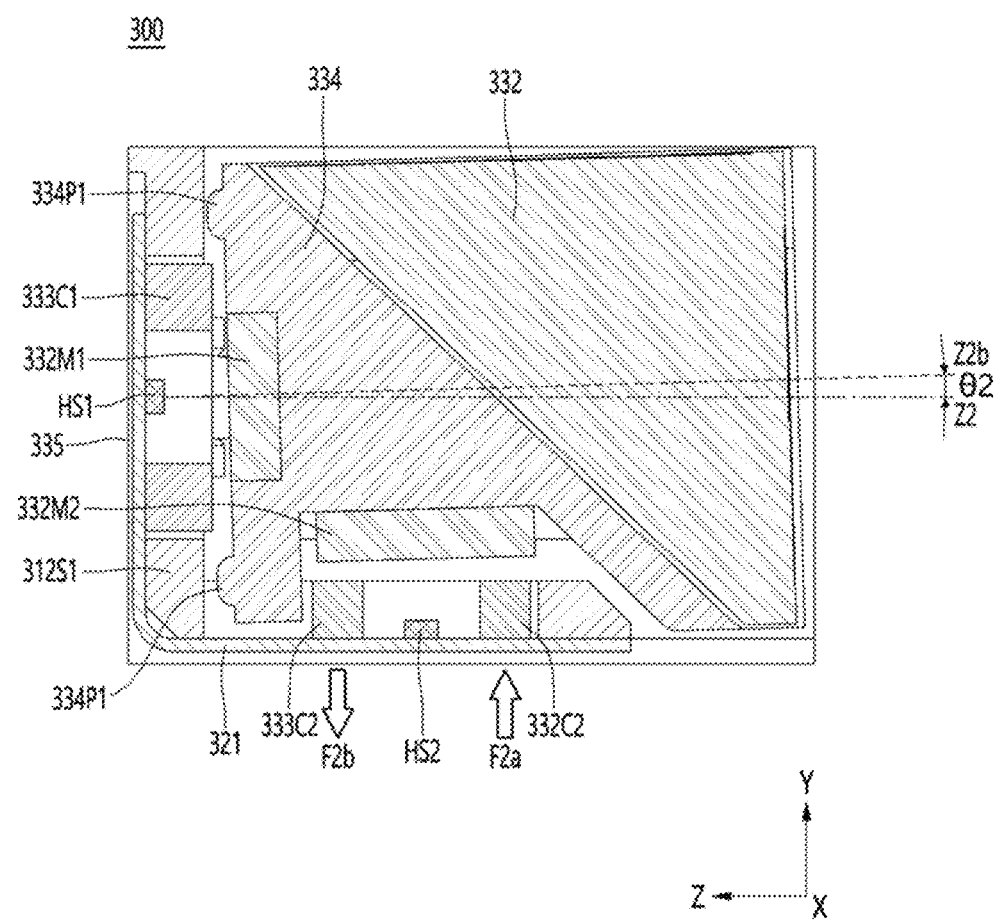

[FIG. 9a]
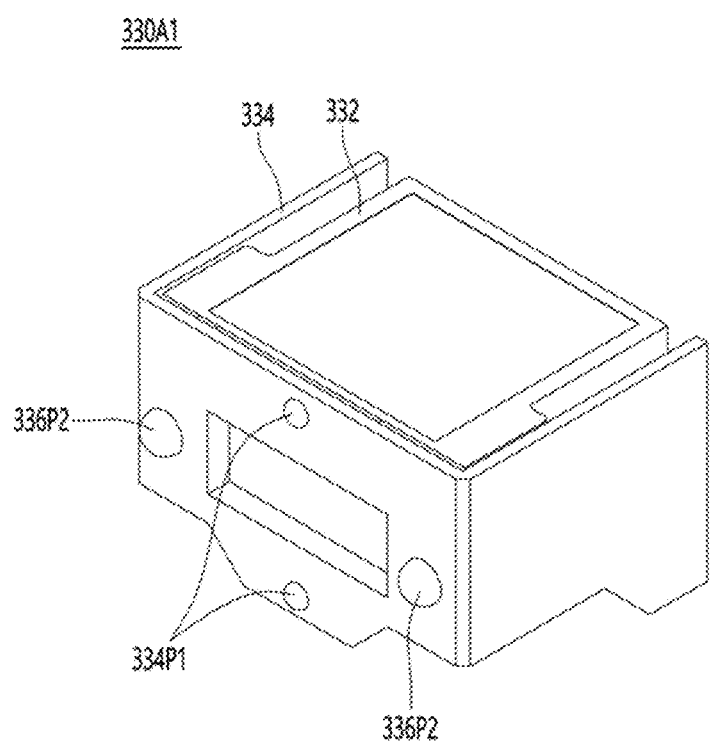

[FIG. 9b]
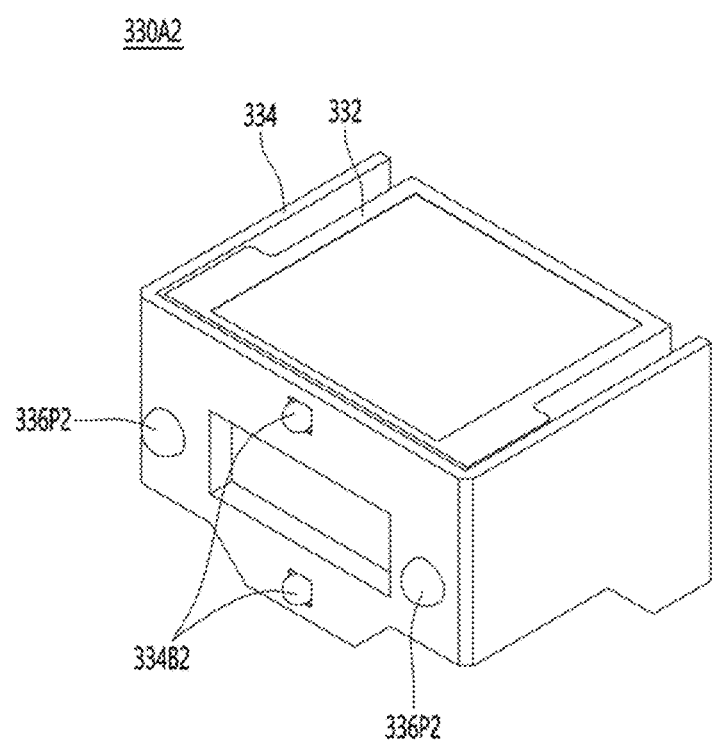

[FIG. 10]
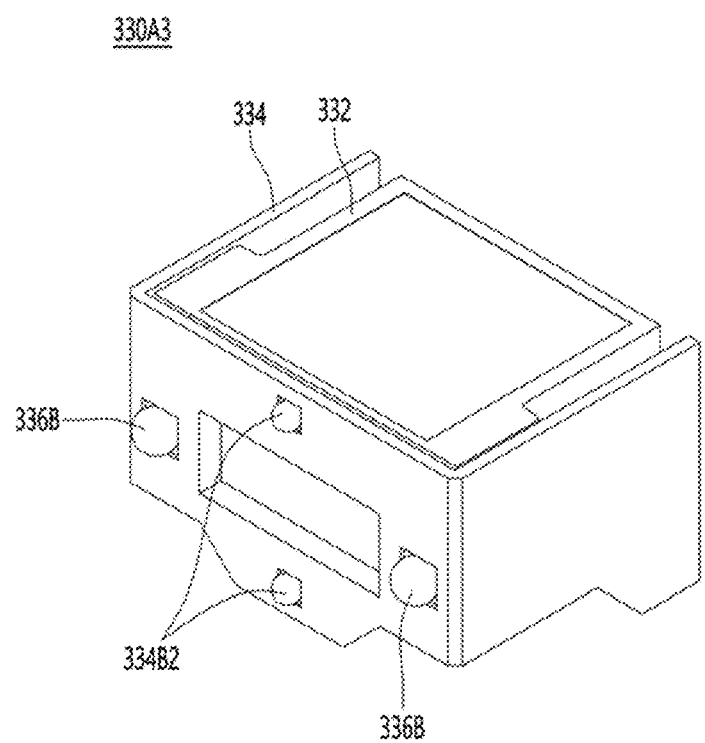

[FIG. 11a]
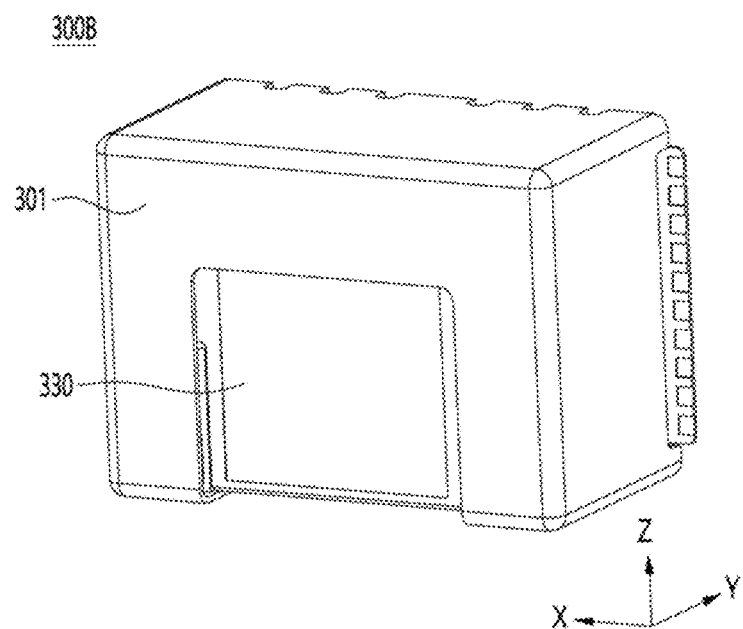

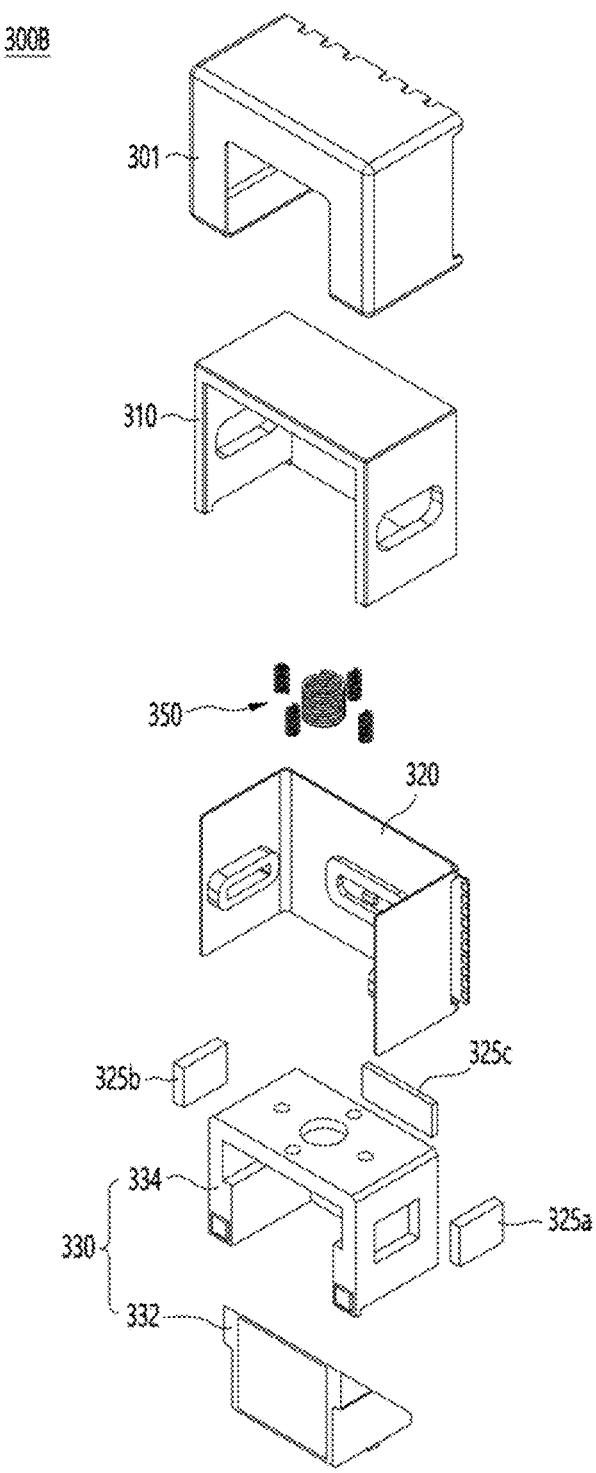
[FIG. 11b]

[FIG. 12a]
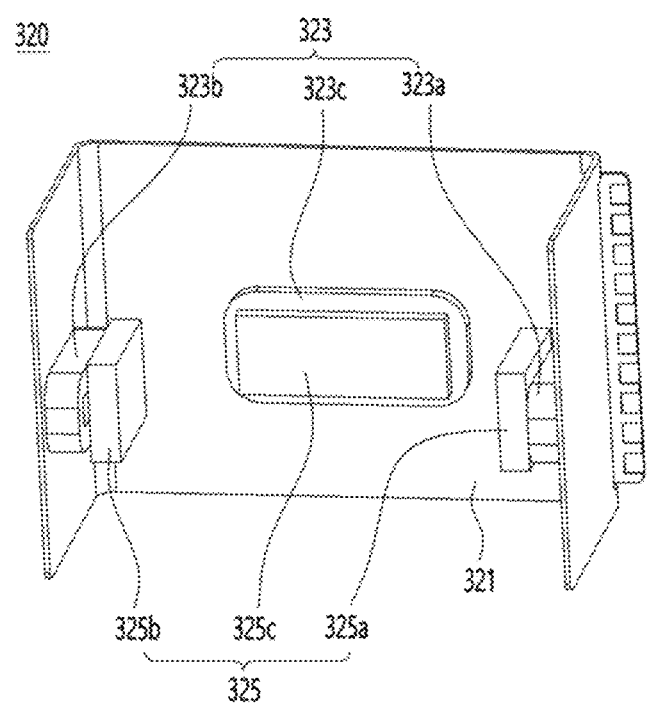

[FIG. 12b]
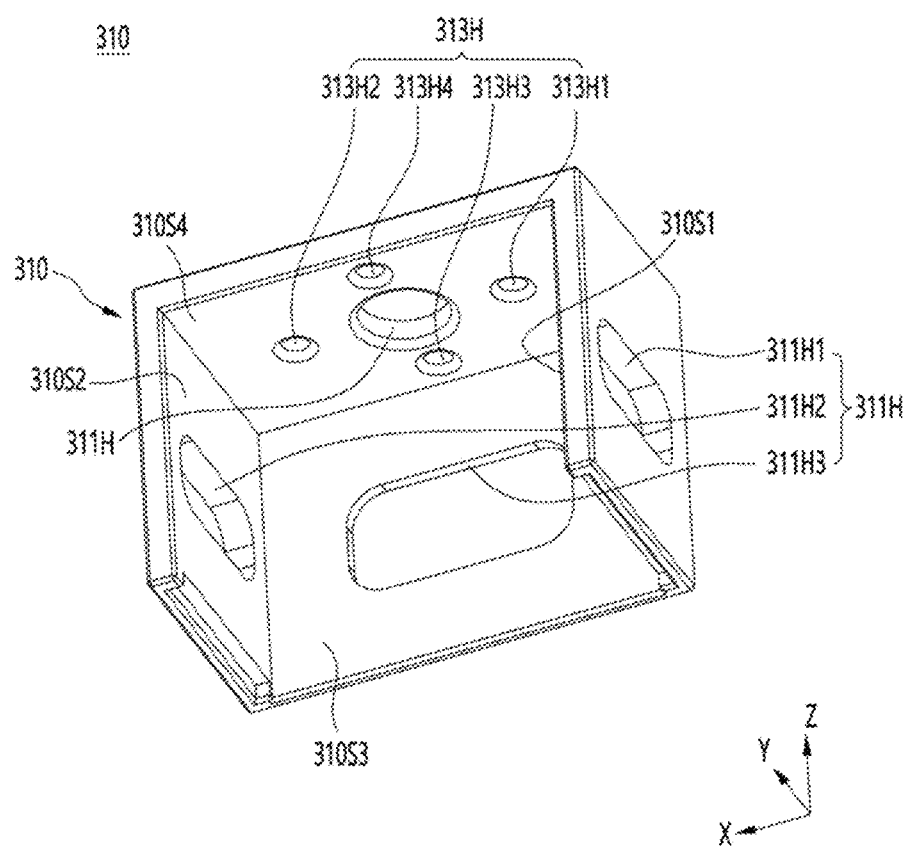

[FIG. 12c]
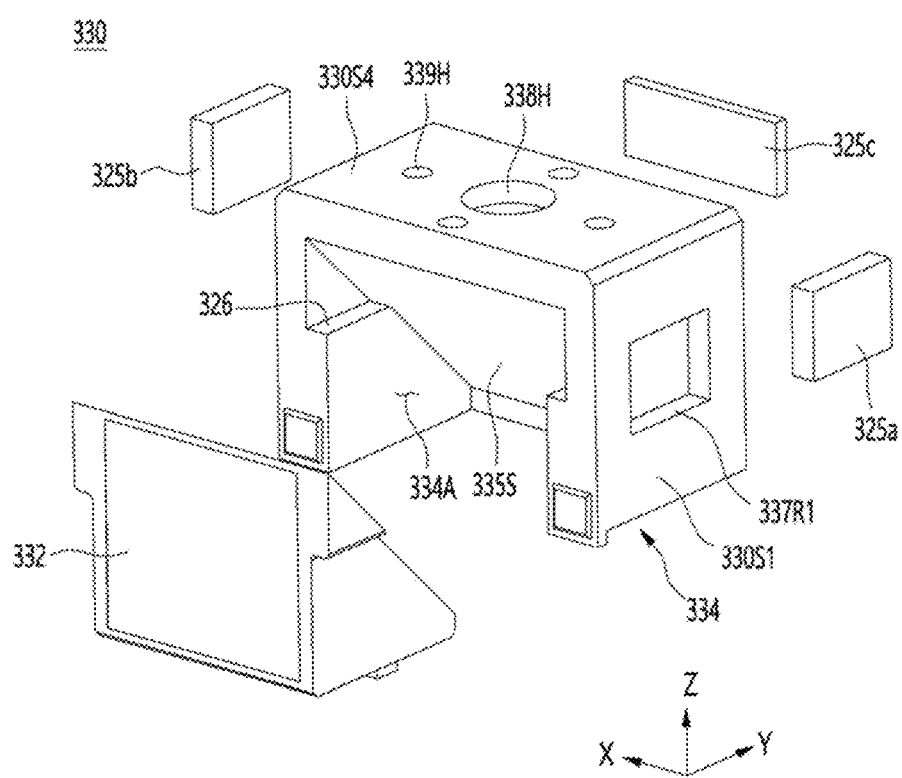

[FIG. 12d]
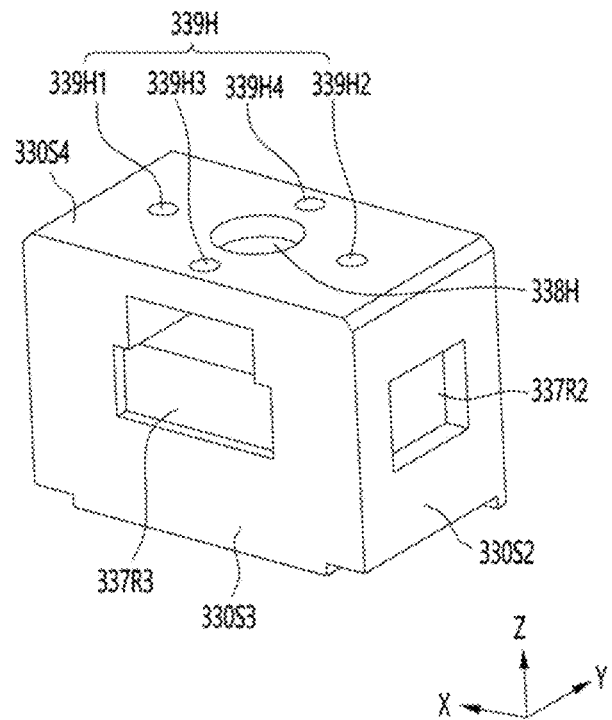
[FIG. 13]
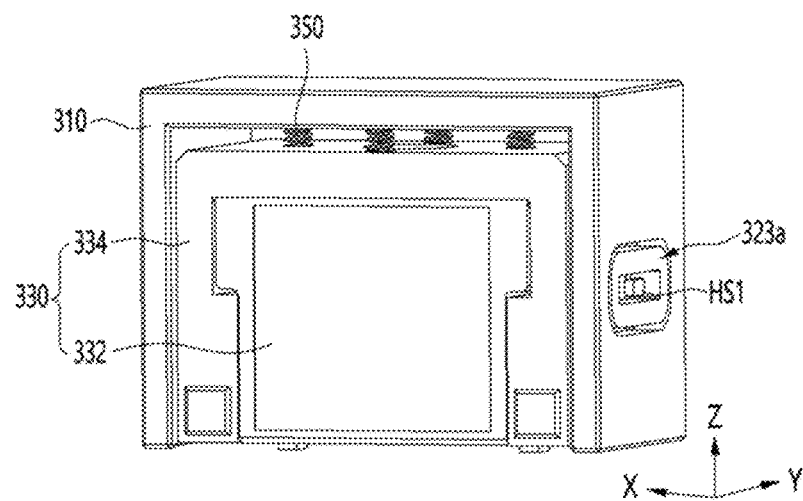

[FIG. 14]
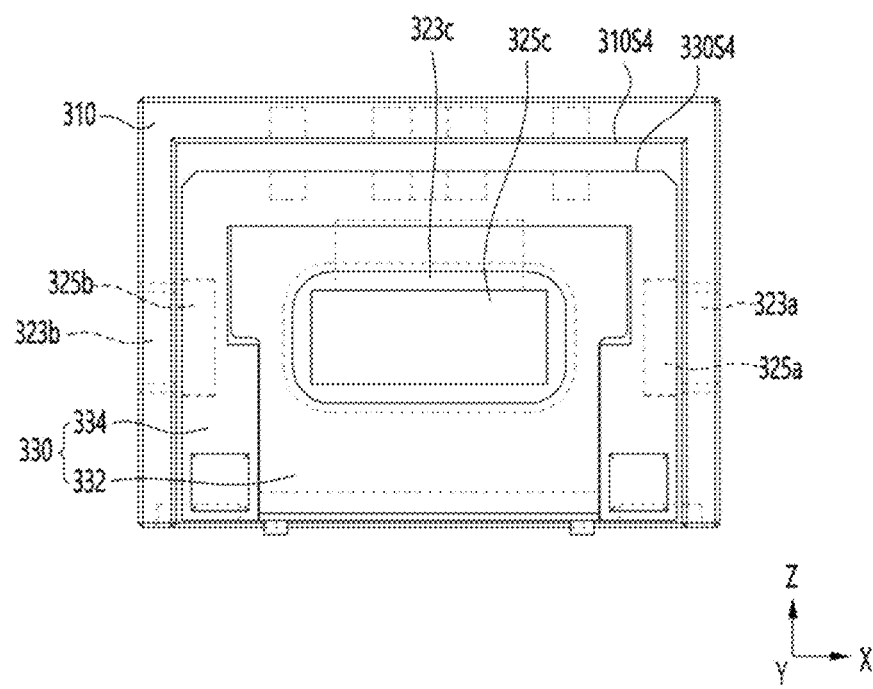

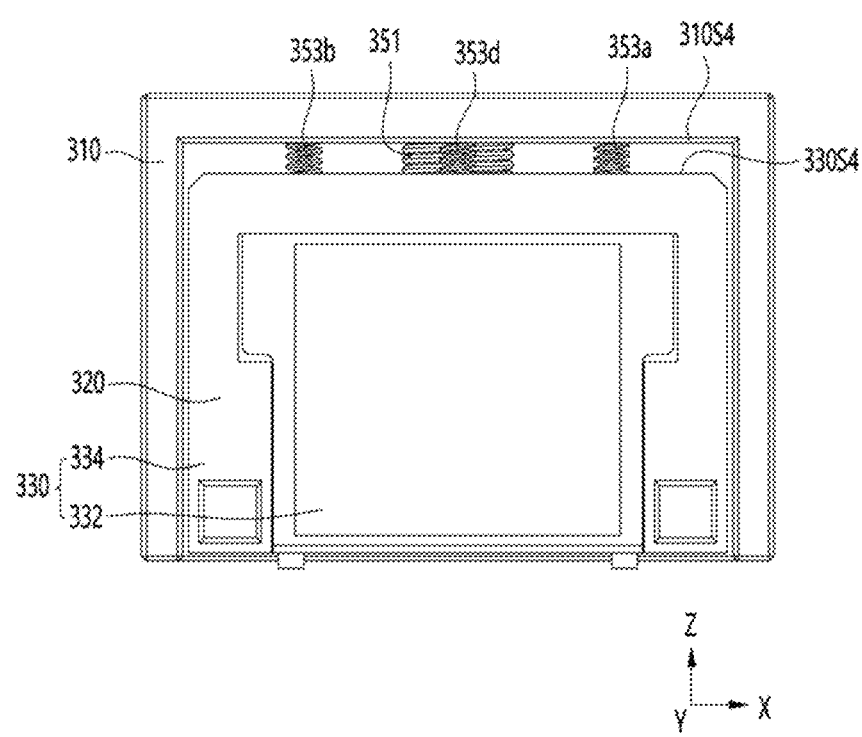
[FIG. 15]

[FIG. 16]
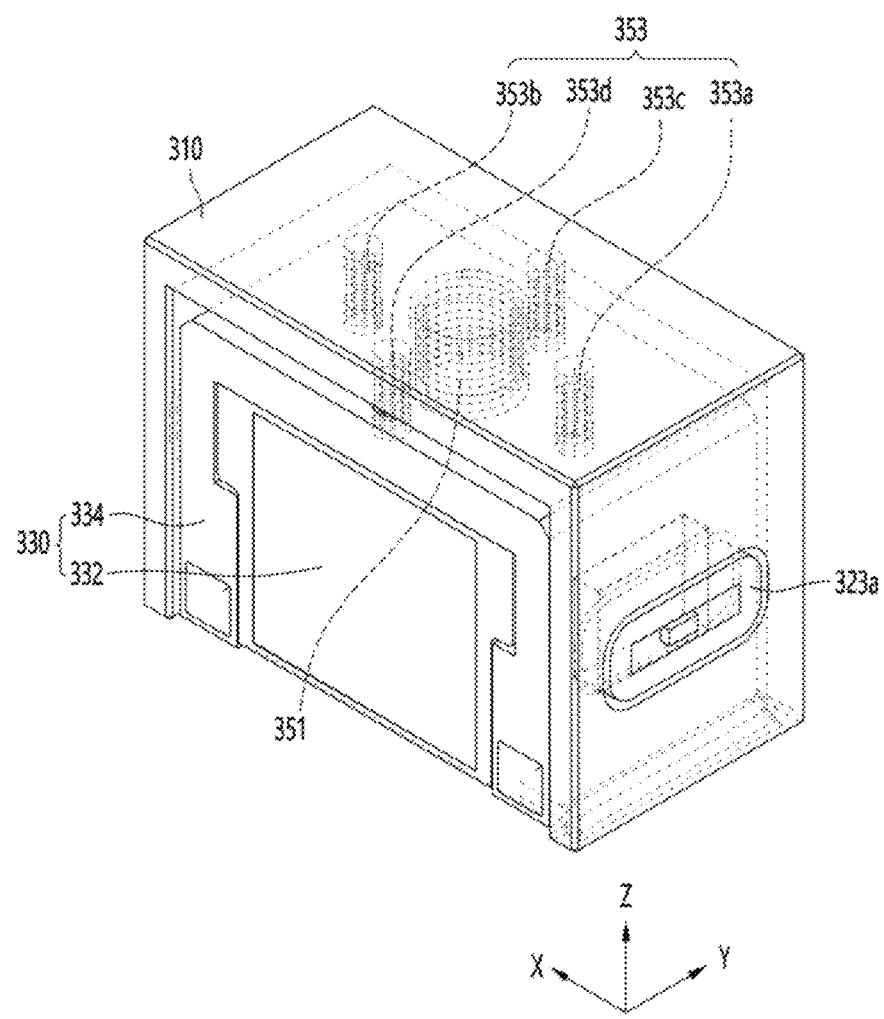

[FIG. 17a]
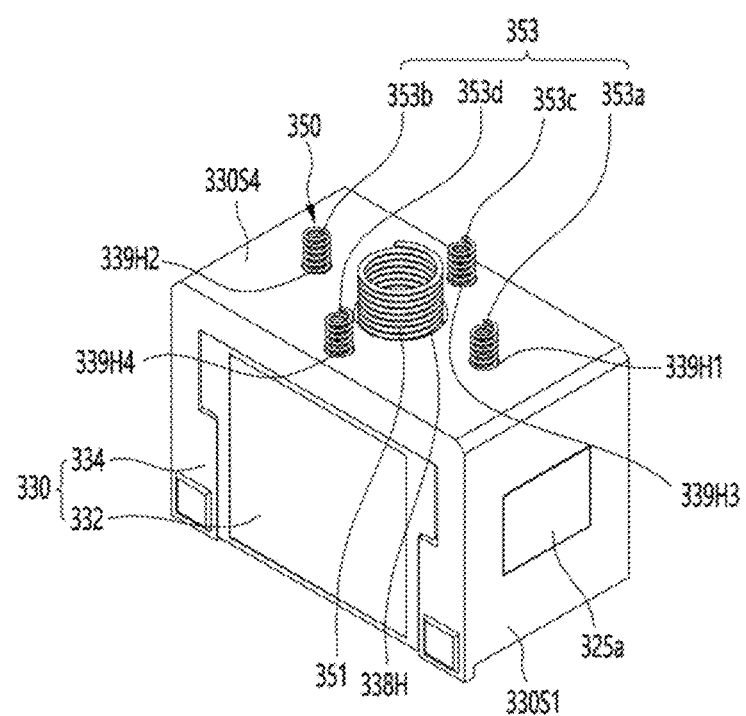

[FIG. 17b]
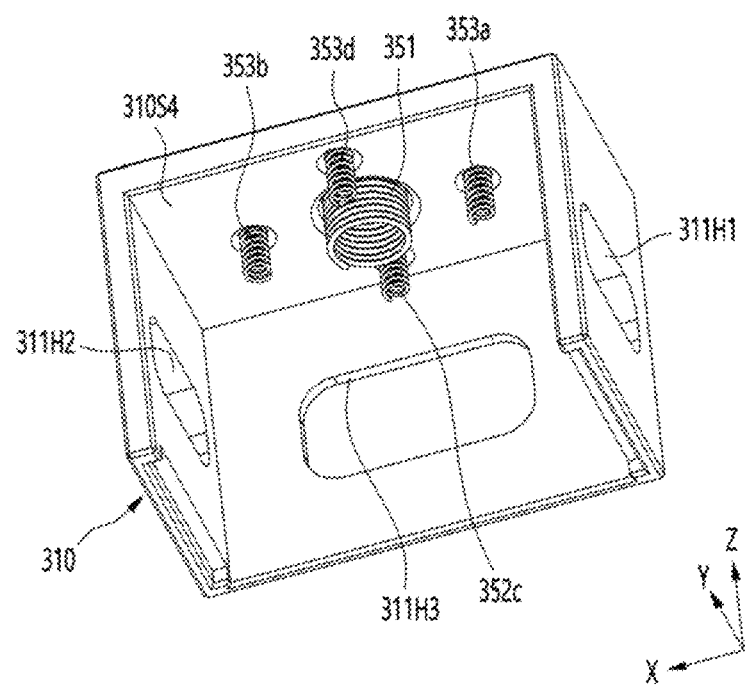

[FIG. 18a]
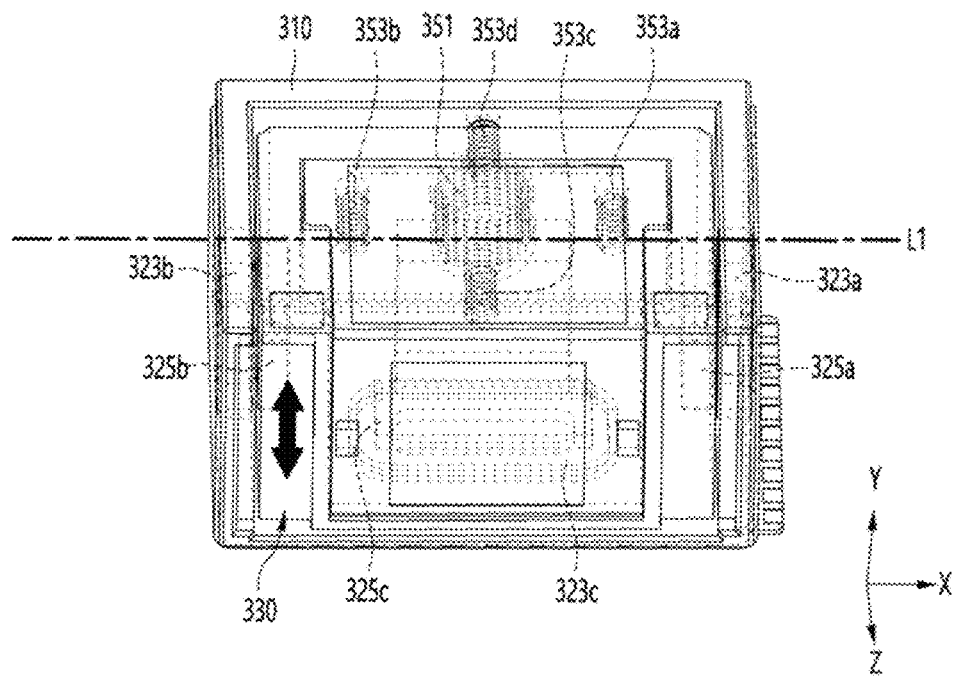

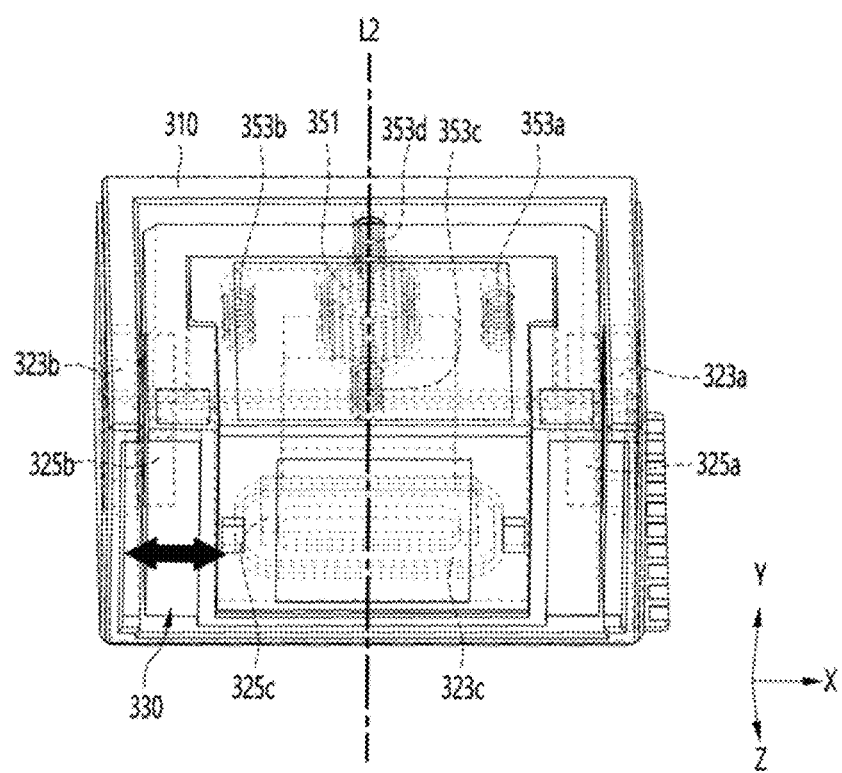
[FIG. 18b]

[FIG. 19]
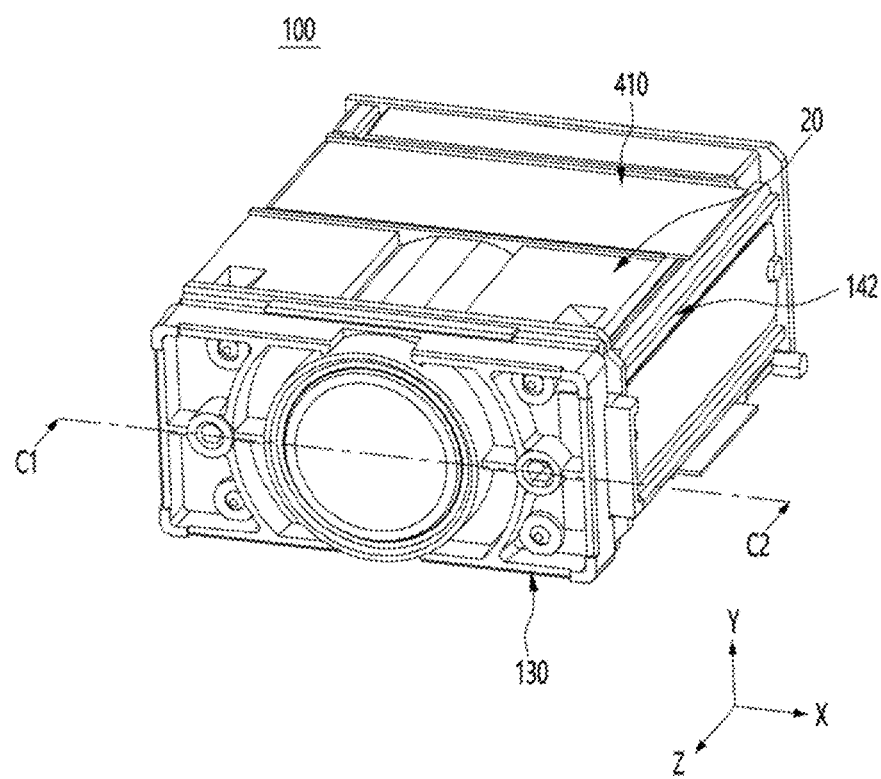

[FIG. 20]
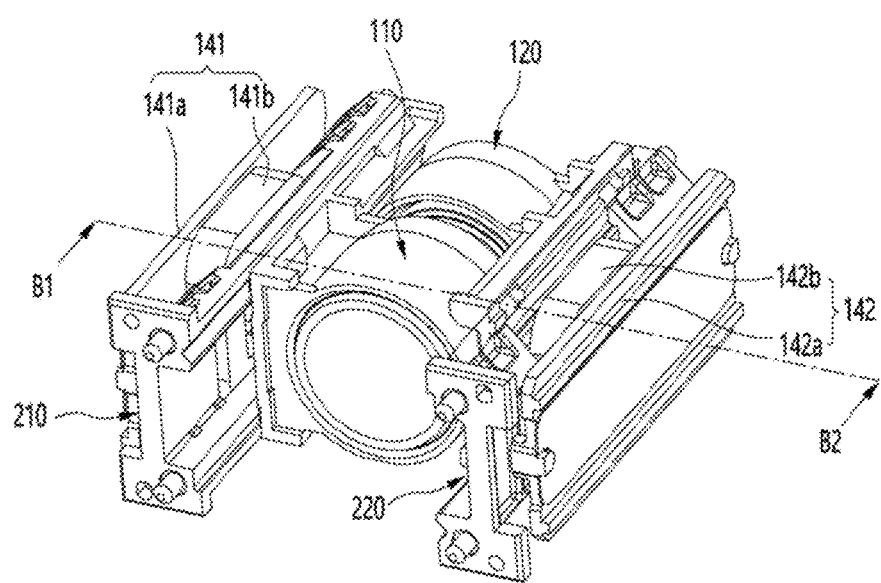

[FIG. 21]
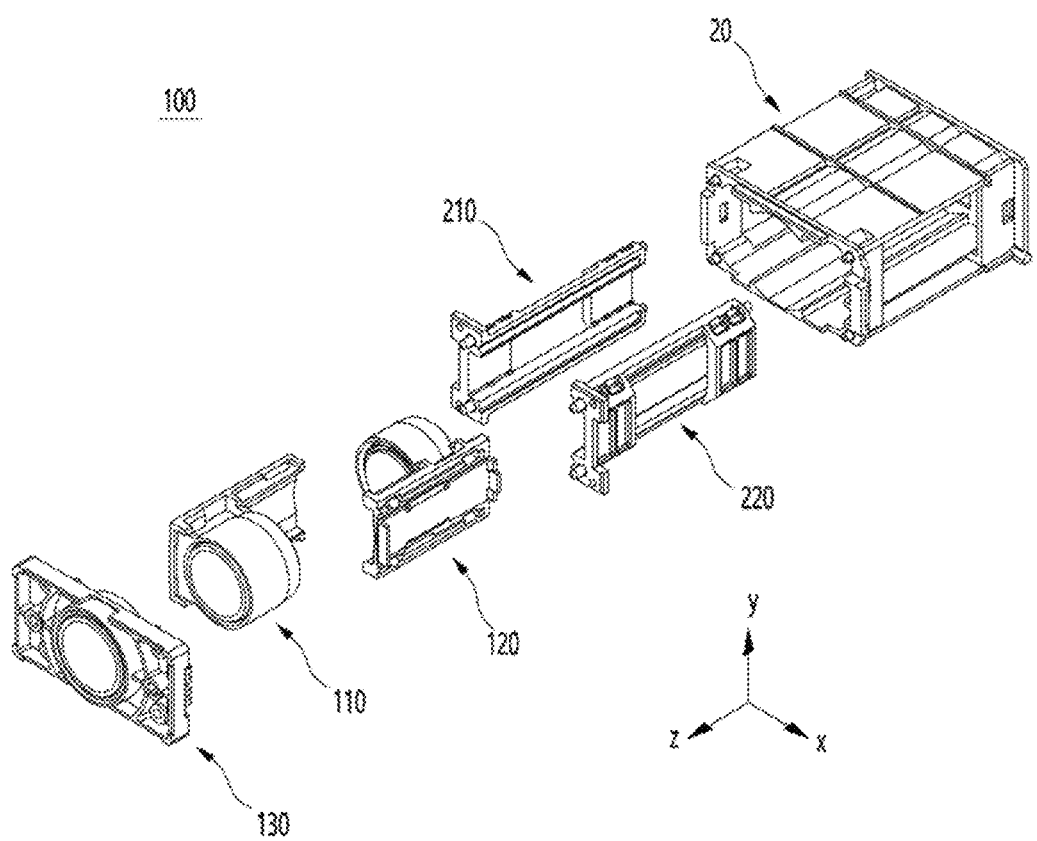

[FIG. 22]
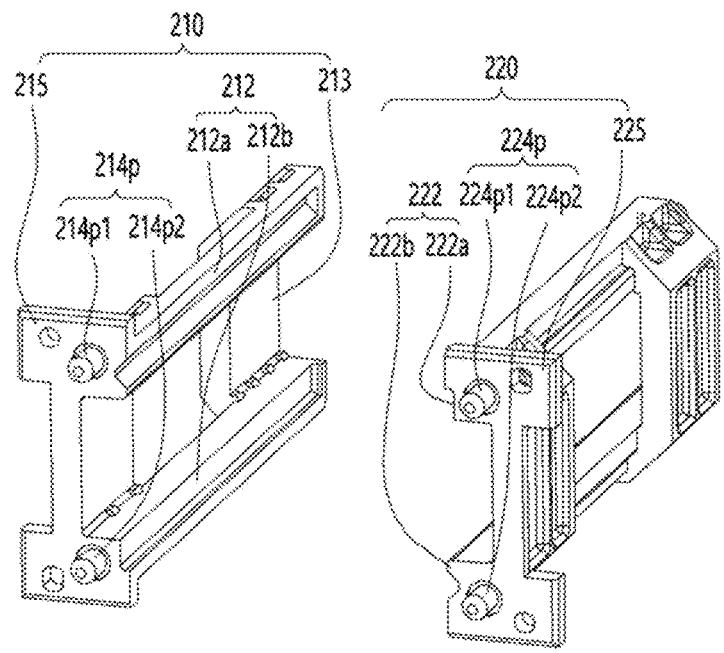
[FIG. 23a]
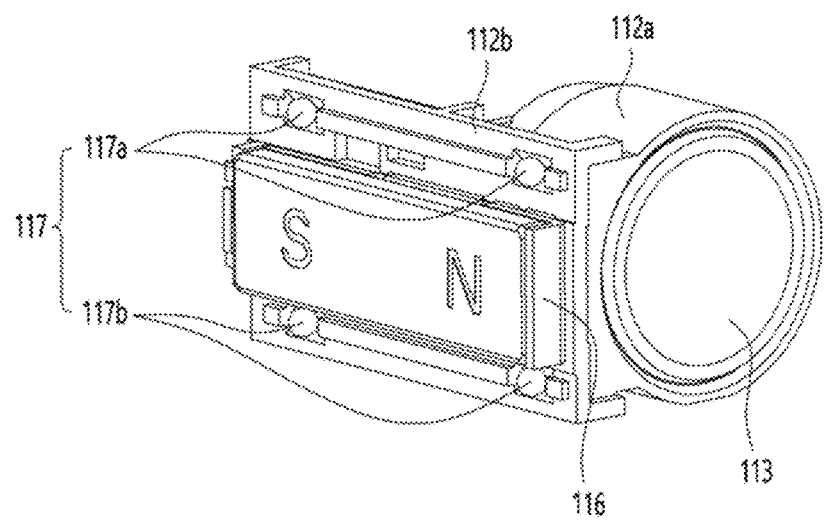

[FIG. 23b]
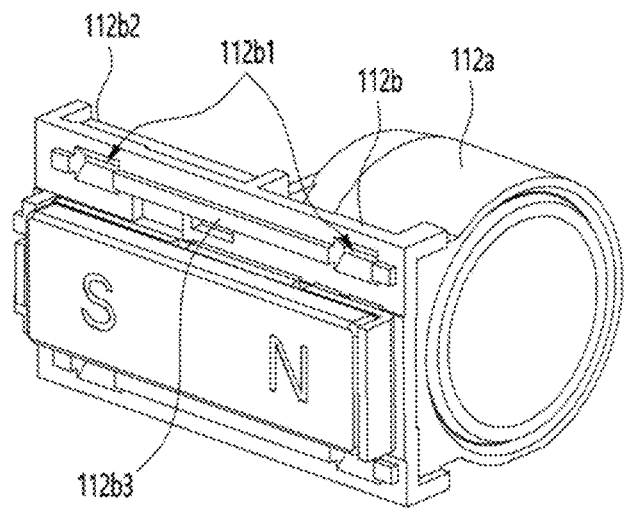
[FIG. 24]
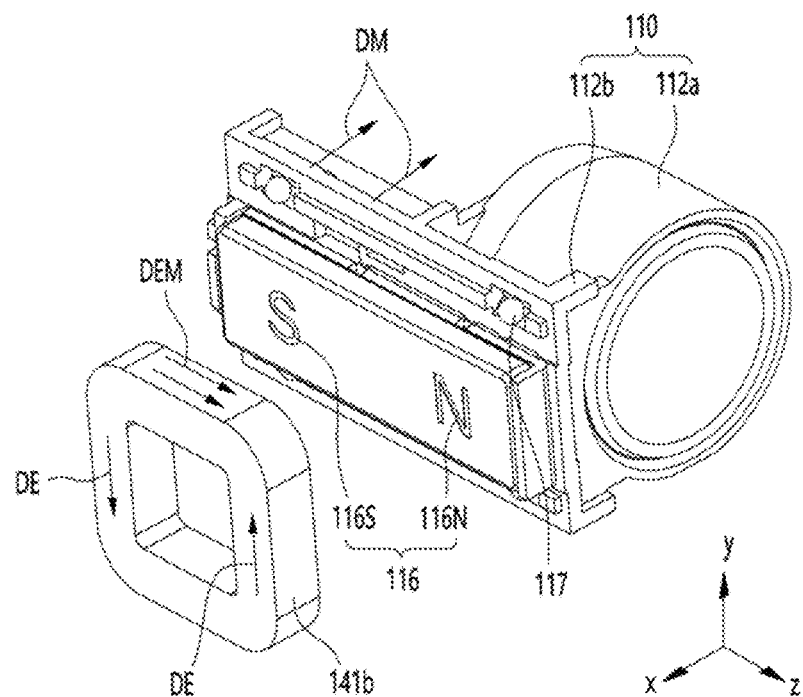

[FIG. 25]
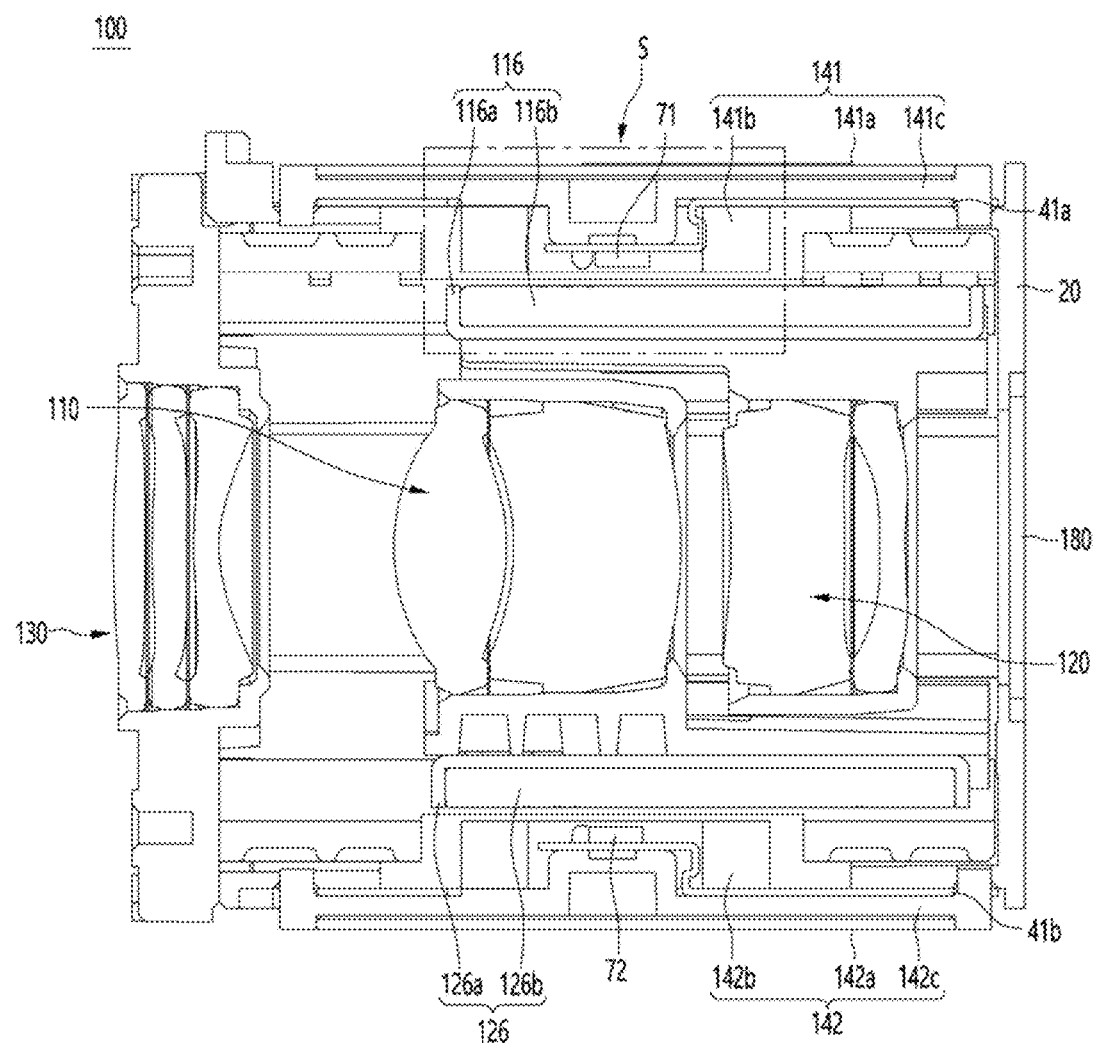

[FIG. 26a]
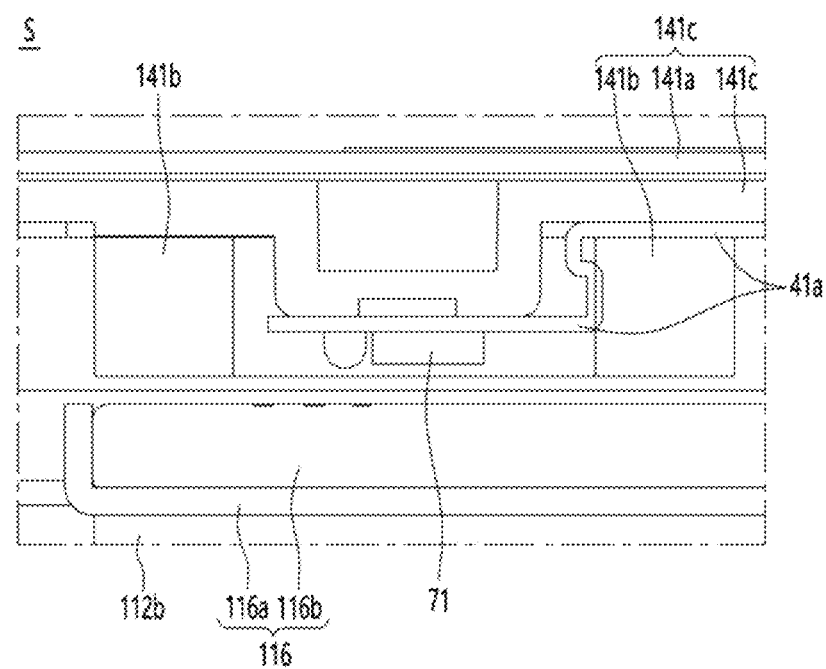

[FIG. 26b]
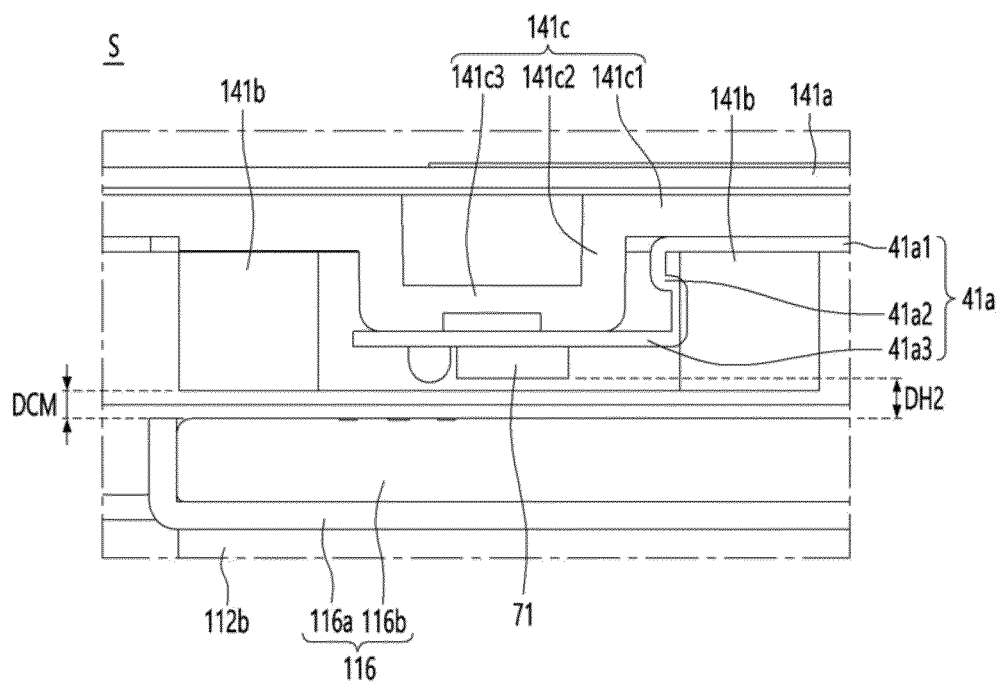
[FIG. 26c]
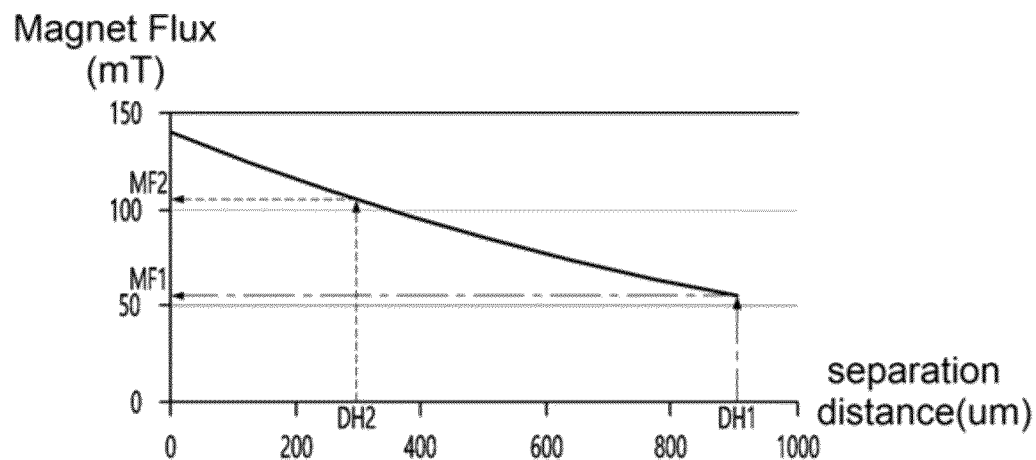

[FIG. 27a]
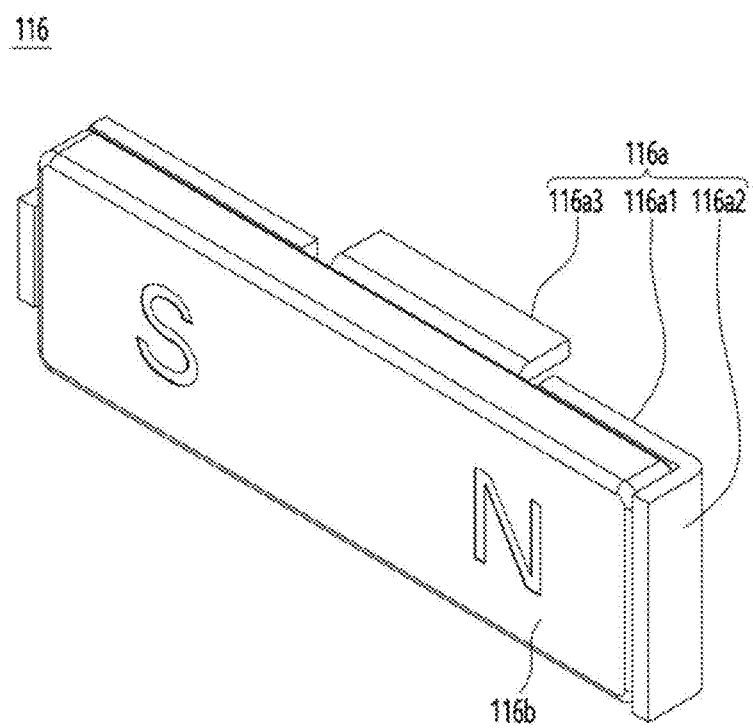

[FIG. 27b]
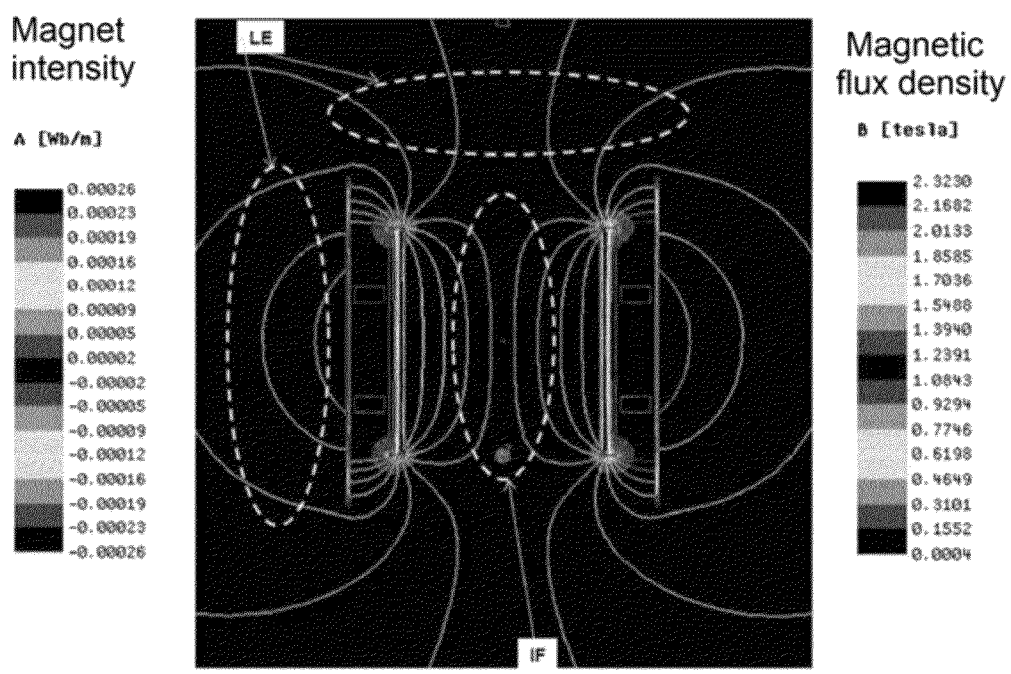

[FIG. 27c]
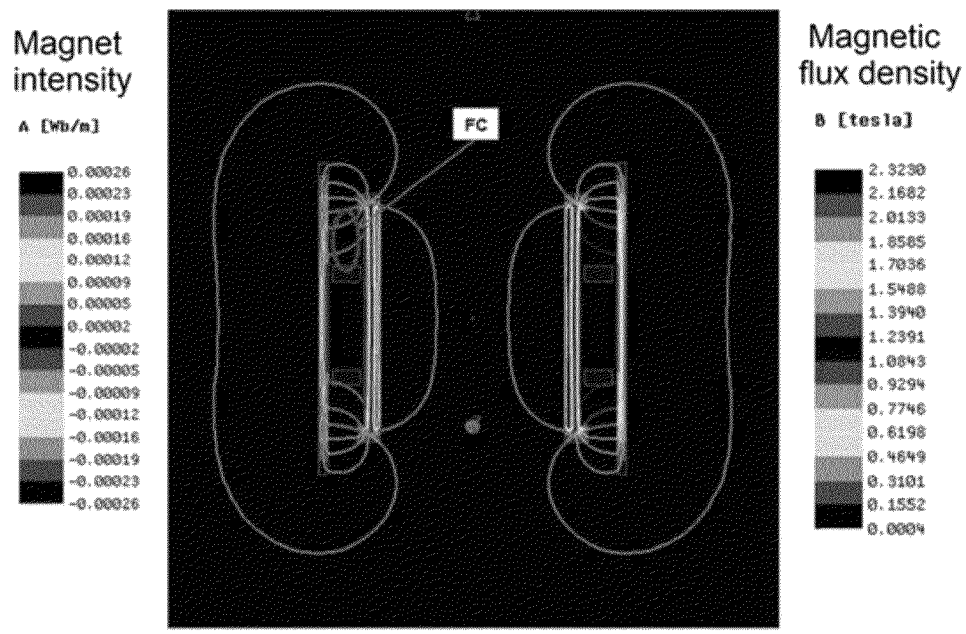
[FIG. 28]
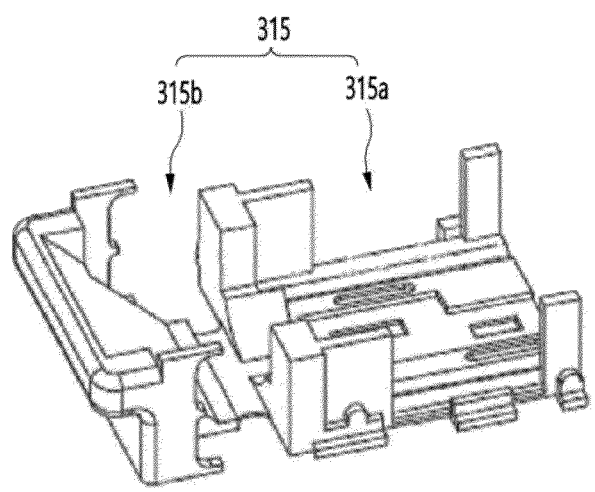

[FIG. 29]
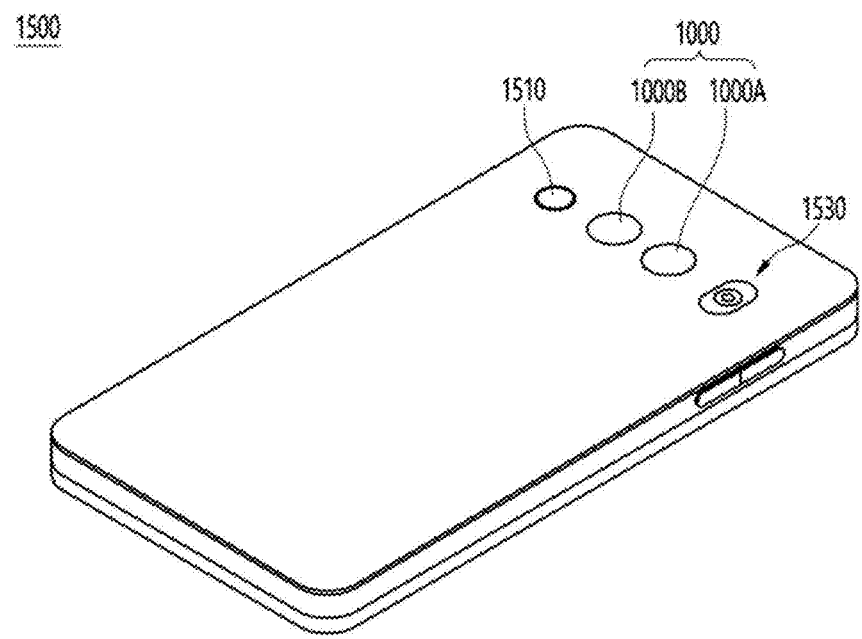

[FIG. 30]
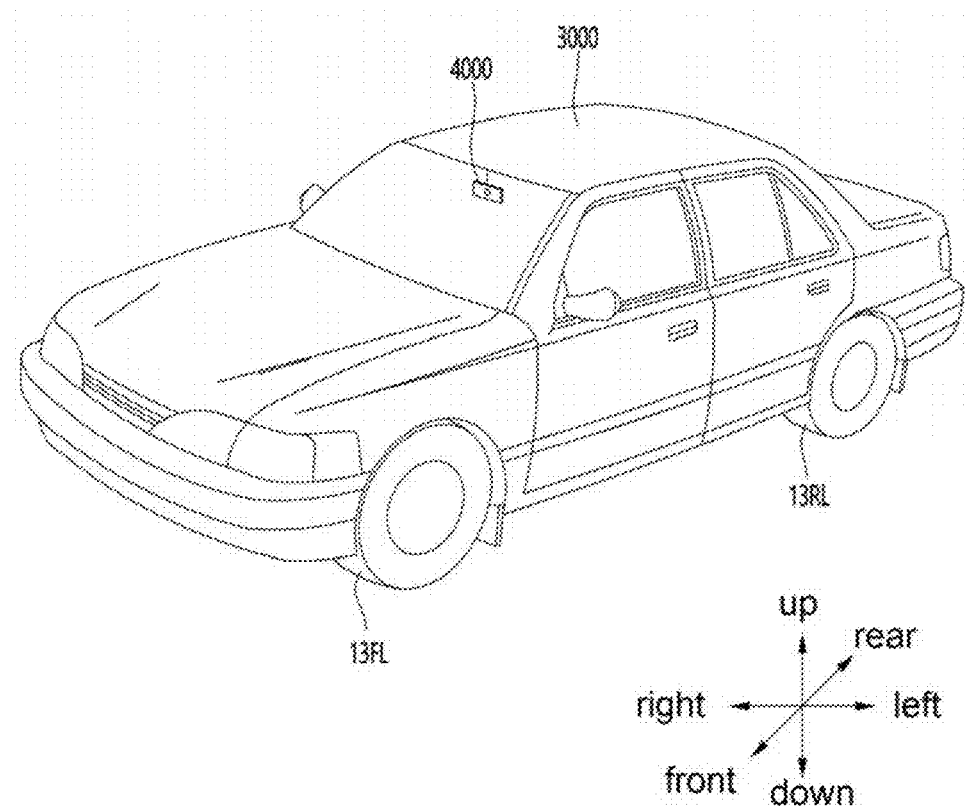

CAMERA ACTUATOR, CAMERA MODULE, AND CAMERA DEVICE INCLUDING SAME

CROSS REFERENCE TO RELATED APPLICATIONS

This application is the National Phase of PCT International Application No. PCT/KR2020/009294, filed on Jul. 15, 2020, which claims priority under 35 U.S.C. 119(a) to Patent Application No. 10-2019-0089082, filed in the Republic of Korea on Jul. 23, 2019 and Patent Application No. 10-2019-0091622, filed in the Republic of Korea on Jul. 29, 2019, all of which are hereby expressly incorporated by reference into the present application.

TECHNICAL FIELD

An embodiment relates to a camera actuator, a camera module and a camera device including same.

BACKGROUND ART

A camera module performs a function of photographing a subject and storing it as an image or a moving image, and is mounted on a mobile terminal such as a mobile phone, a laptop a drone, a vehicle, and the like.

Meanwhile, an ultra-small camera module is built into a portable device such as a smartphone, a tablet PC, and a notebook, and such a camera module may perform an autofocus (AF) function adjusting automatically a distance between an image sensor and a lens to adjust a focal length of the lens.

In addition, recently, a camera module may perform a zooming function of zooming up or zooming out photographing a subject by increasing or decreasing a magnification of a long-distance subject through a zoom lens.

Further, recently, a camera module adopts an image stabilization (IS) technology to correct or prevent image shake caused by camera movement due to an unstable fixing device or user movement.

Such an image stabilization (IS) technology includes an optical image stabilizer (OIS) technology and an image stabilization technology using an image sensor.

The OIS technology is a technology that corrects movement by changing a light path, and the image stabilization technology using the image sensor is a technology that corrects movement by mechanical and electronic methods, but the OIS technology is often used.

In addition, a vehicle camera module is a product for transmitting images around the vehicle or inside the vehicle to a display, and can be mainly used for parking assistance and driving assistance systems.

In addition, the vehicle camera module detects lanes and vehicles around the vehicle and collects and transmits related data, thereby enabling an ECU to warn or control the vehicle.

Meanwhile, a zoom actuator is used for a zooming function of a camera module, but frictional torque is generated when a lens is moved by mechanical movement of the actuator, and there are technical problems such as a decrease in driving force, an increase in power consumption, or a deterioration in control characteristics due to the friction torque.

Specifically, in order to achieve the best optical characteristics by using a plurality of zoom lens groups in a camera module, an alignment between the plurality of lens groups and an alignment between the plurality of lens groups and an image sensor should be well matched, but when a decentering in which a spherical center between the lens groups deviates from an optical axis, a tilt which is a phenomenon of lens tilt, or a phenomenon in which central axes of the lens groups and the image sensor are not aligned occurs, an angle of view changes or defocus occurs, which adversely affects image quality or resolution.

Meanwhile, when increasing a separation distance in a region in which friction occurs in order to reduce a friction torque resistance while moving a lens for a zooming function in a camera module, there is a contradiction in technical problems in which a lens decentering or a lens tilt are deepened when zoom movement or reversal of the zoom movement is performed.

Meanwhile, in an image sensor, as a pixel is higher, a resolution increases and a size of the pixel becomes smaller, and when the size of the pixel becomes smaller, an amount of light received at the same time will be reduced. Therefore, in a darker environment, in a high-pixel camera, image shake due to camera shake that occurs while a shutter speed is slower occurs more seriously.

Accordingly, recently, an OIS function has been indispensable for photographing an image without deformation using a high-pixel camera in dark nights or moving images.

Meanwhile, OIS technology is a method to correct image quality by changing the light path by moving a lens or an image sensor of a camera. In particular, in the OIS technology, movement of the camera is sensed through a gyro sensor, and a distance that the lens or the image sensor should move based on the movement is calculated.

For example, an OIS correction method includes a lens moving method and a module tilting method. In the lens moving method, only a lens in a camera module is moved in order to realign the center of an image sensor and an optical axis. On the other hand, the module tilting method is a method of moving the entire module including the lens and the image sensor.

Specifically, the module tilting method has an advantage that a correction range is wider than that of the lens moving method and a focal length between the lens and the image sensor is fixed, and thus image deformation may be minimized.

Meanwhile, in case of the lens moving method, a hall sensor is used to sense a position and movement of the lens. On the other hand, in the module tilting method, a photo reflector is used to sense movement of the module. However, both methods use a gyro sensor to sense movement of a user of the camera.

An OIS controller uses data recognized by the gyro sensor to predict a position in which the lens or the module should move in order to compensate for movement of a user.

Recently, an ultra-thin and ultra-small camera module is required in accordance with technological trends, but since the ultra-small camera module has a space limitation for OIS drive, there is a problem that it is difficult to implement the OIS function applied to a general large camera, and there is a problem that the ultra-thin and ultra-small camera module cannot be implemented when the OIS drive is applied.

On the other hand, according to unpublished internal technology, the light path is controlled by using a predetermined variable lens for driving the OIS. However, in recent camera modules, the higher the pixel camera, the larger the size of the variable lens for OIS driving is to increase the amount of light received for clearer image quality, but when the size of the variable lens is increased, the thickness of the camera module is limited, and there is a technical contradiction in which the size of the variable lens cannot be increased to a required level.

In addition, in the conventional OIS technology, an OIS driver is disposed at a side surface of a solid-state lens assembly within a limited camera module size, and thus there is a problem that it is difficult to secure a sufficient amount of light because a size of a lens to be subjected to OIS is limited.

Specifically, in order to achieve the best optical characteristics in a camera module, an alignment between the lens groups at the time of OIS implementation should be well matched through movement of a lens or tilting of a module, but in the conventional OIS technology, when a decenter in which a spherical center between the lens groups deviates from an optical axis or a tilt which is a phenomenon of lens tilt occurs, there is a problem that adversely affects image quality or resolution.

In addition, the conventional OIS technology may implement AF or Zoom at the same time as OIS driving, but an OIS magnet and an AF or Zoom magnet are disposed close to each other due to space limitation of a camera module and a position of a driving unit of the conventional OIS technology, and cause a magnetic field interference, and thus there is a problem that the OIS driving is not performed normally, and a decent or a tilt phenomenon is induced.

Further, in the conventional OIS technology, since a mechanical driving device is required for moving the lens or tilting the module, there is a problem that a structure is complicated and power consumption is increased.

Meanwhile, as described above, the camera module may be applied to a vehicle together with a radar and the like to be used in an advanced driver assistance system (ADAS), and accordingly, this may greatly affect not only the convenience of the driver, but also the safety or life of the driver or pedestrian.

For example, Advanced Driver Assistance Systems (ADAS) includes Autonomous Emergency Braking (AEB), which automatically slows down or stops in the event of a collision without the driver stepping on the brake, Lane Keep Assist System (LKAS), which maintains the lane by adjusting the driving direction in case of lane departure, Advanced Smart Cruise Control (ASCC), which maintains a distance from the vehicle in front while driving at a predetermined speed, Active Blind Spot Detection (ABSD), which detects the risk of collision in the blind spot and helps to change into a safe lane, and Around View Monitor (AVM) that visually shows the surroundings of the vehicle, etc.

In this advanced driver assistance system (ADAS), the camera module functions as a core part together with radar, and the proportion of the camera module application is gradually increasing.

For example, in the case of an automatic emergency braking system (AEB), it detects a vehicle in front or a pedestrian using a front camera sensor and a radar sensor, and it is possible to automatically provide emergency braking when the driver does not control the vehicle.

Alternatively, in the case of the Driving Steering Assist System (LKAS), the camera sensor detects whether the driver leaves the lane without manipulation such as direction indication, and it is possible to automatically steer the steering wheel to maintain the lane.

In addition, in the case of an Around View Monitoring System (AVM), it is possible to visually show the surroundings of the vehicle through camera sensors placed on all sides of the vehicle.

When the camera module is applied to a vehicle's advanced driver assistance system (ADAS), the OIS technology becomes more important due to the vibration of the vehicle, and the precision of OIS data can be directly related to the safety or life of drivers and pedestrians. In addition, when implementing AF or zoom, a plurality of lens assemblies are driven by electromagnetic force between magnets and coils, but there is a problem in that magnetic field interference occurs between magnets mounted on each lens assembly. Due to magnetic field interference between these magnets, AF or zoom operation is not properly performed, so there is a problem in that thrust is lowered.

Also, there is a problem of causing a decent or tilt phenomenon due to magnetic field interference between magnets.

If there is an issue in the precision of camera control or the thrust is lowered due to such magnetic field interference, or if a decent or tilt phenomenon is induced, it may directly affect the safety or life of a user, a driver or a pedestrian.

In addition, when each component of the camera module, for example, a magnet, etc. is detached in an environment with severe vibration such as a vehicle, it may cause major problems such as thrust, precision, and control as well as mechanical reliability.

Meanwhile, in the prior art, a Hall sensor is disposed inside the winding of the coil to detect a change in magnetic flux of a predetermined magnet mounted on the moving lens housing to detect the position of the lens housing.

However, when the Hall sensor is positioned inside the coil, the distance between the Hall sensor and the magnet is determined by the height of the coil.

However, in the prior art, there is a thrust required for the movement of the moving lens housing, and in order to secure such thrust, the height of the coil is required to be higher than a predetermined height.

However, when the height of the coil is increased in this way, the magnetic flux of the magnet is blocked by the coil, so there is a technical contradiction in which the sensitivity of the Hall sensor disposed inside the coil is weakened.

According to the unpublished internal technology of the applicant, in order to solve this problem, the optimum point of the sensitivity and thrust of the Hall sensor is set by a coil of an appropriate height.

Meanwhile, contents described in items merely provide background information of the present disclosure and do not constitute the related art.

DISCLOSURE

Technical Problem

One of the technical problems of an embodiment is to provide an ultra-small and an ultra-slim actuator and a camera module including the same.

In addition, one of the technical problems of the embodiment is to provide a camera actuator that can solve the technical contradiction that is applied to the thickness limit of the camera module when the size of the variable lens increases in order to increase the amount of light received for clear image quality, and a camera module including the same.

In addition, one of the technical problems of the embodiment is to provide a camera actuator that can solve the technical contradiction that is applied to the thickness limit of the camera module when the size of the variable lens increases in order to increase the amount of light received for clear image quality, and a camera module including the same.

In addition, one of the technical problems of the embodiments is to provide a camera actuator capable of achieving the best optical characteristics and a camera module including the same by minimizing occurrence of a decenter or tilt phenomenon when the OIS is implemented, and a camera module including the same.

In addition, one of the technical problems of the embodiments is to provide a camera actuator and a camera module including the same capable of preventing a magnetic field interference with an AF or Zoom magnet when the OIS is implemented, and a camera module including the same.

In addition, one of the technical problems of the embodiment is to provide a camera actuator capable of preventing magnetic field interference between magnets mounted on each lens assembly when a plurality of lens assemblies are driven by electromagnetic force between magnets and coils when implementing AF or Zoom to be, and a camera module including the same.

In addition, the embodiment is to provide a camera actuator capable of preventing detachment of the magnet and the yoke, and a camera module including the same.

In addition, one of the technical problems of the embodiments is to provide a camera actuator capable of implementing OIS with low power consumption and a camera module including the same.

In addition, one of the technical problems of the embodiment is to provide a camera actuator capable of preventing friction torque from being generated when the lens is moved through zooming in the camera module and a camera module including the same.

In addition, one of the technical problems of the embodiments is to provide a camera actuator capable of preventing a lens decentering, a lens tilt, or occurrence of a phenomenon that a center axis of an image sensor does not coincide with a center of a lens during a lens shift through zooming in a camera module, and the camera module including the same.

In addition, one of the technical problems of the embodiment is to provide a camera actuator capable of simultaneously increasing the sensitivity of the hall sensor while increasing the thrust and a camera module including the same.

The technical problems of the embodiments are not limited to those described in this item, and include those that can be grasped from the entire description of the invention.

Technical Solution

A camera actuator according to an embodiment may include a housing, a prism unit disposed in the housing, and a driving unit for tilting the prism unit, wherein the prism unit includes a prism mover including a receiving portion and a prism disposed in the receiving portion, and wherein the housing may include a side wall and a guide portion including an inclined surface disposed on the sidewall.

In addition, the guide portion may include an inclined region inclined in a direction away from an optical axis.

In addition, the guide portion may include a rail for guiding a predetermined moving portion.

In addition, the inclined region may be formed on at least one of the rail and a bottom surface between the rail.

In addition, the bottom surface between the rail may include a bottom inclined region and a flat surface between the optical axis and the bottom inclined region.

In addition, the guide portion may include a first guide portion and a second guide portion, and the first guide portion and the second guide portion may be symmetrical with respect to an optical axis.

In addition, the first moving portion may be disposed between the housing and the side wall.

In addition, a height of the rail from the side wall of the housing may be constant.

In addition, the rail may include the inclined region and a flat region between the inclined region and the optical axis.

In addition, the prism unit may include a sidewall and a first moving portion and a first stopper disposed on the sidewall.

In addition, the guide portion may include a rail for guiding the first moving portion.

In addition, the camera actuator according to the embodiment includes a housing, a prism unit disposed in the housing, and a driving unit for tilting the prism unit, wherein the prism unit may include a sidewall and a first moving portion and a first stopper disposed on the sidewall, and wherein the housing may include a guide portion including a rail for guiding the first moving portion.

In addition, a shortest length from the sidewall to an uppermost portion of the first moving portion may be longer than a shortest length from the sidewall to an uppermost portion of the first stopper.

In addition, the first moving portion may have a ball or hemispherical shape.

In addition, the guide portion may include an inclined region inclined in a direction away from an optical axis.

In addition, the inclined region may be formed on at least one of the rail and a bottom surface between the rail.

In addition, the bottom surface between the rail may include a bottom inclined region and a flat surface between the optical axis and the bottom inclined region.

In addition, the guide portion may include a first guide portion and a second guide portion, and the first guide portion and the second guide portion may be symmetrical with respect to the optical axis.

In addition, the housing may include an opening formed between the first guide portion and the second guide portion.

In addition, the driving unit may include a coil portion and a magnet facing the coil portion, and the coil portion or the magnet of the driving unit may be disposed in the opening.

In addition, the first moving portion may be disposed between the housing and the side wall.

In addition, the sidewall of the prism unit may include a recess in which the first moving portion is disposed.

In addition, a height of the rail from the side wall of the housing may be constant.

In addition, the rail may include the inclined region and a flat region between the inclined region and the optical axis.

In addition, the driving unit may include a circuit board, and the circuit board may include a first substrate region disposed on the sidewall of the housing and a second board region disposed on a bottom surface of the housing.

Also, the circuit board of the driving unit may have an L-shape.

In addition, a third recess may be included on a bottom surface of the prism mover, and a second magnet may be disposed in the third recess.

In addition, the driving unit may further include a first magnet disposed on a front surface of the first substrate region and a first back yoke disposed on a rear surface of the first substrate region.

In addition, a horizontal width of the first back yoke may be smaller than a horizontal width of the first magnet.

In addition, the camera actuator according to the embodiment includes a housing, a prism unit disposed in the housing, a driving unit for tilting the prism unit, and an elastic member disposed between the housing and the prism unit, wherein the elastic member includes a first elastic member disposed in a central region corresponding to a center of the prism unit, and a plurality of second elastic members spaced apart from the first elastic member, wherein the first and second elastic members include a spring, wherein a spring constant of the first elastic member is defined as a first spring constant, wherein a spring constant (k) of the second elastic member is defined as a second spring constant, and wherein the first and second spring constants may be different from each other.

In addition, the second spring constant may be smaller than the first spring constant.

In addition, the second spring constant may be 20% to 80% of the first spring constant.

In addition, the second elastic member includes first and second sub elastic members spaced apart from the first elastic member in a first direction; and third and fourth elastic members spaced apart in a second direction perpendicular to the first direction, and wherein the first elastic member may be disposed between the first and second sub elastic members and between the third and fourth sub elastic members.

In addition, the prism unit may be provided to be rotatable in the second direction with respect to a first virtual line formed by the first elastic member and the first and second sub elastic members as a reference axis.

In addition, the prism unit may be provided to be rotatable in the first direction with respect to a second virtual line formed by the first elastic member and the third and fourth sub elastic members as a reference axis.

In addition, a first groove corresponding to the first elastic member and a second groove corresponding to the second elastic member are disposed on an inner surface of the housing facing the prism unit, and wherein a third groove corresponding to the first elastic member and a fourth groove corresponding to the second elastic member are disposed on an outer surface of the prism unit facing the inner surface of the housing, wherein both ends of the first elastic member are disposed to be inserted into the first groove and the third groove, and wherein both ends of the second elastic member may be disposed to be inserted into the second groove and the fourth groove.

In addition, the first elastic member may be fixedly disposed in at least one of the first groove and the third groove.

In addition, the second elastic member may be fixedly disposed in at least one of the second groove and the fourth groove.

In addition, the camera actuator according to the embodiment includes a housing, a prism unit disposed in the housing, a driving unit for tilting the prism unit, and an elastic member disposed between the housing and the prism unit, wherein the housing includes an inner surface and first to fifth recesses formed in the inner surface, and wherein a center of the first recess may be included in a region connecting centers of the second to fifth recesses.

In addition, a size of the first recess may be larger than a size of each of the second to fifth recesses.

Also, a virtual straight line connecting the second and third recesses may be orthogonal to a virtual straight line connecting the fourth and fifth recesses.

In addition, the first recess includes a point at which a virtual straight line connecting the second and third recesses and a virtual straight line connecting the fourth and fifth recesses intersect.

In addition, a spring constant of the elastic member disposed in the first recess may be greater than a spring constant of the elastic member disposed in the second to fifth recesses.

Advantageous Effects

According to an embodiment, there is a technical effect that it is possible to provide an ultra-thin and ultra-small camera actuator and a camera module including the same.

For example, according to the embodiment, a driving unit is disposed so as to utilize a space below the prism unit and overlap each other, and thus there is a technical effect that it is possible to provide an ultra-thin and ultra-small camera actuator and a camera module including the same.

For example, according to the embodiment, there is a technical effect that occurrence of a decenter or tilt phenomenon may be minimized to achieve the best optical characteristics when the OIS is implemented by tilt-controlling the prism unit to a first axis or a second axis by an electromagnetic force which is the driving force of the driving unit in a state in which a first moving portion (see FIG. 4c) is disposed, and the ultra-thin and ultra-small camera actuator may be implemented.

In addition, according to the embodiment, there is a technical effect that it is possible to provide a camera actuator capable of securing a sufficient amount of light and a camera module including the same by eliminating lens size limitation of an optical system lens assembly when the OIS is implemented.

For example, according to the embodiment, by arranging a driving unit on a lower side of the prism unit, it is possible to solve the size limitation of the lens in the lens assembly of the optical system when implementing OIS, and there is a technical effect of providing a camera actuator capable of securing a sufficient amount of light and a camera module including the same.

In addition, according to the embodiment, the prism unit is tilt-controlled to a first axis or a second axis by electromagnetic force between the first and second magnets disposed on the prism mover 334 and the first and second coils (see FIG. 6a) to be described later. Accordingly, there is a technical effect of minimizing the occurrence of a decent or a tilt phenomenon when implementing OIS and exhibiting the best optical characteristics.

In addition, according to the embodiment, there is a technical effect that it is possible to provide a camera actuator capable of achieving the best optical characteristics and a camera module including the same by minimizing occurrence of a decenter or tilt phenomenon when the OIS is implemented.

For example, according to the embodiment, the driving unit stably disposed on the housing is provided, and the prism unit is tilt-controlled to the first axis or the second axis, and thus there is a technical effect that it is possible to achieve the best optical characteristics by minimizing occurrence of a decenter or tilt phenomenon when the OIS is implemented.

In addition, according to the embodiment, there is a technical effect that it is possible to provide a camera actuator capable of implementing the OIS with low power consumption and a camera module including the same.

For example, according to the embodiment, unlike the conventional method of moving a plurality of solid lenses, the OIS is implemented by including the driving unit and tilt-controlling the prism unit to the first axis or the second axis, and thus there is a technical effect that it is possible to provide a camera actuator capable of implementing the OIS with low power consumption and a camera module including the same.

In addition, according to the camera actuator and the camera module including the same according to the embodiment, there is a technical effect that can solve the problem of friction torque generation during zooming. For example, according to the embodiment, the lens assembly is driven in a state in which the first guide portion and the second guide portion precisely numerically controlled in the base are coupled. Accordingly, frictional resistance can be reduced by reducing frictional torque, and there are technical effects such as improvement of driving force, reduction of power consumption, and improvement of control characteristics during zooming.

In the prior art, when the guide rail is disposed on the base itself, a gradient occurs depending on the injection direction, so there is a difficulty in dimensional management, and if it is not properly injected, there is a technical problem in that the friction torque increases and the driving force decreases.

On the other hand, according to the embodiment, the first guide portion and the second guide portion which are separately formed and assembled from the base are separately employed, without arranging the guide rails on the base itself. Accordingly, there is a special technical effect that can prevent the generation of gradients depending on the injection direction.

In addition, the camera actuator and the camera module including the same according to the embodiment have a technical effect of simultaneously increasing the sensitivity of the hall sensor while increasing the thrust.

In addition, according to the embodiment, there is a technical effect that can provide a camera actuator capable of preventing magnetic field interference with a magnet for AF or zoom when OIS is implemented and a camera module including the same.

In addition, according to the embodiment, there is a technical effect of providing a camera actuator capable of preventing magnetic field interference between magnets mounted on each lens assembly when the plurality of lens assemblies are driven by the electromagnetic force between the magnet and the coil when implementing AF or Zoom, and a camera module including the same.

In addition, the embodiment has a technical effect that can provide a camera actuator that can prevent the detachment of the magnet and the yoke, and a camera module including the same.

In addition, the embodiment arranges a plurality of elastic members between the prism unit and the housing to place the prism unit at a set position. Accordingly, there is a technical effect that can provide an ultra-slim, ultra-small camera actuator and a camera module including the same.

In addition, according to the embodiment, it is possible to omit a separate magnet, a yoke, for fixing the prism unit in the housing, and accordingly, there is a technical effect that can provide a slim camera actuator and a camera module including the same.

In addition, according to an embodiment, an elastic member is disposed between the housing and the prism unit, and the prism unit may be tilted to a first axis or a second axis by a driving force of a driving unit. In detail, the prism unit may be tilted to a first axis or a second axis by a first elastic member and a plurality of second elastic members having different spring constants. That is, the tilting control is performed on the first axis or the second axis by the electromagnetic force, which is the driving force of the driving unit. Accordingly, the best optical characteristics can be obtained by minimizing the occurrence of a decent or tilt phenomenon when implementing OIS.

The technical effects of the embodiments are not limited to those described in this item, and include those that can be understood from the entire description of the invention.

DESCRIPTION OF DRAWINGS

FIG. 1 is a perspective view of a camera module according to an embodiment.

FIG. 2a is a perspective view in which a case is omitted in the camera module according to the embodiment shown in FIG. 1.

FIG. 2b is an exploded perspective view of the camera module according to the embodiment shown in FIG. 2a.

FIG. 3a is a perspective view of a second camera actuator according to a first embodiment in the camera module according to the embodiment shown in FIG. 2b.

FIG. 3b is an exploded perspective view of a second camera actuator according to the first embodiment shown in FIG. 3a.

FIG. 4a is a perspective view of a prism unit in the second camera actuator of the first embodiment shown in FIG. 3b.

FIG. 4b is an exploded perspective view of the prism unit shown in FIG. 4a.

FIG. 4c is an exploded perspective bottom view of the prism unit shown in FIG. 4b.

FIG. 5a is a perspective view of a housing in the second camera actuator of the embodiment shown in FIG. 3b.

FIG. 5b is a detailed view of a guide portion in the housing shown in FIG. 5a.

FIG. 5c is an example of a second guide portion of a housing in another embodiment.

FIG. 6a is a perspective view of an OIS driving unit in the second camera actuator of the embodiment shown in FIG. 3b.

FIG. 6b is an exploded perspective view of an OIS driving unit in the second camera actuator shown in FIG. 6a.

FIG. 7a is a perspective view of a second camera actuator in the embodiment shown in FIG. 3a.

FIG. 7b is a horizontal cross-sectional view taken along line A1-A1' in the second camera actuator in the embodiment shown in FIG. 7a.

FIG. 7c is an exemplary view of tilting in the first axial direction in a first plane reference cross-sectional view of the second camera actuator in the embodiment shown in FIG. 7b.

FIG. 8a is a perspective view of a second camera actuator in the embodiment shown in FIG. 3a.

FIG. 8b is a second plane reference cross-sectional view of the second camera actuator in the embodiment shown in FIG. 8a.

FIG. 8c is an exemplary view of tilting in the second axial direction in a second plane reference cross-sectional view of the second camera actuator in the embodiment shown in FIG. 8b.

FIG. 9a is a first modification of the prism unit in the second camera actuator of the embodiment shown in FIG. 4a.

FIG. 9b is a second modification of the prism unit in the second camera actuator of the embodiment shown in FIG. 9a.

FIG. 10 is a third modification of the prism unit in the second camera actuator of the embodiment shown in FIG. 4a.

FIG. 11a is a perspective view of a second camera actuator according to the second embodiment in the camera module according to the embodiment shown in FIG. 2b.

FIG. 11b is an exploded perspective view of a second camera actuator according to an embodiment.

FIG. 12a is a view of a driving unit of a second camera actuator.

FIG. 12b is a view of the housing of the second camera actuator.

FIGS. 12c and 12d are views of a prism unit of a second camera actuator.

FIG. 13 is a perspective view in which a part of the second camera actuator is omitted.

FIG. 14 is a front view of the arrangement relationship of the housing, the driving unit, and the prism unit according to the embodiment.

FIGS. 15 and 16 are views showing a coupling relationship between a housing, a prism unit, and an elastic member in a second camera actuator.

FIGS. 17a and 17b are views of an arrangement relationship of elastic members according to an embodiment.

FIGS. 18a and 18b are views showing an operation of a second camera actuator according to an embodiment.

FIG. 19 is a perspective view of a first camera actuator according to an embodiment.

FIG. 20 is a perspective view in which a part of a configuration is omitted in a first camera actuator shown in FIG. 19.

FIG. 21 is an exploded perspective view in which a part of the configuration is omitted in the first camera actuator shown in FIG. 19.

FIG. 22 is a perspective view of a first guide portion and a second guide portion in the first camera actuator shown in FIG. 21.

FIG. 23a is a perspective view of a first lens assembly in the first camera actuator shown in FIG. 21.

FIG. 23b is a perspective view in which a part of a configuration is removed in the first lens assembly shown in FIG. 23a.

FIG. 24 is a driving example view of a camera actuator according to an embodiment.

FIG. 25 is a cross-sectional view taken along line C1-C2 in the first camera actuator according to the embodiment shown in FIG. 19.

FIG. 26a is an enlarged view of the S region shown in FIG. 25.

FIG. 26b is a detailed view of the S region shown in FIG. 25.

FIG. 26c shows magnetic flux data according to a separation distance between a magnet and a position detection sensor in Example and Comparative Example.

FIG. 27a is a perspective view of a first driving unit in a first camera module according to an embodiment.

FIG. 27b shows data of a magnetic flux density distribution in Comparative Example.

FIG. 27c shows data of a magnetic flux density distribution in Example.

FIG. 28 is an illustrative view of an integrated body of a camera module according to another embodiment.

FIG. 29 is a perspective view of a mobile terminal to which a camera module according to an embodiment is applied.

FIG. 30 is a perspective view of a vehicle to which a camera module according to an embodiment is applied.

DETAILED DESCRIPTION OF THE EMBODIMENTS

Hereinafter, embodiments will be described in detail with reference to the accompanying drawings. While the invention may be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

Although the terms "first," "second," etc. may be used to describe various elements, these elements should not be limited by these terms. These terms are only used to distinguish one element from another. In addition, terms defined specially in consideration of a configuration and operation of the embodiment are only for describing the embodiment, and do not limit the scope of the embodiment.

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element.

FIG. 1 is a perspective view of a camera module 1000A according to an embodiment, FIG. 2a is a perspective view in which a case 100C is omitted in the camera module 1000A according to the embodiment shown in FIG. 1, and FIG. 2b is an exploded perspective view of the camera module 1000A according to the embodiment shown in FIG. 2a.

Referring to FIGS. 1, 2a and 2b, a camera module 1000A according to an embodiment may include a plurality of camera actuators. For example, the camera module 1000A according to the embodiment may include a first camera actuator 100 and a second camera actuator 300. The embodiment may include a case 100C that protects the first camera actuator 100 and the second camera actuator 300.

The first camera actuator 100 may be electrically connected to a first circuit board 410, and the second camera actuator 300 may be electrically connected to a second circuit board (not shown). The first circuit board 410 and the second circuit board may also be electrically connected.

The first camera actuator 100 supports one or a plurality of lenses, and may move the lenses up and down according to a control signal of a predetermined control unit to perform an autofocusing function or zoom function. In addition, the second camera actuator 300 may be an optical image stabilizer (OIS) actuator, but is not limited thereto.

Hereinafter, an OIS actuator that is the second camera actuator 300 will be mainly described. Thereafter, the first camera actuator 100 will be described.

First Embodiment

FIG. 3a is a perspective view of a second camera actuator 300 according to a first embodiment in the camera module 1000A according to the embodiment shown in FIG. 2b, and FIG. 3b is an exploded perspective view of a second camera actuator 300 according to the first embodiment shown in FIG. 3a.

Referring to FIGS. 3a and 3b, the second camera actuator 300 of the embodiment may include a housing 310, a driving unit 320 disposed on the housing 310, and a prism unit 330 disposed on the driving unit 320. The driving unit 320 may be electrically connected to a second circuit board (not shown).

According to the embodiment, by having the driving unit 320 disposed on the housing 310, there is a technical effect that can provide an ultra-slim, an ultra-small camera actuator and a camera module including the same.

In addition, according to the embodiment, by disposing the driving unit 320 under the prism unit 330, there is a technical effect capable of securing sufficient light quantity by solving the size limitation of the lens in the lens assembly of the optical system when OIS is implemented.

In addition, the embodiment is provided with a driving unit 320 that is stably disposed on the housing 310, and the prism unit 330 is tilt-controlled in a first axis or a second axis. Accordingly, there is a technical effect of minimizing the occurrence of a decent or a tilt phenomenon in the implementation of OIS to provide the best optical characteristics.

In addition, according to the embodiment, the prism unit 330 is tilted-controlled by the first axis or the second axis using the driving unit 320, unlike moving the existing plurality of solid lenses, and there is a technical effect that enables OIS to be implemented with low power consumption by implementing OIS through this.

<Second Camera Actuator 300>

The second camera actuator 300 of the embodiment will be described in more detail with reference to the drawings below.

FIG. 4a is a perspective view of a prism unit 330 in the second camera actuator of the first embodiment shown in FIG. 3b, FIG. 4b is an exploded perspective view of the prism unit 330 shown in FIG. 4a, and FIG. 4c is an exploded perspective bottom view of the prism unit 330 shown in FIG. 4b.

Referring to FIGS. 4a to 4c, in the second camera actuator of the embodiment, the prism unit 330 may include a prism mover 334 having a receiving portion 334A, and a prism 332 disposed on the receiving portion 334A of the prism mover 334.

The prism mover 334 may include a plurality of outer surfaces. For example, the prism mover 334 may have a first outer surface 334S1, a second outer surface 334S2 extending from both ends of the first outer surface 334S1, and a third outer surface 334S3 having an inclined surface. The third outer surface 334S3 may function as a seating portion of the prism 332.

In an embodiment, a first recess 334R1 and a second recess 334R2 may be provided on the first outer surface 334S1 of the prism mover 334. The first recess 334R1 and the second recess 334R2 may include a hole or a groove.

In FIG. 4B, the first recess 334R1 and the second recess 334R2 are shown in a groove shape, but are not limited thereto. A first magnet 332M1 (refer to FIG. 6a) may be disposed in the first recess 334R1. Meanwhile, in the exemplary embodiment, the first recess 334R1 may include two separated recesses, and a first-second magnet (not shown) of a size that may be accommodated in the separated two recesses may be disposed.

A first moving portion 336B may be disposed in the second recess 334R2. The first moving portion 336B may have a ball or hemispherical shape. Although the first moving portion 336B is shown in the form of a ball bearing in FIGS. 4a and 4b, the embodiment is not limited thereto. One or a plurality of the second recesses 334R2 may be included, and the first moving portion 336B may also be disposed in each of the second recesses 334R2. The first moving portion 336B may be disposed between the housing 310 and the first outer surface 334S1 of the prism mover 334.

Referring to FIG. 4c, a third recess 334R3 may be provided on a bottom surface of the prism mover 334, and a second magnet 332M2 (refer to FIG. 6a) to be described later may be disposed. In addition, in the embodiment, the first outer surface 334S1 of the prism mover 334 may include a single or a plurality of first stoppers 334P1. The first stoppers 334P1 may be disposed one at a time in the upper and lower directions in the y-axis direction to function as a stopper.

The first stopper 334P1 may have a hemispherical shape or a ball shape. In FIG. 4B, the first stopper 336P1 has a hemispherical shape and is illustrated as a protrusion integrated with the first outer surface 334S1 of the prism mover 334, but is not limited thereto.

In the embodiment, a shortest length from the first outer surface 334S1 of the prism mover 334 to an uppermost portion of the first moving portion 336B may be longer than a shortest length from the first outer surface 334S1 to an uppermost portion of the first stopper 334P1. Through this, a height of the first moving portion 336B is higher than a height of the first stopper 334P1, so that the first moving portion 336B may perform sliding motion when tilting in the first direction, and the first moving portion 336B may function as a central axis of tilting in the second direction when tilting in the second direction.

According to the embodiment, the prism unit 330 is tilt-controlled in a first axis or a second axis by the electromagnetic force between the first magnet 332M1 and the second magnet 332M2 disposed on the prism mover 334 and the first coil portion 333C1 and the second coil portion 333C2 to be described later (refer to FIG. 6a), and accordingly, there is a technical effect of minimizing the occurrence of a decent or a tilt phenomenon in the implementation of OIS to provide the best optical characteristics.

Next, FIG. 5a is a perspective view of a housing 310 in the second camera actuator of the embodiment shown in FIG. 3b, and FIG. 5b is a detailed view of a guide portion 316T in the housing 310 shown in FIG. 5a.

Referring to FIG. 5a, the housing 310 may include a housing body 312B and a single or a plurality of first and second housing sidewalls 312S1 and 312S2.

The housing body 312B may include a first housing hole 314H1 in which the first magnet 332M1 may be disposed, and a second housing hole 314H2 in which the first coil portion 333C1 may be disposed. The first housing sidewall 312S1 may include a third housing hole 314H3 in which the second coil portion 333C2 may be disposed. In addition, the first housing sidewall 312S1 may include a guide portion 316T. The guide portion 316T may be disposed on the housing to guide the tilting of the prism unit 330.

The guide portion 316T may be disposed singly or in plurality. For example, referring to FIG. 5a, the guide portion 316T includes a first guide portion 316T and a second guide portion 316T, and the first guide portion 316T and the second guide portion 316T may be symmetrical with respect to the optical axis. Also, the housing 310 may include an opening 314H3 formed between the first guide portion 316T and the second guide portion 316T.

Next, referring to FIG. 5b, the guide portion 316T may include a rail for guiding the first moving portion 336B. For example, the guide portion 316T may include a first rail 316S1 and a second rail 316S2 disposed on the first housing sidewall 312S1, and a tilting recess 316R disposed between the first rail 316S1 and the second rail 316S2. The guide portion 316T may include an inclined region inclined in a direction away from the optical axis. In an embodiment, the inclined region may be a flat inclined region or a curved inclined region. Meanwhile, the inclined region shown in the drawings is a flat inclined region, but the embodiment is not limited thereto.

In an embodiment, the inclined region may be formed on at least one of the rail and a bottom surface between the rail. For example, referring to FIG. 5b, inclined regions may be formed on the first rail 316S1 and the second rail 316S2. In addition, an inclined region may be formed in a rail bottom portion in which the tilting recess 316R is disposed.

According to the embodiment, in a state in which the first moving portion 336B (refer to FIG. 4c) is disposed in the tilting recess 316R, the prism unit 330 is tilted-controlled to the first axis or the second axis by the electromagnetic force, which is the driving force of the driving unit 320, accordingly, the best optical properties can be obtained by minimizing the occurrence of a decent or tilt phenomenon during OIS implementation, and there is a technical effect that can implement an ultra-slim and ultra-small camera actuator.

Next, FIG. 5c is an example of the second guide portion 316T2 of the housing 310 in another embodiment.

In another embodiment, the second guide portion 316T2 may have a constant height from the sidewall 312S1 of the housing of the rail, and a bottom surface between the rails may include an inclined region. For example, the second guide portion 316T2 may include a third rail 316S3 and a fourth rail 316S4 disposed on the first housing sidewall 312S1, and a second tilting recess 316R2 disposed between the third rail 316S1 and the fourth rail 316S4.

The second guide portion 316T2 may include an inclined region and a flat region between the optical axis and the inclined region. For example, in the second guide portion 316T2, the bottom surface between the third rail 316S3 and the fourth rail 316S4 may include a bottom inclined region 316BS and a flat surface 316F disposed between the optical axis and the bottom inclined region.

In addition, the third guide portion (not shown) may include only the bottom inclined region 316BS without a flat surface on the bottom surface between the third rail 316S3 and the fourth rail 316S4. Accordingly, the inclined bottom surface 316BS may be inclined from the beginning of the bottom surface between the rails.

Next, FIG. 6a is a perspective view of a driving unit 320 in the second camera actuator of the embodiment shown in FIG. 3b, and FIG. 6b is an exploded perspective view of a driving unit 320 in the second camera actuator shown in FIG. 6a.

Referring to FIGS. 6a and 6b, the driving unit 320 functions as an OIS driving unit, and may include a driving unit circuit board 321, a first coil portion 333C1, a second coil portion 333C2, a first magnet 332M1, a second magnet 332M2, a first Hall sensor HS1, and a second Hall sensor HS2. For example, the driving unit 320 may include the driving unit circuit board 321, a first coil portion 333C1 disposed on a first substrate region 321a of the driving unit circuit board 321, a first magnet 332M1 disposed at a position corresponding to the first coil portion 333C1, a second coil portion 333C2 disposed in a second substrate region 321b of the driving unit circuit board 321, a second magnet 332M2 disposed at a position corresponding to the second coil portion 333C2, a first Hall sensor HS1 disposed on the first coil portion 333C1; and a second Hall sensor HS2 disposed on the second coil portion 333C2.

The driving unit circuit board 321 may include a circuit board having a wiring pattern that can be electrically connected to, such as a rigid printed circuit board (Rigid PCB), a flexible printed circuit board (Flexible PCB), and a rigid flexible printed circuit board (Rigid Flexible PCB).

The driving unit circuit board 321 may include a first substrate region 321a and a second substrate region 321b, and is connected to a predetermined power supply (not shown), and power may be applied to each of the first coil portion 333C1 disposed on the first substrate region 321a and the second coil portion 333C2 disposed on the second substrate region 321b. In addition, the driving unit 320 may further include a first back yoke 335 disposed on a rear surface of the first substrate region 321a. In an embodiment, the first back yoke 335 may be arranged to have a smaller width than the first magnet 322M1 to have a restoring force to a center.

According to the embodiment, by electromagnetic force between the first magnet 332M1 and the second magnet 332M2 and the first coil portion 333C1 and the second coil portion 333C2, the prism unit 330 is tilt-controlled in a first axis or a second axis, and accordingly, there is a technical effect of minimizing the occurrence of a decent or a tilt phenomenon in the implementation of OIS to provide the best optical characteristics.

In an embodiment, a first axial horizontal width of the first magnet 332M1 may be greater than a first axial horizontal width of the first coil portion 333C1 corresponding to the first magnet. Accordingly, even when the prism unit is moved, the first magnet 332M1 and the first coil portion 333C1 may overlap, and a corresponding region may be maintained through this, and accordingly, the electromagnetic force is stably secured to secure the driving force.

In addition, in the embodiment, a second axial horizontal width of the second magnet 332M2 may be greater than a second axial horizontal width of the corresponding second coil portion 333C2. Accordingly, even when the prism unit moves, the second magnet 332M2 and the second coil portion 333C2 may overlap, and a corresponding region may be maintained through this, and accordingly, the electromagnetic force is stably secured to secure the driving force.

According to the embodiment, in a state in which the first moving portion 336B is disposed in the tilting recess 316R, the prism unit 330 is tilted-controlled to the first axis or the second axis by the electromagnetic force, which is the driving force of the driving unit 320, accordingly, the best optical properties can be obtained by minimizing the occurrence of a decent or tilt phenomenon during OIS implementation, and there is a technical effect that can implement an ultra-slim and ultra-small camera actuator.

Next, FIG. 7a is a perspective view of a second camera actuator 300 in the embodiment shown in FIG. 3a, FIG. 7b is a horizontal cross-sectional view taken along line A1-A1' in the second camera actuator 300 in the embodiment shown in FIG. 7a, and FIG. 7c is an exemplary view of tilting in the first axial (Z1) direction in a first plane reference cross-sectional view of the second camera actuator 300 in the embodiment shown in FIG. 7b.

Referring to FIGS. 7b and 7c, the second camera actuator 300 of the embodiment tilts-controls the prism unit 330 in a first axis or a second axis by electromagnetic force between the first magnet 332M1 and the second magnet 332M2 and the first coil portion 333C1 and the second coil portion 333C2 disposed on the prism mover 334, and accordingly, there is a technical effect of minimizing the occurrence of a decent or a tilt phenomenon in the implementation of OIS to provide the best optical characteristics.

For example, referring to FIG. 7c, by tilting-controlling the prism unit 330 to the first axis by the electromagnetic force between the first magnet 332M1 and the first coil portion 333C1, when implementing OIS, there is a technical effect of minimizing the occurrence of a decent or a tilt phenomenon to obtain the best optical characteristics.

For example, when a repulsive force F1a is generated between the first-first magnet 332M1a and the first coil portion 333C1, and when an attractive force F1b is generated between the first-second magnet 332M1b and the first coil portion 333C1, the first moving portion 336B can move sliding along the inclined surface of the guide portion 316T, and the light path in the prism 332 can be tilted by a first angle Θ1 by the difference in height of the inclined surface, and through this, the light movement path Z1 to Z1b can be controlled. The first angle Θ1 may be ±1° to 1.5°, that is, 2° to 3°.

Accordingly, according to the embodiment, the prism unit 330 is tilted-controlled in the first axis by the electromagnetic force between the first magnet 332M1 and the first coil portion 333C1, and accordingly, when implementing OIS, there is a technical effect of minimizing the occurrence of a decent or a tilt phenomenon to obtain the best optical characteristics.

Next, FIG. 8a is a perspective view of a second camera actuator 300 in the embodiment shown in FIG. 3a. FIG. 8b is a second plane reference cross-sectional view of the second camera actuator in the embodiment shown in FIG. 8a, and FIG. 8c is an exemplary view of tilting in the second axial (Z2) direction in a second plane reference cross-sectional view of the second camera actuator in the embodiment shown in FIG. 8b.

Referring to FIGS. 8b and 8c, the second camera actuator 300 of the embodiment tilts-controls the prism unit 330 in a second axis by electromagnetic force between the second magnet 332M2 and the second coil portion 333C2 disposed on the prism mover 334, and accordingly, there is a technical effect of minimizing the occurrence of a decent or a tilt phenomenon in the implementation of OIS to provide the best optical characteristics.

For example, when a repulsive force F2a is generated between the first region (right side) of the second magnet 332M2 and the second coil portion 333C2, and when an attractive force F2b is generated between the second region (left side) of the second magnet 332M and the second coil portion 333C2, the prism 332 can be tilted by a second angle Θ2, and through this, the light movement path (Z2 to Z2b) can be controlled. The first angle Θ1 may be ±1° to 1.5°, that is, 2° to 3°.

In this case, in the embodiment, the prism mover 334 may include a single or a plurality of first stoppers 334P1 on the first outer surface 334S1. The first stoppers 334P1 may be disposed one at a time in upper and lower directions in the y-axis direction to function as a stopper.

Accordingly, according to the embodiment, the prism unit 330 is tilted-controlled in the first axis by the electromagnetic force between the first magnet 332M1 and the first coil portion 333C1, and accordingly, when implementing OIS, there is a technical effect of minimizing the occurrence of a decent or a tilt phenomenon to obtain the best optical characteristics.

FIG. 9a is a first modification 330A1 of the prism unit in the second camera actuator of the embodiment shown in FIG. 4a.

According to the first modified example 330A1 of the prism unit of the embodiment, unlike FIG. 4a, the prism mover 334 may include a second moving portion 336P2 on the first outer surface 334S1 instead of the first moving portion 336B. The shape of the second moving portion 336P2 may be a hemispherical shape, and a sliding operation may be possible when tilting is implemented. The second moving portion 336P2 may be integrally formed in which the prism mover 334 protrudes from the first outer surface 334S1, but is not limited thereto.

Next, FIG. 9b is a second modification 330A2 of the prism unit in the second camera actuator of the embodiment shown in FIG. 9a.

According to the second modification 330A2 of the prism unit of the embodiment, unlike FIG. 9a, the prism mover 334 may include a second stopper 334B2 on the first outer surface 334S1 instead of the first stopper 334P1. The second stopper 334B2 may be disposed to be seated in a predetermined recess. The second stopper 334B2 may be in the form of a ball bearing, but is not limited thereto.

Next, FIG. 10 is a third modification 330A3 of the prism unit in the second camera actuator of the embodiment shown in FIG. 4a.

According to the third modified example 330A3 of the prism unit of the embodiment, unlike FIG. 4a, the prism mover 334 may include a second moving portion 334B2 on the first outer surface 334S1 instead of the first stopper 334P1. The second moving portion 334B2 may be disposed to be seated in a predetermined recess. The second moving portion 334B2 may be in the form of a ball bearing, but is not limited thereto.

Second Embodiment

FIG. 11a is a perspective view of a second camera actuator according to the second embodiment in the camera module 1000A according to the embodiment shown in FIG. 2b, and FIG. 11b is an exploded perspective view of a second camera actuator according to an embodiment.

Referring to FIG. 11, the second camera actuator 300B according to the second embodiment may include a housing 310, a prism unit 330 disposed in the housing 310, and a driving unit 320 for tilting the prism unit 330.

In addition, the second camera actuator 300B may further include a cover member 301. The cover member 301 may include an accommodating space therein, and at least one side surface may be open. For example, the cover member 301 may have a structure in which a plurality of side surfaces connected to each other are opened. In detail, the cover member 301 may have a structure in which a front surface to which light is incident from the outside, a lower surface corresponding to the first camera actuator 100, and a rear surface opposite to the front surface are open, and a light movement path of the prism unit 330, which will be described later, may be provided.

The cover member 301 may include a rigid material. For example, the cover member 301 may include a material such as resin or metal, and may support the housing 310 disposed in the accommodation space. For example, the cover member 301 is disposed to surround the housing 310, the driving unit 320, and the prism unit 330, and may support the components.

In detail, the prism unit 330, which will be described later, may be moved in a first direction and/or a second direction by the driving unit 320. In this case, the cover member 301 may fix the housing and the driving unit 320 at a set position, thereby providing a more accurate light movement path. Also, the cover member 301 may prevent the housing 310 from escaping to the outside of the second camera actuator 300B by the elastic force of the elastic member 350. For example, the cover member 301 may serve as a stopper that restricts the housing 310 to move only within a selective range. The cover member 301 may be omitted depending on the arrangement relationship of the housing 310, the driving unit 320, and the prism unit 330.

FIG. 12 is a perspective view of each configuration of a second camera actuator according to the second embodiment.

Referring to FIG. 12, the second camera actuator 300B may include the housing 310, the driving unit 320, and the prism unit 330. In detail, the driving unit 320 may include a driving unit circuit board 321, a plurality of coil portions 323, and a plurality of magnets 325, and the prism unit 330 may include a prism 332 and the prism mover 334.

According to the embodiment, by providing the driving unit 320 disposed on the housing 310, there is a technical effect that can provide an ultra-slim and ultra-small camera actuator and a camera module including the same.

In addition, according to the embodiment, by disposing the driving unit 320 under the prism unit 330, there is a technical effect that can secure sufficient light quantity by solving the size limitation of the lens in the lens assembly of the optical system when OIS is implemented.

In addition, according to the embodiment, the driving unit 320 stably disposed on the housing 310 is provided, and the prism unit is tilt-controlled to the first axis or the second axis, and thus there is a technical effect that it is possible to achieve the best optical characteristics by minimizing occurrence of a decenter or tilt phenomenon when the OIS is implemented.

In addition, according to the embodiment, unlike the conventional method of moving a plurality of solid lenses, the OIS is implemented by including the driving unit 320 and tilt-controlling the prism unit 330 to the first axis or the second axis, and thus there is a technical effect that it is possible to provide a camera actuator capable of implementing the OIS with low power consumption and a camera module including the same.

Hereinafter, each configuration of the second camera actuator 300B will be described in detail with reference to FIG. 12.

<Driving Unit 320>

FIG. 12a is a view of the driving unit 320 of the second camera actuator 300B.

FIG. 12a, the driving unit 320 may include a driving unit circuit board 321, a coil portion 323, and a magnet 325.

The driving unit circuit board 321 may be connected to a predetermined power supply (not shown) to apply power to the coil portion 323. The driving unit circuit board 321 may include a circuit board having a wiring pattern that can be electrically connected, such as a rigid printed circuit board (Rigid PCB), a flexible printed circuit board (Flexible PCB), and a rigid flexible printed circuit board (Rigid Flexible PCB).

The coil portion 323 may be electrically connected to the driving unit circuit board 321. The coil portion 323 may include one or a plurality of coil portions. For example, the coil portion 323 may include a first coil portion 323a, a second coil portion 323b, and a third coil portion 323c.

The first to third coil portions 323a, 323b, and 323c may be spaced apart from each other. For example, the driving unit circuit board 321 may have a '⊏' shape, and the first coil portion 323a and the second coil portion 323b may be respectively disposed on first and second surfaces of the driving unit circuit board 321 facing each other. In addition, the third coil portion 323c may be disposed on a third surface connecting the first and second surfaces of the driving unit circuit board 321.

The magnet 325 may include one or a plurality of magnets. For example, the magnet 325 may include a first magnet 325a, a second magnet 325b, and a third magnet 325c disposed in a region corresponding to the coil portion 323. In detail, the first magnet 325a may be disposed on a region corresponding to the first coil portion 323a on the first surface. Also, the second magnet 325b may be disposed on a region corresponding to the second coil portion 323b on the second surface. Also, the third magnet 325c may be disposed on a region corresponding to the third coil portion 323c on the third surface.

The driving unit 320 may further include a Hall sensor. For example, For example, the Hall sensor may include a first Hall sensor HS1 disposed adjacent to one coil portion selected from among the first coil portion 323a and the second coil portion 323b; and a second Hall sensor (not shown) disposed adjacent to the third coil portion 323c.

The driving unit 320 may tilt the prism unit 330. The driving unit 320 may control the tilting of the prism unit 330 in a first axis or a second axis.

<Housing (310)>

FIG. 12b is a view of the housing 310 of the second camera actuator 300B.

FIG. 12b, the housing 310 may include an accommodating space for accommodating the prism unit 330. The housing 310 may include a plurality of inner surfaces. For example, the housing 310 may include a first inner surface 310S1 corresponding to the first surface of the driving unit circuit board 321, a second inner surface 310S2 corresponding to the second surface of the driving unit circuit board 321, and a third inner surface 310S3 corresponding to the third surface of the driving unit circuit board 321.

In detail, the housing 310 may include a first inner surface 310S1 corresponding to the first coil portion 323a, a second inner surface 310S2 corresponding to the second coil portion 323b, and a third inner surface 310S3 corresponding to the third coil portion 323c.

In addition, the housing 310 may include a fourth inner surface 310S4 connected to the first inner surface 310S1 and the second inner surface 310S2 and connected to the third inner surface 310S3.

The housing 310 may include a plurality of housing holes 311H. The housing hole 311H may be a through hole passing through outer and inner surfaces of the housing 310. The plurality of housing holes 311H may include first to third housing holes 311H1, 311H2, and 311H3. The first housing hole 311H1 may be a through hole passing through the first inner surface 310S1 and an outer surface corresponding to the first inner surface 310S1. The second housing hole 311H2 may be a through hole passing through the second inner surface 310S2 and an outer surface corresponding to the second inner surface 310S2. The third housing hole 311H3 may be a through hole passing through the third inner surface 310S3 and an outer surface corresponding to the third inner surface 310S3.

The first housing hole 311H1 may be disposed in a region corresponding to the first coil portion 323a. Also, the first housing hole 311H1 may have a size and shape corresponding to that of the first coil portion 323a. Accordingly, the first coil portion 323a may be disposed by being partially or entirely inserted into the first housing hole 311H1.

The second housing hole 311H2 may be disposed in a region corresponding to the second coil portion 323b. Also, the second housing hole 311H2 may have a size and shape corresponding to that of the second coil portion 323b. Accordingly, the second coil portion 323b may be disposed by being partially or entirely inserted into the second housing hole 311H2.

The third housing hole 311H3 may be disposed in a region corresponding to the third coil portion 323c. Also, the third housing hole 311H3 may have a size and shape corresponding to that of the third coil portion 323c. Accordingly, the third coil portion 323c may be disposed to be partially or entirely inserted into the third housing hole 311H3.

The housing 310 may include at least one groove. For example, a groove may be disposed on at least one inner surface of the housing 310. In detail, the groove may be disposed on the fourth inner surface 310S4 of the housing 310. The groove may have a concave shape on the fourth inner surface 310S4 in the outer surface direction (z-axis direction) of the housing 310.

The groove of the housing 310 may include a first groove 311H and a second groove 313H.

The first groove 311H may be disposed in a central region of the fourth inner surface 310S4. In detail, the first groove 311H may overlap a center of the fourth inner surface 310S4 in the z-axis direction. The first groove 311H may be disposed in a region overlapping a center of the prism unit 330 to be described later in the z-axis direction.

A plurality of the second grooves 313H may be disposed on the fourth inner surface 310S4. The second groove 313H may be provided in the same size as the first groove 311H or may be provided in different sizes. For example, a width of the first groove 311H may be greater than a width of each of the plurality of second grooves 313H. Also, a depth of the first groove 311H may be greater than a depth of each of the plurality of second grooves 313H.

The plurality of second grooves 313H may be disposed adjacent to the first groove 311H and may be spaced apart from each other. The plurality of second grooves 313H may be disposed around the first groove 311H. For example, the plurality of second grooves 313H may include a first sub-second groove 313H1 and a second sub-second groove 312H2 spaced apart from the first groove 311H in a first direction (x-axis direction). In addition, the plurality of second grooves 313H may include a third sub-second groove 313H3 and a fourth sub-second groove 313H4 spaced apart from the first groove 311H in the second direction (y-axis direction).

The first sub-second groove 313H1 may be disposed adjacent to the first inner surface 310S1, and the second sub-second groove 313H2 may be disposed adjacent to the second inner surface 310S2. Also, the third sub-second groove 313H3 may be disposed adjacent to the third inner surface 310S3.

That is, the first groove 311H may be disposed between the first sub-second groove 313H1 and the second sub-second groove 313H2 in the first direction (x-axis direction). Also, the first groove 311H may be disposed between the third sub-second groove 313H3 and the fourth sub-second groove 313H4 based on the second direction (y-axis direction).

A center of the first groove 311H may be included in a region connecting centers of the second groove 313H. For example, the center of the first groove 311H may be positioned in a region connecting the centers of the first to fourth sub-second grooves 313H1, 313H2, 313H3, and 313H4. In detail, the center of the first groove 311H may intersect with a virtual straight line connecting the first sub-second groove 313H1 and the second sub-second groove 313H2. In addition, the center of the first groove 311H may intersect with a virtual straight line connecting the third sub-second groove 313H3 and the fourth sub-second groove 313H4.

The virtual straight line connecting the first sub-second groove 313H1 and the second sub-second groove 313H2 may intersect with the virtual straight line connecting the third sub-second groove 313H3 and the fourth sub-second groove 313H4. In detail, the virtual straight line connecting the first sub-second groove 313H1 and the second sub-second groove 313H2 may be orthogonal with the virtual straight line connecting the third sub-second groove 313H3 and the fourth sub-second groove 313H4. The first groove 311H may include a point where the two virtual straight lines intersect.

<Prism Unit 330>

FIG. 12c and FIG. 12d are views of the prism unit 330 of the second camera actuator 300B.

Referring to FIG. 12c and FIG. 12d, the prism unit 330 may be disposed in the housing 310. In detail, the prism unit 330 may be disposed in the accommodation space of the housing 310.

The prism unit 330 may include a prism 332 and a prism mover 334 disposed on the prism 332.

The prism 332 may be a right-angle prism. The prism 332 may reflect the direction of light incident from the outside. That is, the prism 332 may change the path of the light incident on the second camera actuator 300B from the outside toward the first camera actuator 100.

The prism mover 334 may be disposed on the prism 332. The prism mover 334 may be disposed to surround the prism 332. At least one side of the prism mover 334 may be open and may include an accommodating space therein. In detail, the prism mover 334 may have a structure in which a plurality of outer surfaces connected to each other are open. For example, the prism mover 334 may have a structure in which an outer surface corresponding to the prism 332 is open, and may include an accommodation space defined by a receiving portion 334A therein.

The prism mover 334 may include an inner surface 335S. The inner surface 335S may be an inner surface constituting the receiving portion 334A. The receiving portion 334A may have a shape corresponding to the prism 332. The inner surface 335S of the receiving portion 334A may be in direct contact with the prism 332.

The prism mover 334 may include a step 326. The step 326 may be disposed in the receiving portion 334A. The step 326 may serve as a guide and/or a seating portion for the prism 332. In detail, a protrusion corresponding to the step 326 may be formed on the outside of the prism 332. The prism 332 may be disposed in the receiving portion 334A such that the protrusion is guided by the step 326 of the prism mover 334. Accordingly, the prism mover 334 may effectively support the prism 332. In addition, the prism 332 may be seated at a set position, and may have improved alignment characteristics within the prism mover 334.

The prism unit 330 may include a plurality of outer surfaces. For example, the prism mover 334 of the prism unit 330 may include a plurality of outer surfaces. The prism mover 334 may includes a first outer surface 330S1 corresponding to the first inner surface 310S1 of the housing 310, a second outer surface 330S2 corresponding to the second inner surface 310S2, a third outer surface 330S3 corresponding to the third inner surface 310S3 and a fourth outer surface 330S4 corresponding to the fourth inner surface 310S4.

The prism mover 334 may include at least one groove. For example, a groove may be disposed on at least one outer surface of the prism mover 334. In detail, the groove may be disposed on the fourth outer surface 330S4 of the prism mover 334. The groove may have a concave shape on the fourth outer surface 330S4 in a direction (z-axis direction) of the receiving portion 334A.

The groove of the prism mover 334 may include a third groove 338H and a fourth groove 339H.

The third groove 338H may be disposed in a central region of the fourth outer surface 330S4. In detail, the third groove 338H may overlap a center of the fourth outer surface 330S4 in the z-axis direction. The third groove 338H may be disposed to face the first groove 311H. The third groove 338H may be disposed in a region corresponding to the first groove 311H. In detail, the third groove 338H may be disposed in a region overlapping the center of the first groove 311H in the z-axis direction. Also, the third groove 338H may be disposed in a region overlapping the center of the prism unit 330 in the z-axis direction. The third grooves 338H may be provided in a number corresponding to the number of the first grooves 311H.

A plurality of the fourth grooves 339H may be disposed on the fourth outer surface 330S4. The fourth groove 339H may be provided in the same size as the third groove 338H or may be provided in different sizes. For example, a width of the third groove 338H may be greater than a width of each of the plurality of fourth grooves 339H. Also, a depth of the third groove 338H may be greater than a depth of each of the plurality of fourth grooves 339H.

The plurality of fourth grooves 339H may be disposed adjacent to the third groove 338H and may be spaced apart from each other. The plurality of fourth grooves 339H may be disposed around the third grooves 338H. For example, the plurality of fourth grooves 339H may include a first sub-fourth groove 339H1 and a second sub-fourth groove 339H2 spaced apart from the third groove 338H in the first direction (x-axis direction). In addition, the plurality of fourth grooves 339H may include a third sub-fourth groove 339H3 and a fourth sub-fourth groove 339H4 spaced apart from the third groove 338H in the second direction (y-axis direction).

The center of the third groove 338H may be included in a region connecting the centers of the fourth groove 339H. For example, the center of the third groove 338H may be positioned in a region connecting the centers of the first to fourth sub-fourth grooves 339H1, 339H2, 339H3, and 339H4. In detail, the center of the third groove 338H may intersect with a virtual straight line connecting the first sub-fourth groove 339H1 and the second sub-fourth groove 339H2. In addition, the center of the third groove 338H may intersect with a virtual straight line connecting the third sub-fourth groove 339H3 and the fourth sub-fourth groove 339H4.

The virtual straight line connecting the first sub-fourth groove 339H1 and the second sub-fourth groove 339H2 may intersect with the virtual straight line connecting the third sub-fourth groove 339H3 and the fourth sub-fourth groove 339H4. In detail, the virtual straight line connecting the first sub-fourth groove 339H1 and the second sub-fourth groove 339H2 may orthogonal with the virtual straight line connecting the third sub-fourth groove 339H3 and the fourth sub-fourth groove 339H4. The third groove 338H may include a point where the two virtual straight lines intersect.

The fourth groove 339H may be disposed to face the second groove 313H. The fourth groove 339H may be disposed in a region corresponding to the second groove 313H. In detail, the plurality of fourth grooves 339H may be disposed in a region overlapping the plurality of second grooves 313H in the z-axis direction. For example, the first sub-fourth groove 339H1 may overlap the first sub-second groove 313H1, and the second sub-fourth groove 339H2 may overlap the second sub-second groove 313H2. In addition, the third sub-fourth groove 339H3 may overlap the third sub-second groove 313H3, and the fourth sub-fourth groove 339H4 may overlap the fourth sub-second groove 313H4.

That is, the third groove 338H and the fourth groove 339H of the prism unit 330 are formed to correspond to the first groove 311H and the second groove 313H of the housing 310 so that a space in which an elastic member 350 to be described later is disposed may be provided between the first to fourth grooves 311H, 313H, 338H, and 339H.

The prism mover 334 may include a plurality of recesses. The recess may be a groove having a concave shape on the outer surface of the prism mover 334 in the direction of the first space 335. The plurality of recesses may include a first recess 337R1, a second recess 337R2, and a third recess 337R3. For example, the first recess 337R1 may be disposed on the first outer surface 330S1. The first recess 337R1 may be disposed in a region corresponding to the first housing hole 311H1. Also, the second recess 337R2 may be disposed on the second outer surface 330S2. The second recess 337R2 may be disposed in a region corresponding to the second housing hole 311H2. Also, the third recess 337R3 may be disposed on the third outer surface 330S3. The third recess 337R3 may be disposed in a region corresponding to the third housing hole 311H3. That is, the first housing hole 311H1 may correspond to the first coil portion 323a, and the second housing hole 311H2 may correspond to the second coil portion 323b. Also, the third housing hole 311H3 may correspond to the third coil portion 323c.

The magnet 325 may be disposed in the recess. For example, the first magnet 325a may be disposed in the first recess 337R1, the second magnet 325b may be disposed in the second recess 337R2, and the third magnet 325c may be disposed in the second recess 337R1. Each of the three recesses 337R3 may be disposed to be spaced apart from each other.

FIG. 13 is a perspective view in which a part of the second camera actuator is omitted, and FIG. 14 is a front view of the arrangement relationship of the housing 310, the driving unit 320, and the prism unit 330 according to the embodiment.

Referring to FIGS. 13 and 14, the second camera actuator 300B according to the embodiment may include an elastic member 350. The elastic member 350 may be disposed between the housing 310 and the prism unit 330.

The elastic member 350 may have a shape extending from the inside of the housing 310 to the outside of the prism unit 330. That is, the elastic member 350 may have a shape extending in the y-axis direction.

The elastic member 350 may include a spring. In detail, the elastic member 350 may include a spring having a predetermined spring constant. For example, the elastic member 350 may include a coil spring.

The elastic member 350 may control the moving direction and/or the moving amount of the prism unit 330 moved by an external driving force, for example, the coil portion 323 and the magnet 325.

In detail, the prism unit 330 may be disposed between the first coil portion 323a, a second coil portion 323b, a first magnet 325a and a second magnet 325b disposed to dace each other in the first direction (z-axis direction). In addition, the prism unit 330 may be disposed to face the third coil portion 323c and the third magnet 325c in the second direction (y-axis direction).

That is, the embodiment can tilt-control the prism unit 330 in a first axis or a second axis by electromagnetic force between the first to third magnets 325a, 325b, and 325c disposed on the prism mover 334 and the first to third coil portions 323a, 323b, and 323c, and accordingly, when implementing OIS, there is a technical effect of minimizing the occurrence of a decent or a tilt phenomenon to obtain the best optical characteristics.

FIGS. 15 and 16 are views showing a coupling relationship between a housing, a prism unit, and an elastic member in a second camera actuator.

Referring to FIGS. 13, 15 and 16, the elastic member 350 according to the embodiment may include a plurality of elastic members. For example, the elastic member 350 may include a first elastic member 351 and a second elastic member 353 that are spaced apart from each other.

The first elastic member 351 and the second elastic member 353 may extend from the housing 310 toward the prism unit 330. That is, the first elastic member 351 and the second elastic member 353 may have a shape extending in the y-axis direction.

The first elastic member 351 may be disposed in a central region corresponding to the center of the prism unit 330. The first elastic member 351 may be disposed on a region corresponding to the center of the fourth inner surface 310S4 of the housing 310. The first elastic member 351 may be disposed on a region corresponding to the center of the fourth outer surface 330S4 of the prism unit 330. A center of the first elastic member 351 may overlap a center of the fourth outer surface 330S4 in a vertical direction.

The first elastic member 351 may be disposed in the first groove 311H and the third groove 338H. One end of the first elastic member 351 may directly contact a bottom surface of the first groove 311H. The other end opposite to one end of the first elastic member 351 may be in direct contact with a bottom surface of the third groove 338H. That is, both ends of the first elastic member 351 may be disposed in the first groove 311H and the third groove 338H. Accordingly, the first elastic member 351 may serve as a central axis, and a predetermined space may be formed between the fourth inner surface 310S4 of the housing 310 and the fourth outer surface 330S4 of the prism unit 330.

The second elastic member 353 may be disposed adjacent to the first elastic member 351. The second elastic member 353 may be disposed around the first elastic member 351. The second elastic member 353 may be disposed in the second groove 313H and the fourth groove 339H. One end of the second elastic member 353 may directly contact a bottom surface of the second groove 313H. The other end opposite to one end of the second elastic member 353 may be in direct contact with the fourth groove 339H. That is, parts of both ends of the second elastic member 353 may be disposed in the second groove 313H and the fourth groove 339H. Accordingly, the second elastic member 353 may serve to maintain a balance, and a predetermined space may be formed between the fourth inner surface 310S4 of the housing 310 and the fourth outer surface 330S4 of the prism unit 330.

The second elastic member 353 may include a plurality of sub elastic members. For example, the second elastic member 353 may include first to fourth sub elastic members 353a, 353b, 353c and 353d disposed around the first elastic member 351.

In detail, the first sub elastic member 353a may be disposed in the first sub second groove 313H1 and the first sub fourth groove 339H1. Also, the second sub elastic member 353b may be disposed in the second sub second groove 313H2 and the second sub fourth groove 339H2. Also, the third sub elastic member 353c may be disposed in the third sub second groove 313H3 and the third sub fourth groove 339H3. Also, the fourth sub elastic member 353d may be disposed in the fourth sub second groove 313H4 and the fourth sub fourth groove 339H4.

The first sub elastic member 353a and the second sub elastic member 353b may be disposed to be spaced apart from the first elastic member 351 in a first direction (x-axis direction). That is, the first elastic member 351 may be disposed between the first sub elastic member 353a and the second sub elastic member 353b. In this case, a distance between the first elastic member 351 and the first sub elastic member 353a may be the same as a distance between the first elastic member 351 and the second sub elastic member 353b.

Also, the third sub elastic member 353c and the fourth sub elastic member 353d may be disposed to be spaced apart from the first elastic member 351 in a second direction (y-axis direction). That is, the first elastic member 351 may be disposed between the third sub elastic member 353c and the fourth sub elastic member 353d. In this case, a distance between the first elastic member 351 and the third sub elastic member 353c may be the same as the distance between the first elastic member 351 and the fourth sub elastic member 353d. That is, when the elastic member 350 is viewed from the upper side, a virtual line connecting the first to fourth sub elastic members 353a, 353b, 353c and 353d and the center of the first elastic member 351 may be arranged in a cross shape (+).

The first to fourth sub elastic members 353a, 353b, 353c, and 353d may correspond to each other. For example, the first to fourth sub elastic members 353a, 353b, 353c, and 353d may have shapes and sizes corresponding to each other. Also, the first to fourth sub elastic members 353a, 353b, 353c, and 353d may have spring constant (k) values corresponding to each other.

The first elastic member 351 may have a different spring constant from the second elastic member 353. For example, the first elastic member 351 may have a spring constant value k defined as a first spring constant k1, and the second elastic member 353 may have a spring constant value defined as a second spring constant k2.

In this case, the second spring constant k2 may be smaller than the first spring constant k1. In detail, the second spring constant k2 may be about 20% to about 80% of the first spring constant k1.

When the second spring constant k2 is less than about 20% of the first spring constant k1, it may be difficult to control the movement of the prism unit 330. That is, since the second elastic member 353 may be tilted along the first axis or the second axis even with a very slight driving force, it may be difficult to control the movement of the prism unit 330. In addition, when the second spring constant k2 exceeds about 80% of the first spring constant k1, a large driving force for controlling the prism unit 330 may be required. Accordingly, it is preferable that the first spring constant k1 and the second spring constant k2 satisfy the above-described ranges for effective control of the prism unit 330.

That is, the first elastic member 351 is disposed on the central region of the prism unit 330, and has a relatively large spring constant (k) value to serve as a central axis and a support axis, and, the second elastic member 353 may be arranged around the first elastic member 351 in a set direction and at a set interval to balance the prism unit 330.

FIG. 17 is a view showing the arrangement relationship of elastic members according to the second embodiment.

Referring to FIG. 17, the elastic member 350 may be disposed on at least one of the housing 310 and the prism unit 330.

First, referring to FIG. 17*a*, the elastic member 350 may be disposed on the prism unit 330. For example, a part of one end of the first elastic member 351 may be disposed in the third groove 338H. In addition, a part of one end of the second elastic member 353 may be disposed in the fourth groove 339H. In detail, a part of one end of the first sub elastic member 353*a* may be disposed in the first sub fourth groove 339H1, and a part of one end of the second sub elastic member 353*b* may be disposed in the second sub fourth groove 339H2. In addition, a part of one end of the third sub elastic member 353*c* may be disposed in the third sub fourth groove 339H3, and a part of one end of the fourth sub elastic member 353*d* may be disposed in the fourth sub fourth groove 339H4. The first elastic member 351 and the second elastic member 353 may be fixed to the prism unit 330. In detail, the first elastic member 351 and the second elastic member 353 may be fixed to the third groove 338H and the fourth groove 339H. The first elastic member 351 and the second elastic member 353 may be coupled to the housing 310 while being fixed to the prism mover 334.

Also, referring to FIG. 17*b*, the elastic member 350 may be disposed on the housing 310. For example, a part of the other end opposite to one end of the first elastic member 351 may be disposed in the first groove 311H. In addition, a part of the other end opposite to one end of the second elastic member 353 may be disposed in the second groove 313H. In detail, a part of the other end of the first sub-elastic member 353*a* may be disposed in the first sub-second groove 313H1, and a part of the other end of the second sub-elastic member 353*b* may be disposed in the second sub-second groove 313H2. In addition, a part of the other end of the third sub-elastic member 353*c* may be disposed in the third sub-second groove 313H3, and a portion of the other end of the fourth sub-elastic member 353*d* may be disposed in the fourth sub-second groove 313H4. The first elastic member 351 and the second elastic member 353 may be fixed to the housing 310. In detail, the first elastic member 351 and the second elastic member 353 may be fixed to the first groove 311H and the second groove 313H. The first elastic member 351 and the second elastic member 353 may be coupled to the prism mover 334 while being fixed to the housing 310.

The first elastic member 351 may be fixedly disposed in at least one of the first groove 311H and the third groove 338H. Also, the second elastic member 353 may be fixed in at least one of the second groove 313H and the fourth groove 339H.

In addition, the embodiment may be tilt-controlled the prism unit 330 in a first axis or a second axis by electromagnetic force between the first to third magnets 325*a*, 325*b*, and 325*c* disposed on the prism mover 334 and the first to third coil portions 323*a*, 323*b*, and 323*c*, and accordingly, there is a technical effect of minimizing the occurrence of a decent or a tilt phenomenon in the implementation of OIS to achieve the best optical characteristics.

For example, in the embodiment, in a state in which the elastic member 350 disposed between the housing 310 and the prism unit 330 is disposed, the prism unit 330 is tilted-controlled in the first axis or the second axis by the driving force of the driving unit 320, and accordingly, the best optical properties can be obtained by minimizing the occurrence of decent or tilt when implementing OIS, and there is a technical effect that can implement an ultra-slim and ultra-small camera actuator.

In addition, the prism unit 330 according to the embodiment may be fixed in the housing 310 by the cover member 301 and the elastic member 350, and accordingly, a separate magnet and yoke for fixing the prism unit 330 in the housing 310 can be omitted, and a slimmer camera actuator can be implemented.

FIGS. 18*a* and 18*b* are views showing an operation of a second camera actuator according to an embodiment.

Referring to FIG. 18, the prism unit 330 according to the embodiment may control tilting along the first axis or the second axis by the driving force of the driving unit 320.

First, referring to FIG. 18*a*, the prism unit 330 may be provided to be rotationally movable in the second direction with a virtual first line L1 formed by the first elastic member 351, the first sub elastic member 353*a* and the second sub elastic member 353*b* is formed, as the reference axis. In detail, the driving unit 320 may rotate the prism unit 330 in the vertical direction.

For example, a repulsive force may be generated between the third-first coil portion adjacent to the elastic member 350 among the third coil portion 323*c* and the third-first magnet adjacent to the elastic member 350 among the third magnets 325*c*. In addition, an attractive force may be generated between the third-second coil portion far from the elastic member 350 among the third coil portion 323*c* and the third-second magnet far from the elastic member 350 among the third magnets 325*c*.

Accordingly, the prism unit 330 may be tilted downward with respect to the first line L1 as a reference axis. That is, the prism unit 330 may be tilted at a predetermined angle in the vertical direction with respect to the first line L1. Accordingly, a movement path of the light incident on the prism unit 330 may be controlled.

In addition, referring to FIG. 18*b*, the prism unit 330 may be provided to be rotationally movable in the first direction with a virtual second line L2 formed by the first elastic member 351, the third sub elastic member 353*c* and the fourth sub elastic member 353*d* is formed, as the reference axis. In detail, the driving unit 320 may rotate the prism unit 330 in a left and right direction.

For example, a repulsive force may be generated between the first-first coil portion adjacent to the elastic member 350 among the first coil portion 323*a* and the first-first magnet adjacent to the elastic member 350 among the first magnets 325*a*. In addition, an attractive force may be generated between the first-second coil portion far from the elastic member 350 among the first coil portion 323*a* and the first-second magnet far from the elastic member 350 among the first magnets 325*a*.

In addition, a repulsive force may be generated between the second-first coil portion adjacent to the elastic member 350 among the second coil portion 323*b* and the second-first magnet adjacent to the elastic member 350 among the second magnets 325*b*. In addition, an attractive force may be generated between the second-second coil portion far from the elastic member 350 among the second coil portion 323b and the second-second magnet far from the elastic member 350 among the second magnets 325b.

Accordingly, the prism unit 330 may be tilted in the left and right directions with respect to the second line L2 as a reference axis. That is, the prism unit 330 may be tilted at a predetermined angle in the left and right directions based on the second line L2. Accordingly, a movement path of the light incident on the prism unit 330 may be controlled.

Hereinafter, the first camera actuator 100 of the camera module according to the embodiment will be described.

<First Camera Actuator 100>

FIG. 19 is a perspective view of a first camera actuator 100 according to an embodiment, FIG. 20 is a perspective view in which a part of a configuration of the camera actuator according to the embodiment shown in FIG. 19 is omitted, and FIG. 21 is an exploded perspective view in which a part of the configuration of the camera actuator according to the embodiment shown in FIG. 19 is omitted.

Referring to FIG. 19, the first camera actuator 100 according to the embodiment may include a base 20, a circuit board 410 disposed outside the base 20, a fourth driving unit 142, and a third lens assembly 130.

FIG. 20 is a perspective view in which the base 20 and the circuit board 410 are omitted in FIG. 19, and referring to FIG. 20, a first camera actuator 100 according to an embodiment includes a first guide portion 210, a second guide portion 220, a first lens assembly 110, a second lens assembly 120, a third driving unit 141, and a fourth driving unit 142.

The third driving unit 141 and the fourth driving unit 142 may include a coil or a magnet.

For example, when the third driving unit 141 and the fourth driving unit 142 include the coil, the third driving unit 141 may include a first coil portion 141b and a first yoke 141a, and the fourth driving unit 142 may include a second coil portion 142b and a second yoke 142a.

Or, conversely, the third driving unit 141 and the fourth driving unit 142 may include the magnet.

In an xyz-axis direction shown in FIG. 21, a z-axis may refer to an optic axis direction or a direction parallel thereto, an xz plane represents the ground, and an x-axis may refer to a direction perpendicular to the z-axis on the ground (xz plane, and a y-axis may refer to a direction perpendicular to the ground.

Referring to FIG. 21, a first camera actuator 100 according to an embodiment may include a base 20, a first guide portion 210, a second guide portion 220, a first lens assembly 110, a second lens assembly 120, and a third lens assembly 130.

For example, the first camera actuator 100 according to the embodiment may include the base 20, the first guide portion 210 disposed on one side of the base 20, the second guide portion 220 disposed on the other side of the base 20, the first lens assembly 110 corresponding to the first guide portion 210, the second lens assembly 120 corresponding to the second guide portion 220, a first ball bearing 117 (see FIG. 23a) disposed between the first lens assembly 110 and the first guide portion 210, and a second ball bearing (not shown) disposed between the second guide portion 220 and the second lens assembly 120.

In addition, the embodiment may include the third lens assembly 130 disposed in front of the first lens assembly 110 in the optic axis direction.

Hereinafter, specific features of the camera device according to the embodiment will be described in detail with reference to the drawings.

<Guide Portion>

Referring to FIG. 20 and FIG. 21, the embodiment may include a first guide portion 210 disposed adjacent to the first side wall 21a of the base 20, and a second guide portion 220 disposed adjacent to the second side wall 21b of the base 20.

The first guide portion 210 may be disposed between the first lens assembly 110 and the first side wall 21a of the base 20.

The second guide portion 220 may be disposed between the second lens assembly 120 and the second side wall 21b of the base 20. The first side wall 21a and the second side wall 21b of the base may be disposed to face each other.

According to the embodiment, a lens assembly is driven in a state in which the first guide portion 210 and the second guide portion 220, which are precisely numerically controlled in the base, are coupled to each other, so that friction resistance is reduced by reducing friction torque, and thus there are technical effects such as improvement of driving force, reduction of power consumption, and improvement of control characteristics during zooming.

Accordingly, according to the embodiment, there is a complex technical effect that image quality or resolution may be improved remarkably by preventing occurrence of a phenomenon that a decenter of a lens, tilt of the lens, and a central axis of a lens group and an image sensor are not aligned while minimizing the friction torque during zooming.

In the related art, when guide rails are disposed in the base itself, a gradient is generated along an injection direction, and thus there is difficulty in dimensional control, and there was a technical problem that friction torque increases and driving force decreases when injection is not performed normally.

On the other hand, according to the embodiment, the first guide portion 210 and the second guide portion 220 which are formed separately from the base 20 are applied separately without disposing the guide rails on the base itself, and thus there is a special technical effect that generation of a gradient along the injection direction may be prevented.

The base 20 may be injected in a Z-axis direction. In the related art, when a rail is integrally formed with the base, there is a problem that a straight line of the rail is distorted due to a gradient generated while the rail is injected in the Z-axis direction.

According to the embodiment, since the first guide portion 210 and the second guide portion 220 are injected separately from the base 20, it is possible to prevent generation of a gradient remarkably as compared with the related art, and thus there is a special technical effect that precise injection may be performed and generation of a gradient due to injection may be prevented.

In the embodiment, the first guide portion 210 and the second guide portion 220 may be injected on an X-axis, and a length injected may be shorter than the base 20. In this case, when rails 212 and 222 are disposed on the first guide portion 210 and the second guide portion 220, generation of a gradient during injection may be minimized, and there is a technical effect that possibility that the straight line of the rail is distorted is low.

FIG. 22 is an enlarged perspective view of a first guide portion 210 and a second guide portion 220 of a camera actuator according to an embodiment.

Referring to FIG. 22, in the embodiment, the first guide portion 210 may include a single or a plurality of first rails 212. In addition, the second guide portion 220 may include a single or a plurality of second rails 222.

For example, the first rail 212 of the first guide portion 210 may include a first-first rail 212a and a first-second rail 212b. The first guide portion 210 may include a first support portion 213 between the first-first rail 212a and the first-second rail 212b.

According to the embodiment, two rails for each lens assembly are provided, and thus there is a technical effect that even though any one of the rails is distorted, the accuracy may be secured by the other one.

In addition, according to the embodiment, the two rails for each lens assembly are provided, and thus there is a technical effect that despite an issue of the frictional force of the ball described later at any one of the rails, the driving force may be secured as the cloud driving proceeds smoothly in the other one.

The first rail 212 may be connected from one surface of the first guide portion 210 to the other surface thereof.

A camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide portion 210 includes the first-first rail 212a and the first-second rail 212a, and the first-first rail 212a and the first-second rail 212a guide the first lens assembly 110, and thus there is a technical effect that accuracy of alignment may be improved.

In addition, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

In addition, the first guide portion 210 may include a first guide protruding portion 215 that extends in a side surface direction perpendicular to a direction in which the first rail 212 extends. A first protrusion 214p may be included on the first guide protruding portion 215. For example, the first protrusion 214p may include a first-first protrusion 214p1 and a first-second protrusion 214p2.

Referring to FIG. 22, in the embodiment, the second guide portion 220 may include a single or a plurality of second rails 222.

For example, the second rail 222 of the second guide portion 220 may include a second-first rail 222a and a second-second rail 222b. The second guide portion 220 may include a second support portion 223 between the second-first rail 222a and the second-second rail 222b. The second rail 222 may be connected from one surface of the second guide portion 210 to the other surface thereof.

In addition, the second guide portion 220 may include a second guide protruding portion 225 that extends in a side surface direction perpendicular to a direction in which the second rail 222 extends. A second protrusion 224p including a second-first protrusion 224p1 and a second-second protrusion 224p2 may be included on the second guide protruding portion 225.

The first-first protrusion 214p1 and first-second protrusion 214p2 of the first guide portion 210 and the second-first protrusion 224p1 and second-second protrusion 224p2 of the second guide portion 220 may be coupled to a third housing 21 of a third lens assembly 130 described later.

According to the embodiment, the first guide portion 210 includes the first-first rail 212a and the first-second rail 212b, and the first-first rail 212a and the first-second rail 212b guide the first lens assembly 110, and thus there is a technical effect that accuracy of alignment may be improved.

In addition, according to the embodiment, the second guide portion 220 includes the second-first rail 222a and the second-second rail 222b, and the second-first rail 222a and the second-second rail 222b guide the second lens assembly 120, and thus there is a technical effect that alignment accuracy may be increased.

Further, two rails for each lens assembly are provided, and thus there is a technical effect that even though any one of the rails is distorted, the accuracy may be secured by the other one.

In addition, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

Further, according to the embodiment, the two rails for each lens assembly are provided, and thus there is a technical effect that despite an issue of the frictional force of the ball described later at any one of the rails, the driving force may be secured as the cloud driving proceeds smoothly in the other one.

Furthermore, according to the embodiment, the first guide portion 210 and the second guide portion 220 which are formed separately from the base 20 are applied separately without disposing the guide rails on the base itself, and thus there is a special technical effect that generation of a gradient along the injection direction may be prevented.

In the related art, when guide rails are disposed in the base itself, a gradient is generated along an injection direction, and thus there is difficulty in dimensional control, and there was a technical problem that friction torque increases and driving force decreases when injection is not performed normally.

Next, FIG. 23a is a perspective view of a first lens assembly 110 of the camera actuator according to the embodiment shown in FIG. 21, and FIG. 23b is a perspective view in which a part of a configuration of the first lens assembly 110 shown in FIG. 23a is removed.

Referring briefly to FIG. 21, the embodiment may include a first lens assembly 110 moving along the first guide portion 210 and a second lens assembly 120 moving along the second guide portion 220.

Referring again to FIG. 23a, the first lens assembly 110 may include a first lens barrel 112a on which a first lens 113 is disposed and a first driving unit housing 112b on which a first driving unit 116 is disposed. The first lens barrel 112a and the first driving unit housing 112b may be a first housing, and the first housing may be in a barrel shape or a lens-barrel shape. The first driving unit 116 may be a magnet driving unit, but the embodiment is not limited thereto, and in some cases, a coil may be disposed therein.

In addition, the second lens assembly 120 may include a second lens barrel (not shown) on which a second lens (not shown) is disposed and a second driving unit housing (not shown) on which a second driving unit (not shown) is disposed. The second lens barrel (not shown) and the second driving unit housing (not shown) may be a second housing, and the second housing may be in a barrel shape or a lens-barrel shape. The second driving unit may be a magnet driving unit, but the embodiment is not limited thereto, and in some cases, a coil may be disposed therein.

The first driving unit 116 may correspond to the two first rails 212, and the second driving unit may correspond to the two second rails 222.

In the embodiment, it is possible to drive using a single or a plurality of balls. For example, the embodiment may include a first ball bearing 117 disposed between the first guide portion 210 and the first lens assembly 110 and a second ball bearing (not shown) disposed between the second guide portion 220 and the second lens assembly 120.

For example, in the embodiment, the first ball bearing 117 may include a single or a plurality of first-first ball bearings 117a disposed above the first driving unit housing 112b and a single or a plurality of first-second ball bearings 117b below the first driving unit housing 112b.

In the embodiment, the first-first ball bearing 117a of the first ball bearing 117 may move along a first-first rail 212a which is one of the first rails 212, and the first-second ball bearing 117b of the first ball bearings 117 may move along a first-second rail 212b which is another one of the first rails 212.

A camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide portion includes the first-first rail and the first-second rail, and the first-first rail and the first-second rail guide the first lens assembly 110, and thus there is a technical effect that accuracy of alignment between the second lens assembly 110 and an optic axis may be improved when the first lens assembly 110 moves.

Referring also to FIG. 23b, in an embodiment, the first lens assembly 110 may include a first assembly groove 112b1 on which the first ball bearing 117 is disposed. The second lens assembly 120 may include a second assembly groove (not shown) on which the second ball bearing is disposed.

The first assembly groove 112b1 of the first lens assembly 110 may be in plural. In this case, a distance between two first assembly grooves 112b1 of the plurality of first assembly grooves 112b1 with respect to an optic axis direction may be longer than a thickness of the first lens barrel 112a.

In the embodiment, the first assembly groove 112b1 of the first lens assembly 110 may be in a V-shape. Further, the second assembly groove (not shown) of the second lens assembly 120 may be in a V-shape. The first assembly groove 112b1 of the first lens assembly 110 may be in a U-shape in addition to the V-shape, or a shape that contacts the first ball bearing 117 at two or three points. In addition, the second assembly groove (not shown) of the second lens assembly 120 may be in a U-shape in addition to the V-shape, or a shape that contacts the first ball bearing 117 at two or three points.

Next, FIG. 24 is a driving example view of the camera actuator according to the embodiment.

An interaction in which an electromagnetic force DEM is generated between a first magnet 116 and a first coil portion 141b in the camera module according to the embodiment will be described with reference to FIG. 24.

As shown in FIG. 24, a magnetization method of the first magnet 116 of the camera module according to the embodiment may be a vertical magnetization method. For example, in the embodiment, all of an N-pole 116N and an S-pole 116S of the first magnet 116 may be magnetized so as to face the first coil portion 141b. Accordingly, the N-pole 116N and the S-pole 116S of the first magnet 116 may be respectively disposed so as to correspond to a region in which current flows in a y-axis direction perpendicular to the ground at the first coil portion 141b.

Referring to FIG. 24, in the embodiment, a magnetic force DM is applied in a direction opposite to an x-axis at the N-pole 116N of the first magnet 116, and when a current DE flows in a y-axis direction in a region of the first coil portion 141b corresponding to the N-pole 116N, the electromagnetic force DEM acts in a z-axis direction with respect to the Fleming's left-hand rule.

In addition, in the embodiment, the magnetic force DM is applied in the x-axis direction at the S-pole 116S of the first magnet 116, and when the current DE flows in a direction opposite to the y-axis perpendicular to the ground at the first coil portion 141b corresponding to the S pole 116S, the electromagnetic force DEM acts in a z-axis direction with respect to the Fleming's left-hand rule.

At this time, since a third driving unit 141 including the first coil portion 141b is in a fixed state, the first lens assembly 110, which is a moving portion on which the first magnet 116 is disposed, may be moved back and forth along a rail of the first guide portion 210 in a direction parallel to the z-axis direction by the electromagnetic force DEM according to a current direction. The electromagnetic force DEM may be controlled in proportion to the current DE applied to the first coil portion 141b.

Likewise, an electromagnetic force DEM is generated between a second magnet (not shown) and the second coil portion 142b of the camera module according to the embodiment, and thus the second lens assembly 120 may be moved along a rail of the second guide portion 220 horizontally with respect to the optic axis.

As described above, when implementing AF or Zoom in the related art, a plurality of lens assemblies are driven by the electromagnetic force between a magnet and a coil, and in order to obtain the position information of the lens assembly, a hall sensor is disposed inside the winding of the coil. The inside of the winding of the coil in which the hall sensor is disposed may be hollow. The hall sensor may obtain the position information of the lens assembly by sensing a change in magnetic flux of the magnet disposed in the lens assembly. However, when the hall sensor is positioned inside the coil, a distance between the hall sensor and the magnet is determined by a height of the coil.

However, in the related art, thrust is required for the movement of the lens assembly, and in order to secure such thrust, the height of the coil is required to be higher than a predetermined height.

However, when the height of the coil is increased as described above, the distance between the hall sensor and the magnet is increased by the heightened coil. Accordingly, since the magnetic flux of the magnet is blocked, there is a technical contradiction in which the sensitivity of the magnetic flux sensed by the hall sensor disposed inside the coil is lowered. On the contrary, when the height of the coil is reduced, the electromagnetic force between the magnet and the coil is weakened, and the thrust for AF or Zoom driving is deteriorated.

According to the applicant's private internal technology, in order to solve such problems, the optimum point of the sensitivity of the hall sensor and thrust is set by a coil having an appropriate height. In addition, the deteriorated thrust or weakened sensitivity of the hall sensor causes problems in the precision of all camera controls, and a decent or tilt phenomena of the camera module is induced, and thus it may be directly related to the safety or life of a driver who is a user or pedestrian.

One of technical problems of the embodiment is to provide a camera actuator capable of improving simultaneously the sensitivity of the hall sensor while increasing the thrust, and a camera module including the same.

FIG. 25 is a cross-sectional view taken along line C1-C2 in the camera actuator according to the embodiment shown in FIG. 19.

Referring to FIG. 25, the first camera actuator 100 according to the embodiment may include a base 20 and a lens assembly disposed in the base 20. For example, a third lens assembly 130, a first lens assembly 110, and a second lens assembly 120 may be sequentially disposed in the base 20 based on a light incident direction, and an image sensor 180 may be disposed on a rear side of the second lens assembly 120.

As described above, the first camera actuator 100 according to the embodiment may be driven by an electromagnetic force of a predetermined magnet and coil portion.

For example, referring to FIG. 25, in the camera actuator according to the embodiment, the first lens assembly 110 may include a first driving unit 116 and a third driving unit 141, and the second lens assembly 120 may include a second driving unit 126 and a fourth driving unit 142.

The first driving unit 116 and the second driving unit 126 may be magnet driving units, and the third driving unit 141 and the fourth driving unit 142 may be coil driving units, but the embodiment is not limited thereto.

Hereinafter, it will be described as a case in which the first driving unit 116 and the second driving unit 126 are magnet driving units, respectively, and the third driving unit 141 and the fourth driving unit 142 are coil driving units, respectively.

In the camera module according to the embodiment, in the first lens assembly 110, the first driving unit 116 may include a first magnet 116b and a first yoke 116a, and the third driving unit 141 may include a first coil portion 141b and a third yoke 141a. The third driving unit 141 may include a first circuit board 41 between the first coil portion 141b and the third yoke 141a.

In addition, the embodiment may include a first spacer 141c disposed in the base 20 and a first position detection sensor 71 disposed on the first spacer 141c. The first spacer 141c may be formed of any one or more of polycarbonate (PC), polyethylene terephthalate glycol (PETG), polyethylene (PE) and polypropylene (PP), but the embodiment is not limited thereto.

The first position detection sensor 71 may be a magnetic sensor. For example, the first position detection sensor 71 may be any one of a solid magnetic sensor such as a hall sensor, a coiled magnetic sensor, a resonance magnetic sensor, and the like, but the embodiment is not limited thereto.

In addition, in the camera module according to the embodiment, in the second lens assembly 120, the second driving unit 126 may include a second magnet 126b and a second yoke 126a, and the fourth driving unit 142 may include a second coil portion 142b and a fourth yoke 142a. The fourth driving unit 142 may include a second circuit board 42 between the second coil portion 142b and the fourth yoke 142a.

In addition, the embodiment may include a second spacer 142c disposed in the base 20 and a second position detection sensor 72 disposed on the second spacer 142c. The second spacer 142c may be formed of any one or more of polycarbonate (PC), polyethylene terephthalate glycol (PETG), polyethylene (PE) and polypropylene (PP), but the embodiment is not limited thereto.

The second position detection sensor 72 may be any one magnetic sensor of a coiled magnetic sensor, a solid magnetic sensor such as a hall sensor, a resonance magnetic sensor, and the like, but the embodiment is not limited thereto.

Hereinafter, technical features of a disposition structure of a position sensor in the embodiment will be described with reference to FIGS. 25 and 26a to 26c.

FIG. 26a is an enlarged view of the S region shown in FIG. 25, and FIG. 26b is a detailed view of the S region shown in FIG. 25a.

First, referring to FIGS. 25 and 26A, the embodiment may include a base 20, a first lens assembly 110 disposed in the base 20, the third driving unit 141 which is a coil driving unit disposed in the base 20, a first spacer 141c disposed in the base 20, and a first position detection sensor 71 disposed on the first spacer 141c.

The third driving unit 141 may include a first circuit board 41a disposed between the first coil portion 141b and the third yoke 141a.

The first coil portion 141b and the first position detection sensor 71 may be electrically connected to the first circuit board 41a.

Next, referring to FIG. 26b, the first spacer 141c may include a first support portion 141c1 and a first protruding portion 141c3 protruding from the first support portion 141c1, the first position detection sensor 71 may be disposed on the first protruding portion 141c3, and the first protruding portion 141c3 may be disposed in the hollow of the first coil portion 141b which is the coil driving portion.

In this case, the embodiment may include a first connecting portion 141c2 connecting the first protruding portion 141c3 and the first support portion 141c1.

Referring to FIG. 26B, the first circuit board 41a may include a first substrate region 41a1 disposed on the first spacer 141c and a second substrate region 41a3 disposed to be spaced apart from the first substrate region 41a1. The first circuit board 41a may include a second-second substrate region 41a2 connecting the first substrate region 41a1 and the second substrate region 41a3. The first position detection sensor 71 may be disposed on the second substrate region 41a3, and the second substrate region 41a3 may be disposed in the hollow of the first coil portion 141b which is the coil driving unit.

In addition, referring to FIG. 25, the embodiment may include the base 20, a second lens assembly 120 disposed in the base 20, the fourth driving unit 142 which is a coil driving unit disposed in the base 20, the second spacer 142c disposed in the base 20, and the second position detection sensor 72 disposed on the second spacer 142c.

In addition, the second spacer 142c may also adopt technical features of the first spacer 141c. For example, referring to FIG. 25, the second spacer 142c may include a second protruding portion (not shown) protruding from a second support portion (not shown), the second position detection sensor 72 may be disposed on the second protruding portion, and the second protruding portion may be disposed in the hollow of the fourth driving unit 142 which is the coil driving unit.

The second protruding portion may include a second seating portion (not shown), and the second position detection sensor 72 may be disposed on the second seating portion.

In addition, referring to FIG. 25, the second circuit board 41*b* may include a third substrate region (not shown) disposed on the second spacer 142*c* and a fourth substrate region disposed to be spaced apart from the third substrate region. The second circuit board 41*b* may include a fourth-second substrate region connecting the third substrate region and the fourth substrate region.

The second position detection sensor 72 may be disposed on the fourth-second substrate region, and the fourth-second substrate region may be disposed in the hollow of the fourth driving unit 142 which is the coil driving unit.

Again, Referring to FIG. 26*b*, the first lens assembly 110 may be driven in the optical axis direction by the electromagnetic force (DEM) between the first magnet 116*b* of the first driving unit 116 and the first coil portion 141*b* of the third driving unit 141. At this time, the electromagnetic force (DEM) is affected by a distance (DCM) between the first magnet 116*b* and the first coil portion 141*b*.

The magnetic flux of the magnet sensed by the hall sensor is changed according to a separation distance between the hall sensor and the magnet, and thus the performance of position detection of the hall sensor is affected. For example, FIG. 26C is magnetic flux data according to the separation distance between the magnet and the first position detection sensor 71 in Example and Comparative Example.

In the conventional internal technology, the height of the coil portion should be ensured to secure thrust. In the related art, as the height of the coil portion increases according to disposing the hall sensor on the PCB under the coil portion, the separation distance between the magnet and the hall sensor increases, and thus there was a technical limitation that a first distance DH1 spaced apart between the magnet and the hall sensor should be secured at least 800 µm or more. Accordingly, in the conventional internal technology (Comparative Example), the magnetic flux detected by the hall sensor was a level of securing about 50 mT. In addition, in the conventional internal technology, when the height of the coil increases, the magnetic flux of the magnet, which may be introduced into the hall sensor disposed in the hollow portion of the coil, is partially blocked, so that the sensitivity of the hall sensor is lowered.

On the other hand, according to the embodiment, the first spacer 141*c* includes a first protruding portion 141*c*3 protruding from the first support portion 141*c*1, and the first position detection sensor 71 is disposed on the first protruding portion 141*c*3, and accordingly, a second distance DH2 between the first magnet 116*b* and the first position detection sensor 71 is significantly reduced, and thus there is a technical effect that the magnetic flux of the first magnet 116*b* sensed by the first position detection sensor 71 is significantly improved.

For example, according to the embodiment, as the first position detection sensor 71 is disposed on the first protruding portion 141*c*3, it is possible to secure the second distance DH2 between the first magnet 116*b* and the first position detection sensor 71 to 400 um or less, which is more than two times shorter than that of Comparative Example, and accordingly, there is a unique technical effect that the magnetic flux between the first magnet 116*b* and the first position detection sensor 71 may be secured up to about 150 mT, which is about three times higher than that of Comparative Example.

In addition, according to the embodiment, as the first position detection sensor 71 is disposed on the first protruding portion 141*c*3, the first position detection sensor 71 is almost exposed to the first magnet 116*b* even though it is disposed in the hollow of the first coil portion 141*b*, and thus there is a special technical effect that blocking of magnetic flux by the first coil portion 141*b* is significantly reduced.

Accordingly, the camera actuator according to the embodiment and the camera module including the same have a unique technical effect of simultaneously increasing the thrust and the sensitivity of the hall sensor.

Next, one of technical problems of the embodiments is, when implementing AF or Zoom, to provide a camera actuator capable of preventing a magnetic field interference between magnets mounted on each lens assembly when a plurality of lens assemblies are driven by an electromagnetic force between a magnet and a coil, and a camera module including the same.

In addition, one of the technical problems of the embodiments is to provide a camera actuator capable of preventing detachment of a magnet and a yoke, and a camera module including the same.

Hereinafter, a prevention structure of magnetic field interference of an embodiment will be described with reference to FIGS. 27*a* to 27*c*.

Next, FIG. 27*a* is a perspective view of a first driving unit 116 of a camera module according to an embodiment. Referring to FIG. 27*a*, in the embodiment, the first driving unit 116 may include a first magnet 116*b* and a first yoke 116*a*, and the first yoke 116*a* may include a first support portion 116*a*1 and a first side protruding portion 116*a*2 extending from the first support portion 116*a*1 toward a side surface of the first magnet 116*b*. The first side protruding portion 116*a*2 may be disposed on both side surfaces of the first magnet 116*b*. In addition, the first yoke 116*a* may include a first fixed protruding portion 116*a*3 extending in a different direction, for example, in a direction opposite to the first side protruding portion 116*a*2. The first fixed protruding portion 116*a*3 may be disposed at a position about a middle of the first support portion 116*a*1, but the embodiment is not limited thereto.

Similarly, in the embodiment, the second driving unit 126 may include a second magnet 126*b* and a second yoke 126*a*, and the second yoke 126*a* may include a second support portion (not shown) and a second side protruding portion extending from the second support portion toward a side surface of the second magnet 126*b* (hereinbefore, see a structure of the second yoke 126*a* in FIG. 25).

The second side protruding portion may be disposed on both side surfaces of the second magnet 126*b*. In addition, the second yoke 126*a* may include a second fixed protruding portion (not shown) extending in a different direction, for example, in a direction opposite to the second side protruding portion. The second fixed protruding portion may be disposed at a position about a middle of the second support portion, but the embodiment is not limited thereto.

In the related art, in addition, when implementing AF or Zoom, a plurality of lens assemblies are driven by an electromagnetic force between a magnet and a coil, and there is a problem that a magnetic field interference occurs between magnets mounted in each lens assembly. There is a problem that AF or Zoom driving is not performed normally, and thrust is deteriorated due to such a magnetic field interference between magnets. In addition, there is a problem that a decent or tilt phenomenon due to a magnetic field interference between magnets is induced.

When an issue in a precision in camera control occurs or thrust is deteriorated due to such a magnetic field interference, or a decent or tilt phenomenon is induced, it may be directly related to the safety or life of a driver who is a user or pedestrian.

For example, FIG. 27b shows data of a magnetic flux density distribution in Comparative Example. Comparative Example of FIG. 27b is a non-disclosed internal technology of an applicant, and has a structure applied so as to perform a shielding function of magnetic flux by disposing a back yoke for a magnet. A shielding performance of the magnetic flux is improved by applying back yoke technology for the magnet, but there are technical problems as follows.

For example, referring to FIG. 27B, it is magnetic flux density data between respective magnets mounted in the first lens assembly and the second lens assembly, and thus there is a problem that magnetic field interference (IF) occurs between the respective magnets, and loss of thrust occurs due to leakage (LE) of the magnetic flux generated in each magnet.

In particular, in case of a high-magnification Zoom Actuator applied recently, there is a problem that not only magnetic field interference occurs between permanent magnets of the first lens assembly and the second lens assembly, which are moving lenses, but also the magnetic field interference (IF) with a magnet of the OIS actuator occurs.

Movement of each group is disturbed due to the magnetic field interference (IF), and as a result, there is a problem that an input current is also increased.

According to the embodiment, a yoke in a magnet driving unit of the first lens assembly 110 or the second lens assembly 120 includes a side protruding portion extending to a side surface of the magnet, and thus there is a special technical effect that it is possible to provide a camera actuator capable of preventing a magnetic field interference between magnets mounted on each lens assembly when a plurality of lens assemblies are driven by an electromagnetic force between a magnet and a coil when AF or Zoom is implemented, and a camera module including the same.

For example, FIG. 27c shows data of a magnetic flux density distribution in Example.

Referring to FIG. 27c, it is magnetic flux density data between respective magnets mounted in the first lens assembly and the second lens assembly, and a yoke in a magnet driving unit of the first lens assembly 110 and the second lens assembly 120 includes a side protruding portion extending to a side surface of the magnet, and thus the precision of camera control is improved significantly.

In addition, according to the embodiment, the yoke in the magnet driving unit of the first lens assembly 110 or the second lens assembly 120 includes the side protruding portion extending to the side surface of the magnet to prevent leakage flux generated in the magnet, and the side protruding portion is disposed in a region having a high magnetic flux density so that the magnetic flux is concentrated (FC), and thus there is a technical effect that thrust is significantly improved by increasing a density between a flux line and the coil to increase the Lorentz Force.

Next, FIG. 28 is an illustrative view of an integrated body 315 of a camera module according to another embodiment.

A first camera actuator 100 may be disposed in a first body region 315a of the integrated body 315 of the camera module according to another embodiment, and a second camera actuator 300 may be disposed in a second body region 315b.

Next, FIG. 29 shows a mobile terminal 1500 to which a camera module according to an embodiment is applied.

As shown in FIG. 29, the mobile terminal 1500 according to the embodiment may include a camera module 1000, a flash module 1530, and an autofocus device 1510 provided on a back surface.

The camera module 1000 may include an image capturing function and an autofocus function. For example, the camera module 1000 may include an autofocus function using an image.

The camera module 1000 processes a still image or a moving image frame obtained by an image sensor in a photographing mode or a video call mode. The processed image frame may be displayed on a predetermined display unit, and may be stored in a memory. A camera (not shown) may be disposed on a front surface of the body of the mobile terminal.

For example, the camera module 1000 may include a first camera module 1000A and a second camera module 1000B, and OIS may be implemented together with an AF or zoom function by the first camera module 1000A.

The flash module 1530 may include a light-emitting device that emits light therein. The flash module 1530 may be operated by a camera operation of a mobile terminal or by user control.

The autofocus device 1510 may include one of packages of a surface emitting laser element as a light-emitting unit.

The autofocus device 1510 may include an autofocus function using a laser. The autofocus device 1510 may be mainly used in a condition in which an autofocus function using an image of the camera module 1000 is deteriorated, for example, in a close environment of 10m or less or a dark environment. The autofocus device 1510 may include a light-emitting unit including a vertical cavity surface emitting laser (VCSEL) semiconductor device, and a light receiving unit that converts light energy into electric energy such as a photodiode.

Next, FIG. 30 is a perspective view of a vehicle 700 to which a camera module according to an embodiment is applied.

For example, FIG. 30 is an appearance view of a vehicle having a vehicle driving assistance device to which a camera module 1000 according to the embodiment is applied.

Referring to FIG. 30, the vehicle 700 according to the embodiment may include wheels 13FL and 13FR that rotate by a power source, and a predetermined sensor. The sensor may be a camera sensor 2000, but the embodiment is not limited thereto.

The camera 2000 may be a camera sensor to which the camera module 1000 according to the embodiment is applied.

The vehicle 700 according to the embodiment may acquire image information through the camera sensor 2000 that photographs a front image or a surrounding image, and may determine an unidentified situation of a lane by using the image information and generate a virtual lane at the time of unidentification.

For example, the camera sensor 2000 may acquire the front image by photographing a front of the vehicle 700, and a processor (not shown) may acquire the image information by analyzing an object included in the front image.

For example, when an object such as a lane, a neighboring vehicle, a traveling obstacle, and a median strip, a curb, and a street tree corresponding to an indirect road marking is photographed in an image photographed by the camera sensor 2000, the processor detects such an object to include in the image information.

In this case, the processor may acquire distance information with the object detected through the camera sensor 2000 to further complement the image information. The image information may be information about an object captured in the image.

Such a camera sensor 2000 may include an image sensor and an image processing module. The camera sensor 2000 may process a still image or moving image obtained by the image sensor (e.g., CMOS or CCD). The image processing module may process the still image or moving image acquired through the image sensor to extract necessary information, and may transmit the extracted information to the processor.

At this time, the camera sensor 2000 may include a stereo camera so as to improve the measurement accuracy of the object and to secure more information such as a distance between the vehicle 700 and the object, but the embodiment is not limited thereto.

The characteristics, structures and effects described in the embodiments above are included in at least one embodiment but are not limited to one embodiment. Furthermore, the characteristics, structures, effects, and the like illustrated in each of the embodiments may be combined or modified even with respect to other embodiments by those of ordinary skill in the art to which the embodiments pertain. Thus, it would be construed that contents related to such a combination and such a modification are included in the scope of the present invention.

In addition, embodiments are mostly described above, but they are only examples and do not limit the present invention. A person skilled in the art to which the present invention pertain may appreciate that several variations and applications not presented above may be made without departing from the essential characteristic of the embodiments. For example, each component particularly represented in the embodiments may be varied. In addition, it should be construed that differences related to such a variation and such an application are included in the scope of the present invention defined in the following claims.

What is claimed is:

1. A camera actuator comprising:
   a housing;
   a prism unit disposed in the housing;
   a driving unit for tilting the prism unit; and
   an elastic member disposed between the housing and the prism unit,
   wherein the elastic member includes:
     a first elastic member disposed in a central region corresponding to a center of the prism unit, and
     a plurality of second elastic members spaced apart from the first elastic member, and
   wherein the first and second elastic members include a spring.

2. The camera actuator of claim 1, wherein a spring constant of the first elastic member is defined as a first spring constant,
   wherein a spring constant (k) of the second elastic member is defined as a second spring constant, and
   wherein the first and second spring constants are different from each other.

3. The camera actuator of claim 2, wherein the second spring constant is smaller than the first spring constant.

4. The camera actuator of claim 3, wherein the second spring constant is 20% to 80% of the first spring constant.

5. The camera actuator of claim 4, wherein the second elastic member includes:
   first and second sub elastic members spaced apart from the first elastic member in a first direction; and
   third and fourth sub elastic members spaced apart in a second direction perpendicular to the first direction, and
   wherein the first elastic member is disposed in a region between the first and second sub elastic members and in a region between the third and fourth sub elastic members.

6. The camera actuator of claim 5, wherein the prism unit is provided to be rotatable in the second direction with respect to a first virtual line formed by the first elastic member and the first and second sub elastic members as a reference axis.

7. The camera actuator of claim 5, the prism unit is provided to be rotatable in the first direction with respect to a second virtual line formed by the first elastic member and the third and fourth sub elastic members as a reference axis.

8. The camera actuator of claim 2, wherein the housing includes:
   a first groove formed on an inner surface of the housing facing the prism unit and corresponding to the first elastic member; and
   a second groove formed on an inner surface of the housing facing the prism unit and corresponding to the second elastic member,
   wherein the prism unit includes:
     a third groove formed on an outer surface of the prism unit facing the inner surface of the housing and corresponding to the first elastic member; and
     a fourth groove formed on the outer surface of the prism unit facing the inner surface of the housing and corresponding to the second elastic member;
   wherein both ends of the first elastic member are disposed to be inserted into the first groove and the third groove, and
   wherein both ends of the second elastic member may be disposed to be inserted into the second groove and the fourth groove.

9. The camera actuator of claim 8, wherein the first elastic member is fixed and disposed in at least one of the first groove and the third groove.

10. The camera actuator of claim 8, wherein the second elastic member is fixed and disposed in at least one of the second groove and the fourth groove.

11. The camera actuator of claim 1, wherein a first virtual straight line connecting the first and second sub elastic members is orthogonal to a second virtual straight line connecting the third and fourth sub elastic members.

12. The camera actuator of claim 1, wherein the first virtual straight line includes a point intersecting the second virtual straight line, and
    wherein the first elastic member is disposed at the intersecting point.

13. The camera actuator of claim 12, wherein a center of the first elastic member overlaps the intersection point in an optical axis.

14. A camera actuator comprising:
    a housing;
    a prism unit disposed in the housing;
    a driving unit for tilting the prism unit; and
    an elastic member disposed between the housing and the prism unit,
    wherein the housing includes an inner surface and first to fifth recesses formed in the inner surface, and
    wherein a center of the first recess is included in a region connecting centers of the second to fifth recesses.

15. The camera actuator of claim 14, wherein a size of the first recess is larger than a size of each of the second to fifth recesses.

16. The camera actuator of claim 14, wherein a virtual straight line connecting the second and third recesses is orthogonal to a virtual straight line connecting the fourth and fifth recesses.

17. The camera actuator of claim 16, wherein the first recess includes a point at which a virtual straight line connecting the second and third recesses and a virtual straight line connecting the fourth and fifth recesses intersect.

18. The camera actuator of claim 14, wherein the elastic member includes:
a first elastic member disposed in the first recess; and
a second elastic member disposed in the second to fifth recesses, and
wherein a spring constant of the first elastic member is greater than a spring constant of the second elastic member disposed in the second to fifth recesses.

19. A camera module comprising:
an image sensor; and
first and second camera actuators for providing light to the image sensor,
wherein the second camera actuator changes a path of light incident from the outside to provide to the first camera actuator,
wherein the light passing through the first camera actuator is provided to the image sensor,
wherein the second camera actuator includes:
a housing;
a prism unit disposed in the housing;
a driving unit for tilting the prism unit; and
an elastic member disposed between the housing and the prism unit,
wherein the elastic member includes:
a first elastic member disposed in a central region corresponding to a center of the prism unit, and
a plurality of second elastic members spaced apart from the first elastic member, and
wherein the first and second elastic members include a spring,
wherein a spring constant of the first elastic member is defined as a first spring constant,
wherein a spring constant (k) of the second elastic member is defined as a second spring constant, and
wherein the second spring constant is smaller than the first spring constant.

20. The camera module of claim 19, wherein the first camera actuator includes:
a base;
a rail guide portion coupled to the base;
a first lens assembly coupled to and fixed to the base; and
second and third lens assemblies disposed in the base and moving along the rail guide portion.

* * * * *